(12) United States Patent
Sugiura et al.

(10) Patent No.: US 12,415,897 B2
(45) Date of Patent: Sep. 16, 2025

(54) FIBER-REINFORCED RESIN MOLDED BODY AND PRODUCTION METHOD THEREOF, FIBER-REINFORCED RESIN MOLDING PREPREG, FIBER-REINFORCED MOLDED BODY AND PRODUCTION METHOD OF FIBER-REINFORCED MOLDED BODY AND RESIN SHEET, FIBER-REINFORCED SANDWICH COMPOSITE, AND PRODUCTION METHOD OF FIBERREINFORCED MOLDED BODY

(71) Applicant: INOAC CORPORATION, Nagoya (JP)

(72) Inventors: Yoshinori Sugiura, Anjo (JP); Naoya Harata, Anjo (JP); Tatsuhiko Yasui, Anjo (JP); Naoyuki Tanabe, Kaizu (JP)

(73) Assignee: INOAC CORPORATION, Nagoya (JP)

( * ) Notice: Subject to any disclaimer, the term of this patent is extended or adjusted under 35 U.S.C. 154(b) by 260 days.

(21) Appl. No.: 17/925,228

(22) PCT Filed: Jun. 22, 2021

(86) PCT No.: PCT/JP2021/023675
§ 371 (c)(1),
(2) Date: Nov. 14, 2022

(87) PCT Pub. No.: WO2022/009671
PCT Pub. Date: Jan. 13, 2022

(65) Prior Publication Data
US 2023/0235140 A1    Jul. 27, 2023

(30) Foreign Application Priority Data

Jul. 6, 2020 (JP) ................................ 2020-116251
Oct. 9, 2020 (JP) ................................ 2020-171081

(Continued)

(51) Int. Cl.
*C08J 5/24* (2006.01)
*B29C 43/18* (2006.01)
(Continued)

(52) U.S. Cl.
CPC ............... *C08J 5/243* (2021.05); *B29C 43/18* (2013.01); *B29C 70/42* (2013.01); *B32B 5/18* (2013.01);
(Continued)

(58) Field of Classification Search
CPC ...... B32B 5/02–5/12; B32B 5/26–5/32; C07C 265/12
See application file for complete search history.

(56) References Cited

U.S. PATENT DOCUMENTS 8,628,842 B2   1/2014   Kasuga et al.
9,505,177 B2  11/2016   Fujioka et al.
(Continued)

FOREIGN PATENT DOCUMENTS

CN   104130548 A   11/2014
CN   104559816 A    4/2015
(Continued)

OTHER PUBLICATIONS

Peng et al. "Study on the Phenonlic-Epoxy System", Advanced Materials Research, vol. 1088, (2015); pp. 439-443.*
(Continued)

*Primary Examiner* — Prashant J Khatri
(74) *Attorney, Agent, or Firm* — Sughrue Mion, PLLC

(57) ABSTRACT

In a method for producing a fiber-reinforced resin molded body (10) by heat-compressing fiber substrates (11A to 11D) together with a thermosetting resin (15) so that the thermosetting resin (15) is impregnated into the fiber substrates (11A to 11D) and cured, a thermosetting resin powder (15A) is disposed in contact with at least one surface of the fiber (Continued)

substrates (11A to 11D), the fiber substrates (11A to 11D) are heat-compressed together with the thermosetting resin powder (15A) by a mold (30) so that the thermosetting resin powder (15A) is melted, impregnated into the fiber substrates (11A to 11D), and cured. Also disclosed is a fiber-reinforced resin molded body as well as a vehicle or airframe including a fiber-reinforced resin molded body.

4 Claims, 39 Drawing Sheets

(30) Foreign Application Priority Data

| | | | |
|---|---|---|---|
| Oct. 12, 2020 | (JP) | ............................ | 2020-171814 |
| Dec. 14, 2020 | (JP) | ............................ | 2020-206600 |
| Apr. 28, 2021 | (JP) | ............................ | 2021-076007 |

(51) Int. Cl.

| | |
|---|---|
| *B29C 70/42* | (2006.01) |
| *B29K 61/04* | (2006.01) |
| *B29K 61/20* | (2006.01) |
| *B29K 105/00* | (2006.01) |
| *B29K 105/08* | (2006.01) |
| *B29K 307/04* | (2006.01) |
| *B32B 5/18* | (2006.01) |
| *B32B 5/24* | (2006.01) |
| *B32B 27/12* | (2006.01) |
| *C08J 9/42* | (2006.01) |

(52) U.S. Cl.
CPC .............. *B32B 5/245* (2013.01); *B32B 27/12* (2013.01); *C08J 9/42* (2013.01); *B29K 2061/04* (2013.01); *B29K 2061/20* (2013.01); *B29K 2105/0845* (2013.01); *B29K 2105/251* (2013.01); *B29K 2307/04* (2013.01); *B32B 2260/021* (2013.01); *B32B 2260/046* (2013.01); *B32B 2266/0285* (2013.01); *B32B 2307/718* (2013.01); *B32B 2307/72* (2013.01); *B32B 2307/7376* (2023.05); *C08J 2361/06* (2013.01); *C08J 2375/04* (2013.01); *C08J 2379/02* (2013.01)

(56) References Cited

U.S. PATENT DOCUMENTS

| | | | |
|---|---|---|---|
| 10,086,581 B2 | 10/2018 | Oyabu | |
| 10,800,135 B2 | 10/2020 | Albertelli et al. | |
| 11,135,825 B2 | 10/2021 | Takahashi et al. | |
| 11,283,128 B2 | 3/2022 | Kuroiwa et al. | |
| 11,331,882 B2 | 5/2022 | Ibaragi et al. | |
| 11,623,432 B2 | 4/2023 | Ibaragi et al. | |
| 2010/0310823 A1 | 12/2010 | Albertelli et al. | |
| 2012/0237754 A1 | 9/2012 | Kasuga et al. | |
| 2013/0242487 A1 | 9/2013 | Fujioka et al. | |
| 2016/0136922 A1 | 5/2016 | Oyabu | |
| 2016/0159998 A1 | 6/2016 | Spencer et al. | |
| 2020/0212389 A1 | 7/2020 | Kuroiwa et al. | |
| 2020/0316915 A1 | 10/2020 | Ibaragi et al. | |
| 2021/0107269 A1 | 4/2021 | Takahashi et al. | |
| 2021/0129488 A1 | 5/2021 | Takahashi et al. | |
| 2021/0162703 A1 | 6/2021 | Albertelli et al. | |
| 2021/0187908 A1 | 6/2021 | Ibaragi et al. | |

FOREIGN PATENT DOCUMENTS

| | | |
|---|---|---|
| CN | 109897375 A | 6/2019 |
| EP | 2 495 099 A1 | 9/2012 |
| EP | 2 647 486 A1 | 10/2013 |
| EP | 3 147 108 A1 | 3/2017 |
| JP | 50-30966 A | 3/1975 |
| JP | 53-75284 A | 7/1978 |
| JP | 53-75285 A | 7/1978 |
| JP | 54-78772 A | 6/1979 |
| JP | 2006-71959 A | 3/2006 |
| JP | 2006-232915 A | 9/2006 |
| JP | 2009-280669 A | 12/2009 |
| JP | 2010-23240 A | 2/2010 |
| JP | 2010-540293 A | 12/2010 |
| JP | 2011-93175 A | 5/2011 |
| JP | 2012-077365 A | 4/2012 |
| JP | 2013-230579 A | 11/2013 |
| JP | 2015-217662 A | 12/2015 |
| JP | 2017-160559 A | 9/2017 |
| JP | 2018-24215 A | 2/2018 |
| JP | 2018-27625 A | 2/2018 |
| JP | 2018-140528 A | 9/2018 |
| JP | 2019-119212 A | 7/2019 |
| JP | 2019-119213 A | 7/2019 |
| JP | 2020-012065 A | 1/2020 |
| JP | 2020-44811 A | 3/2020 |
| WO | 2012/073775 A1 | 6/2012 |
| WO | 2018/124215 A1 | 7/2018 |
| WO | 2018/182038 A1 | 10/2018 |
| WO | 201/044801 A1 | 3/2019 |
| WO | 2019/044801 A1 | 3/2019 |
| WO | 2019/069639 A1 | 4/2019 |

OTHER PUBLICATIONS

Price et al. "Handbook: Manufacturing Advanced Composite Components for Airframes", Federal Aviation Administration, (1997); pp. 1-1 to 13-13.*
Extended European Search Report dated Jul. 8, 2024 in Application No. 21835931.3.
International Search Report for PCT/JP2021/023675 dated, Sep. 7, 2021 (PCT/ISA/210).
Office Action issued Oct. 3, 2023 in Japanese Application No. 2021-076007.

* cited by examiner

Fig. 4

| | Thermosetting resin | Melting start temperature (Ta) [°C] | Reaction start temperature (Tb) [°C] | Tb-Ta [°C] | Minimum viscosity [Pa·s] | Maximum viscosity [Pa·s] | (Tb-Ta)/3 [°C] | Tb+(Tb-Ta)/3 [°C] |
|---|---|---|---|---|---|---|---|---|
| Example 1A, 2A, 3A | Resin A1 | 69 | 135 | 66 | 59 | 8,768 | 22 | 157 |
| Example 4A | Resin B1 | 95 | 135 | 40 | 1,500 | 209,004 | 13 | 148 |
| Example 5A | Resin A1/Resin C1 = 1/1 | 73 | 140 | 67 | 22 | 5,180 | 22 | 162 |
| Example 6A | Resin D1/Resin E1 = 1/1 | 76 | 138 | 62 | 475 | 51,895 | 21 | 159 |
| Example 7A | Resin D1/Resin E1/Resin C1 = 1/1/1 | 75 | 139 | 64 | 575 | 19,025 | 21 | 160 |
| Comparative Example 1A | Resin F1 | 72 | 91 | 19 | 118,908 | 164,468 | 6 | 97 |
| Comparative Example 2A | Resin A1/Resin D1 = 1/2 | 80 | 140 | 60 | 21 | 260 | 20 | 160 |

Fig. 5

| | Thermosetting resin | Number of laminated fiber substrates [sheet] | Molded body thickness [mm] | VF value [%] | Flexural strength [MPa] | Flexural modulus [GPa] | Molded body appearance | Position of disposed resin |
|---|---|---|---|---|---|---|---|---|
| Example 1A | Resin A1 | 4 | 0.8 | 58 | 550 | 54 | ○ | Between substrates at center |
| Example 2A | Resin A1 | 4 | 0.8 | 58 | 600 | 55 | ○ | Between respective substrates |
| Example 3A | Resin A1 | 10 | 2.0 | 59 | 620 | 53 | ○ | Between substrates at center |
| Example 4A | Resin B1 | 4 | 0.8 | 55 | 450 | 45 | ○ | Between substrates at center |
| Example 5A | Resin A1/Resin C1 = 1/1 | 4 | 0.8 | 57 | 990 | 60 | ○ | Between substrates at center |
| Example 6A | Resin D1/Resin E1 = 1/1 | 4 | 0.8 | 59 | 900 | 61 | ○ | Between substrates at center |
| Example 7A | Resin D1/Resin E1/Resin C1 = 1/1/1 | 4 | 0.8 | 58 | 930 | 58 | ○ | Between substrates at center |
| Comparative Example 1A | Resin F1 | 4 | - | - | - | - | × | Between substrates at center |
| Comparative Example 2A | Resin A1/Resin D1 = 1/2 | 4 | - | - | - | - | × | Between substrates at center |

Fig. 8
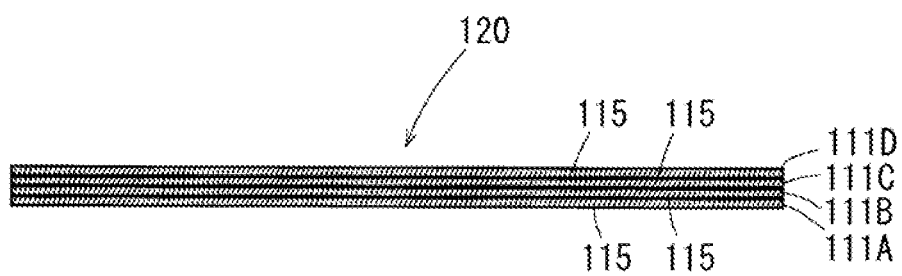
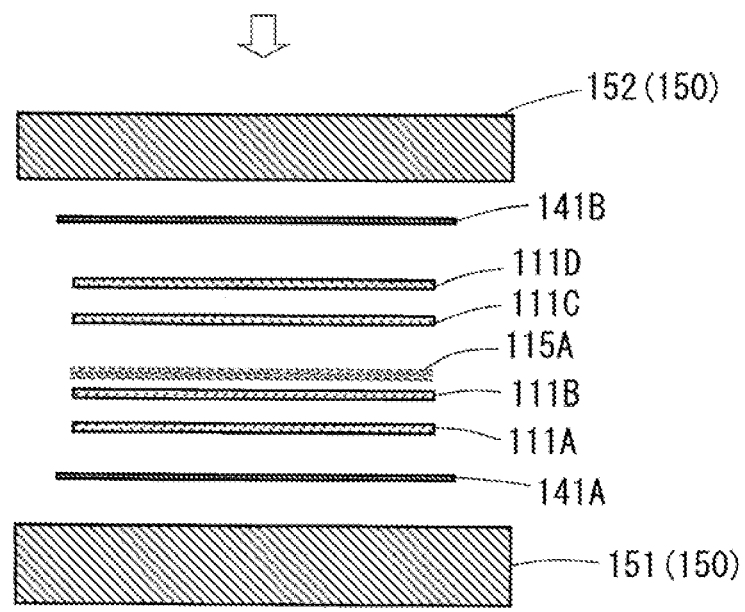

Fig. 9
(3-1)
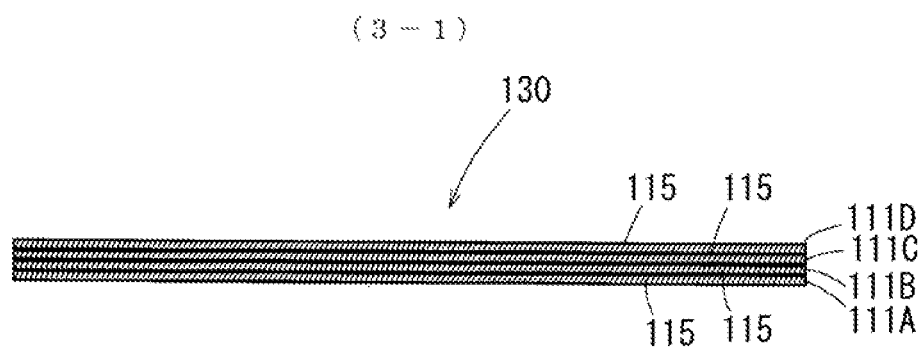
(3-2)
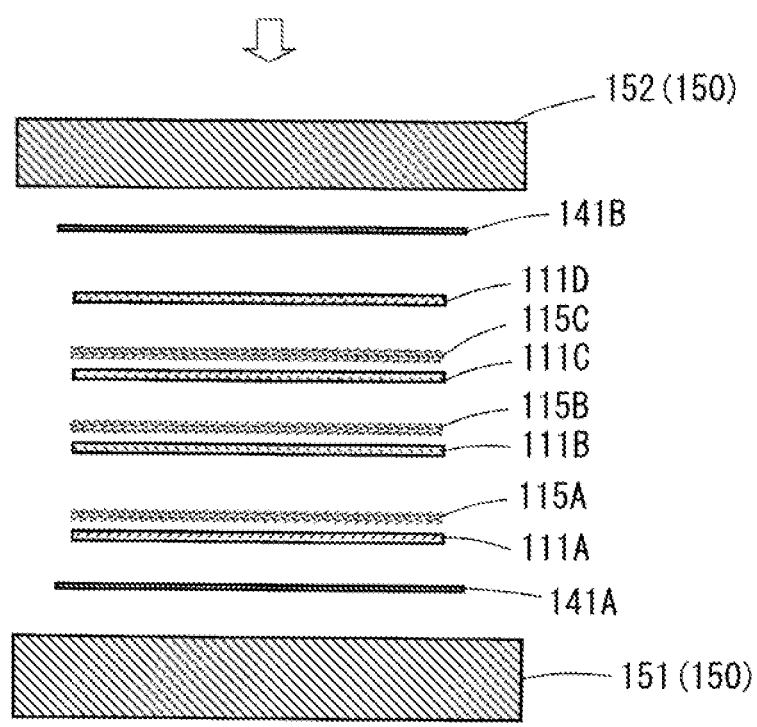

Fig. 10

| | Thermosetting resin | Melting start temperature (Ta) [°C] | Curing reaction start temperature (Tb) [°C] | Tb-Ta [°C] | Minimum viscosity [Pa·s] | Maximum viscosity [Pa·s] | (Ta+5)~(Tb-5) [°C] | (Tb-Ta)/3 [°C] | Tb+(Tb-Ta)/3 [°C] |
|---|---|---|---|---|---|---|---|---|---|
| Example 1B, 2B, 3B | Resin A2 | 69 | 135 | 66 | 59 | 8,768 | 74~130 | 22 | 157 |
| Example 4B | Resin B2 | 95 | 135 | 40 | 1,500 | 209,004 | 100~130 | 13 | 148 |
| Example 5B | Resin A2/Resin C2 = 1/1 | 73 | 140 | 67 | 22 | 5,180 | 78~135 | 22 | 163 |
| Example 6B | Resin D2/Resin E2 = 1/1 | 76 | 138 | 62 | 475 | 51,895 | 81~133 | 21 | 159 |
| Example 7B | Resin D2/Resin E2/Resin C2 = 1/1/1 | 75 | 139 | 64 | 575 | 19,025 | 80~134 | 21 | 160 |
| Comparative Example 1B | Resin F2 | 72 | 91 | 18 | 118,908 | 164,468 | 77~86 | 6 | 97 |
| Comparative Example 2B | Resin A2/Resin D2 = 1/2 | 80 | 140 | 60 | 21 | 260 | 85~135 | 20 | 160 |

Fig. 12

| | Thermosetting resin | Number of laminated fiber substrates [sheets] | Molded body thickness [mm] | VF value [%] | Flexural strength [MPa] | Flexural modulus [GPa] | Molded body appearance |
|---|---|---|---|---|---|---|---|
| Example 1B | Resin A2 | 4 | 0.8 | 58 | 610 | 52 | ○ |
| Example 2B | Resin A2 | 4 | 0.8 | 58 | 600 | 53 | ○ |
| Example 3B | Resin A2 | 4 | 0.8 | 58 | 620 | 53 | ○ |
| Example 4B | Resin B2 | 4 | 0.8 | 55 | 460 | 46 | ○ |
| Example 5B | Resin A2/Resin C2 = 1/1 | 4 | 0.8 | 57 | 980 | 60 | ○ |
| Example 6B | Resin D2/Resin E2 = 1/1 | 4 | 0.8 | 59 | 910 | 61 | ○ |
| Example 7B | Resin D2/Resin E2 = 1/1 | 4 | 0.8 | 58 | 930 | 59 | ○ |
| Comparative Example 1B | Resin F2 | 4 | — | — | — | — | × |
| Comparative Example 2B | Resin A2/Resin D2 = 1/2 | 4 | — | — | — | — | × |

Fig. 13

| | Thermosetting resin | Molded body appearance | Flexural strength [MPa] | Flexural modulus [GPa] | Flexural strength retention [%] | Flexural modulus retention [%] |
|---|---|---|---|---|---|---|
| Example 1B | Resin A2 | ○ | 570 | 48 | 93 | 92 |
| Example 4B | Resin B2 | ○ | 420 | 42 | 91 | 91 |
| Example 5B | Resin A2/Resin C2 = 1/1 | ○ | 910 | 56 | 93 | 93 |
| Example 6B | Resin D2/Resin E2 = 1/1 | ○ | 880 | 60 | 97 | 98 |
| Example 7B | Resin D2/Resin E2/Resin C2 = 1/1/1 | ○ | 880 | 56 | 95 | 95 |

Fig. 21

| | Core component | Thickness [mm] | Weight [g] | Density [kg/m³] | 5% compressive stress [MPa] |
|---|---|---|---|---|---|
| Example 1D-5D, Comparative Example 2D, 3D | PET foam | 10 | 62.4 | 100 | 0.70 |
| Example 6D | PMI foam | 5 | 10.0 | 32 | 0.16 |
| Example 7D | PVC foam | 9 | 44.9 | 80 | 0.89 |
| Comparative Example 1D | Rigid PU foam | 13 | 25.9 | 32 | 0.01 |

Fig. 22

| | Thermosetting resin | Melting start temperature (Ta) [°C] | Curing reaction start temperature (Tb) [°C] | Tb-Ta [°C] | Minimum viscosity [Pa·s] | Maximum viscosity [Pa·s] | (Tb-Ta)/3 [°C] | Tb + (Tb-Ta)/3 [°C] |
|---|---|---|---|---|---|---|---|---|
| Example 1D, 6D, 7D, Comparative Example 1D | Resin A3 | 69 | 135 | 66 | 59 | 8,768 | 22 | 157 |
| Example 2D | Resin B3 | 95 | 135 | 40 | 1,500 | 209,004 | 13 | 148 |
| Example 3D | Resin A3/Resin C3 = 1/1 | 73 | 140 | 67 | 22 | 5,180 | 22 | 163 |
| Example 4D | Resin D3/Resin E3 = 1/1 | 76 | 138 | 62 | 475 | 51,895 | 21 | 159 |
| Example 5D | Resin D3/Resin E3/Resin C3 = 1/1/1 | 75 | 139 | 64 | 575 | 19,025 | 21 | 160 |
| Comparative Example 2D | Resin F3 | 72 | 91 | 18 | 118,908 | 164,468 | 6 | 97 |
| Comparative Example 3D | Resin A3/Resin D3 = 1/2 | 80 | 140 | 60 | 21 | 260 | 20 | 160 |

Fig. 23

| | Thermosetting resin | Core component | Number of laminated fiber substrates [sheet] | Product appearance | Density [g/cm³] | Thickness [mm] | Flexural strength [MPa] | Flexural modulus [GPa] |
|---|---|---|---|---|---|---|---|---|
| Example 1D | Resin A3 | PET foam | Two sheets on upper and lower sides (plain weave) | ○ | 0.24 | 10.5 | 23 | 6.2 |
| Example 2D | Resin B3 | PET foam | | ○ | 0.26 | 10.4 | 19 | 4.3 |
| Example 3D | Resin A3/Resin C3 = 1/1 | PET foam | | ○ | 0.23 | 10.5 | 24 | 6.8 |
| Example 4D | Resin D3/Resin E3 = 1/1 | PET foam | | ○ | 0.26 | 10.6 | 30 | 7.5 |
| Example 5D | Resin D3/Resin E3/Resin C3 = 1/1/1 | PET foam | | ○ | 0.28 | 10.3 | 28 | 7.2 |
| Example 6D | Resin A3 | PMI foam | | ○ | 0.38 | 4.9 | 41 | 14.3 |
| Example 7D | Resin A3 | PVC foam | | ○ | 0.25 | 10.6 | 26 | 5.7 |
| Comparative Example 1D | Resin A3 | Rigid PU foam | | ○ | 0.21 | 12.9 | 5 | 0.6 |
| Comparative Example 2D | Resin F3 | PET foam | | × | - | - | - | - |
| Comparative Example 3D | Resin A3/Resin D3 = 1/2 | PET foam | | × | - | - | - | - |

Fig. 35

| | Thermosetting resin | Melting start temperature (Ta) [°C] | Curing reaction start temperature (Tb) [°C] | Tb-Ta [°C] | Minimum viscosity [Pa·s] | Maximum viscosity [Pa·s] | (Tb-Ta)/3 [°C] | Tb + (Tb-Ta)/3 [°C] |
|---|---|---|---|---|---|---|---|---|
| Example 1E, 6E-15E, 20E-26E | Resin A4 | 69 | 135 | 66 | 59 | 8,768 | 22 | 157 |
| Example 2E, 16E | Resin B4 | 95 | 135 | 40 | 1,500 | 209,004 | 13 | 148 |
| Example 3E, 17E | Resin A4/Resin C4 = 1/1 | 73 | 140 | 67 | 22 | 5,180 | 22 | 163 |
| Example 4E, 18E | Resin D4/Resin E4 = 1/1 | 76 | 138 | 62 | 475 | 51,895 | 21 | 159 |
| Example 5E, 19E | Resin D4/Resin E4/Resin C4 = 1/1/1 | 75 | 139 | 64 | 575 | 19,025 | 21 | 160 |
| Comparative Example 1E, 3E | Resin F4 | 72 | 91 | 18 | 118,908 | 164,468 | 6 | 97 |
| Comparative Example 2E, 4E | Resin A4/Resin D4 = 1/2 | 80 | 140 | 60 | 21 | 260 | 20 | 160 |

Fig. 36A

| | Molded body General portion | | |
|---|---|---|---|
| | Molded body thickness [mm] | Core material thickness [mm] | Compression percentage [%] |
| Example 1E | 1.0 | 0.56 | 1,686 |
| Example 2E | 1.0 | 0.56 | 1,686 |
| Example 3E | 1.0 | 0.56 | 1,686 |
| Example 4E | 1.0 | 0.56 | 1,686 |
| Example 5E | 1.0 | 0.56 | 1,686 |
| Example 6E | 1.0 | 0.56 | 971 |
| Example 7E | 1.0 | 0.56 | 257 |
| Example 8E | 1.0 | 0.56 | 3,471 |
| Example 9E | 1.0 | 0.56 | 4,900 |
| Example 10E | 0.9 | 0.46 | 2,074 |
| Example 11E | 1.1 | 0.66 | 1,415 |
| Example 12E | 1.0 | 0.56 | 1,686 |
| Example 13E | 1.0 | 0.56 | 1,686 |
| Example 14E | 1.5 | 0.62 | 1,513 |
| Example 15E | 1.0 | 0.56 | 1,329 |
| Example 16E | 1.0 | 0.56 | 1,329 |
| Example 17E | 1.0 | 0.56 | 1,329 |
| Example 18E | 1.0 | 0.56 | 1,329 |
| Example 19E | 1.0 | 0.56 | 1,329 |
| Example 20E | 1.5 | 0.62 | 706 |
| Example 21E | 1.5 | 0.62 | 706 |
| Example 22E | 1.0 | 0.56 | 1,329 |
| Example 23E | 1.0 | - | 5,257 |
| Example 24E | 1.0 | 0.56 | 168 |
| Example 25E | 0.9 | 0.46 | 2,074 |
| Example 26E | 1.0 | - | 1,686 |
| Comparative Example 1E | 1.0 | - | 1,686 |
| Comparative Example 2E | 1.0 | - | 1,686 |
| Comparative Example 3E | | | |
| Comparative Example 4E | | | |

| Molded body Protrusion | | | Molded body Recess | | |
|---|---|---|---|---|---|
| Molded body thickness [mm] | Core material thickness [mm] | Compression percentage [%] | Molded body thickness [mm] | Core material thickness [mm] | Compression percentage [%] |
| 2.0 | 1.56 | 413 | 0.6 | 0.16 | 4,900 |
| 2.0 | 1.56 | 413 | 0.6 | 0.16 | 4,900 |
| 2.0 | 1.56 | 413 | 0.6 | 0.16 | 4,900 |
| 2.0 | 1.56 | 413 | 0.6 | 0.16 | 4,900 |
| 2.0 | 1.56 | 413 | 0.6 | 0.16 | 4,900 |
| 2.5 | 1.62 | 209 | 1.1 | 0.22 | 2,173 |
| 2.5 | 1.62 | 209 | 1.1 | 0.22 | 2,173 |
| 2.0 | 1.56 | 413 | 0.6 | 0.16 | 4,900 |

FROM FIG. 36A / TO FIG. 36C

Molded body uniformly impregnated with resin could not be obtained
Deformation occurred at the time of demolding

Fig. 36C

FROM FIG. 36B

| Foam Material | Thickness [%] | Specific gravity | Weight [g] | Resin proportion [%] | Flexural strength [MPa] | Flexural modulus [GPa] | Appearance |
|---|---|---|---|---|---|---|---|
| Melamine | 10 | 1.35 | 59.7 | 70 | 500 | 45 | ○ |
| Melamine | 10 | 1.34 | 59.2 | 70 | 400 | 40 | ○ |
| Melamine | 10 | 1.35 | 59.7 | 70 | 820 | 50 | ○ |
| Melamine | 10 | 1.35 | 59.7 | 70 | 850 | 52 | ○ |
| Melamine | 10 | 1.35 | 59.7 | 70 | 860 | 53 | ○ |
| Melamine | 6 | 1.35 | 59.7 | 70 | 510 | 46 | ○ |
| Melamine | 2 | 1.35 | 59.7 | 70 | 420 | 40 | ○ |
| Melamine | 20 | 1.36 | 60.1 | 71 | 450 | 42 | ○ |
| Melamine | 28 | 1.36 | 60.1 | 71 | 400 | 39 | ○ |
| Melamine | 10 | 1.35 | 38.0 | 53 | 410 | 43 | ○ |
| Melamine | 10 | 1.37 | 73.0 | 76 | 400 | 42 | ○ |
| Urethane | 10 | 1.35 | 59.7 | 70 | 450 | 40 | ○ |
| Melamine | 10 | 1.35 | 59.7 | 70 | 500 | 44 | ○ |
| Melamine | 10 | 1.40 | 92.8 | 62 | 550 | 48 | ○ |
| Melamine | 8 | 1.35 | 59.7 | 70 | 500 | 46 | ○ |
| Melamine | 8 | 1.34 | 59.2 | 70 | 410 | 40 | ○ |
| Melamine | 8 | 1.35 | 59.7 | 70 | 820 | 51 | ○ |
| Melamine | 8 | 1.35 | 59.7 | 70 | 860 | 52 | ○ |
| Melamine | 8 | 1.35 | 59.7 | 70 | 860 | 53 | ○ |
| Melamine | 5 | 1.40 | 92.8 | 62 | 490 | 42 | ○ |
| Melamine | 5 | 1.40 | 92.8 | 62 | 490 | 42 | ○ |
| Urethane | 8 | 1.35 | 59.7 | 70 | 460 | 38 | ○ |
| Melamine | 30 | Thickness was not uniform | | | | | △ |
| Urethane | 1.5 | 1.35 | 59.7 | 70 | 300 | 24 | ○ |
| Melamine | 10 | 1.33 | 52.9 | 45 | 350 | 28 | △ |
| Melamine | 10 | Thickness was not uniform | | 85 | Thickness was not uniform | | △ |
| Melamine | 10 | Molded body uniformly impregnated with resin could not be obtained | | | | | × |
| Melamine | 10 | Deformation occurred at the time of demolding | | | | | × |
| Melamine | 8 | Molded body uniformly impregnated with resin could not be obtained | | | | | × |
| Melamine | 8 | Deformation occurred at the time of demolding | | | | | × |

FIBER-REINFORCED RESIN MOLDED BODY AND PRODUCTION METHOD THEREOF, FIBER-REINFORCED RESIN MOLDING PREPREG, FIBER-REINFORCED MOLDED BODY AND PRODUCTION METHOD OF FIBER-REINFORCED MOLDED BODY AND RESIN SHEET, FIBER-REINFORCED SANDWICH COMPOSITE, AND PRODUCTION METHOD OF FIBERREINFORCED MOLDED BODY

CROSS REFERENCE TO RELATED APPLICATIONS

This application is a National Stage of International Application No. PCT/JP2021/023675 filed Jun. 22, 2021, claiming priority based on Japanese Patent Application No. 2020-116251 filed Jul. 6, 2020; Japanese Patent Application No. 2020-171081 filed Oct. 9, 2020; Japanese Patent Application No. 2020-171814 filed Oct. 12, 2020, Japanese Patent Application No. 2020-206600 filed Dec. 14, 2020, and Japanese Patent Application No. 2021-076007 filed Apr. 28, 2021, the entire contents of which are incorporated herein by reference.

TECHNICAL FIELD

The present disclosure relates to: a fiber-reinforced resin molded body and a method for producing the fiber-reinforced resin molded body; a fiber-reinforced resin molding prepreg; a fiber-reinforced molded body, a method for producing the fiber-reinforced molded body, and a resin sheet; a fiber-reinforced sandwich composite; and a method for producing the fiber-reinforced molded body.

BACKGROUND ART

In recent years, for the purpose of weight reduction and improvement of mechanical strength, fiber-reinforced resin molded bodies made of a composite material including: a fiber substrate made of carbon fiber, glass fiber or the like; and a thermosetting resin are widely used in various fields and applications.

In particular, in transportation equipment such as automobiles, railways, and airplanes, there is a high demand for low fuel consumption, and the effect of low fuel consumption provided by weight reduction of vehicles and airframes is high. Therefore, fiber-reinforced resin molded bodies having excellent lightweight properties are expected as alternative materials for metal.

As a method for producing a fiber-reinforced resin molded body, there is a method in which a fiber substrate is impregnated with a thermosetting resin to form a prepreg, and then the prepreg is molded using an autoclave, a hot press, or the like.

The thermosetting resin which is impregnated into the fiber substrate in the preparation of the prepreg is generally liquid. However, a liquid resin has a problem of a pot life, and there is also a problem of working environment and air pollution when a solvent is used.

As a method for solving these problems, a prepreg prepared by using a powder resin has been proposed (Patent Literature 1).

In addition, as a molding method not using a prepreg, there is a method (RTM method) in which a preform is prepared from a fiber substrate, the preform is inserted into a mold, and then a liquid resin is injected into the mold and cured to obtain a molded body.

In addition, a lightweight fiber-reinforced sandwich composite obtained by laminating a prepreg and a core component and heat-pressing the laminate has been proposed (Patent Literature 2).

CITATIONS LIST

Patent Literature

Patent Literature 1: JP 2006-232915 A
Patent Literature 2: JP 2020-44811 A

SUMMARY OF INVENTION

Technical Problems

However, in the molding method using a prepreg, regardless of whether a liquid resin or a powdery resin is used, there is a problem that the production cost of the fiber-reinforced resin molded body increases because a large-scale facility is required for a process of forming the prepreg, and management of the process of forming the prepreg is complicated.

Further, the RTM method not using a prepreg requires preparation of a preform, and requires equipment for injecting a liquid resin into a mold at a high pressure in a predetermined amount. Thus, the RTM method has a problem that the production cost of the fiber-reinforced resin molded body increases as in the case of using the prepreg.

In addition, a prepreg formed by using a conventional powder resin (Patent Literature 1) requires a complicated process of once melt-kneading a plurality of solid epoxy resins, a tetracarboxylic acid dianhydride, and a curing accelerator to prepare an epoxy resin composition, and then pulverizing the epoxy resin composition to prepare a powder resin, which is a factor of cost increase. In addition, since the epoxy resin composition as a base of the powder resin contains the curing accelerator, there is a possibility that curing by the curing accelerator may proceed even after preparation of the prepreg formed by using the powder resin. Therefore, such a prepreg does not have sufficient storage stability, and may affect the quality of a fiber-reinforced resin molded body molded from the prepreg.

In addition, the conventional prepreg has poor storage stability because a curing reaction gradually proceeds even at normal temperature during storage until use. Such a prepreg with poor storage stability may affect the quality of a fiber-reinforced resin molded body or a sandwich structure obtained using the stored prepreg.

The present disclosure has been made to solve at least one of the above-described problems.

Solutions to Problems

First Aspect

A fiber-reinforced resin molded body obtained by heat-compressing a fiber substrate together with a thermosetting resin so that the thermosetting resin is impregnated into the fiber substrate and cured, wherein
  the thermosetting resin cured is obtained by melting a powder of the thermosetting resin disposed in contact with the fiber substrate and curing the thermosetting resin during the heat compression.

The fiber-reinforced molded body wherein the fiber substrate is composed of a plurality of layers.

A method for producing a fiber-reinforced resin molded body by heat-compressing a fiber substrate together with a thermosetting resin so that the thermosetting resin is impregnated into the fiber substrate and cured, the method including:
  disposing a powder of the thermosetting resin in contact with the fiber substrate; and
  heat-compressing the fiber substrate together with the powder of the thermosetting resin by a mold so that the powder of the thermosetting resin is melted, impregnated into the fiber substrate, and cured.

The method for producing a fiber-reinforced resin molded body, wherein the fiber substrate has a plurality of layers, and the powder of the thermosetting resin is disposed on at least one surface of the plurality of layers of the fiber substrate.

The method for producing a fiber-reinforced resin molded body, wherein a temperature $Tc°$ C. of the mold is a temperature satisfying $$[Tb+(Tb-Ta)/3]-15 \leq Tc \leq [Tb+(Tb-Ta)/3]+20,$$

wherein a melting start temperature of the thermosetting resin is $Ta°$ C. and a curing reaction start temperature of the thermosetting resin is $Tb°$ C.

The method for producing a fiber-reinforced resin molded body, wherein a value of (Tb−Ta) of the thermosetting resin satisfies $$30 \leq (Tb-Ta) \leq 100,$$

wherein a melting start temperature of the thermosetting resin is $Ta°$ C. and a curing reaction start temperature of the thermosetting resin is $Tb°$ C.

The method for producing a fiber-reinforced resin molded body, wherein the thermosetting resin has a minimum viscosity of 2,000 Pa·s or less at a melting start temperature of $Ta°$ C. or higher.

The method for producing a fiber-reinforced resin molded body, wherein the thermosetting resin has a maximum viscosity of 1,000 Pa·s or more in a temperature range of a curing reaction start temperature $Tb°$ C. to 190° C.

The method for producing a fiber-reinforced resin molded body, wherein the thermosetting resin has a melting start temperature $Ta°$ C. of 60 to 100° C.

The method for producing a fiber-reinforced resin molded body, wherein the thermosetting resin is a resin selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin.

Second Aspect

A fiber-reinforced resin molding prepreg, the prepreg being obtained by heat-compressing a fiber substrate together with a thermosetting resin,
  wherein the thermosetting resin before heat compression is in a form of a powder, and the thermosetting resin has a viscosity of 2,000 Pa·s or less at a curing reaction start temperature $Tb°$ C., and a maximum viscosity of 1,000 Pa·s or more in a temperature range of the curing reaction start temperature $Tb°$ C. to 190° C.

The fiber-reinforced resin molding prepreg, wherein the thermosetting resin has a melting start temperature $Ta°$ C. of 60 to 100° C.

The fiber-reinforced resin molding prepreg, wherein in the thermosetting resin, a value obtained by subtracting the melting start temperature $Ta°$ C. from the curing reaction start temperature $Tb°$ C. satisfies $$30 \leq (Tb-Ta) \leq 100.$$

The fiber-reinforced resin molding prepreg, wherein a melting start temperature $Ta°$ C. of the thermosetting resin is equal to or lower than a temperature during the heat compression, and the curing reaction start temperature $Tb°$ C. of the thermosetting resin is equal to or higher than the temperature during the heat compression.

The fiber-reinforced resin molding prepreg, wherein
  in the thermosetting resin, the melting start temperature $Ta°$ C. is the temperature during the heat compression minus 5° C. or lower, and
  the curing reaction start temperature $Tb°$ C. is the temperature during heat compression plus 5° C. or higher.

The fiber-reinforced resin molding prepreg, wherein the thermosetting resin is a resin selected from the group consisting of a phenol resin, a mixed resin of a phenol resin and an epoxy resin, a mixed resin of a phenol resin and a cyanate resin, and a mixed resin of a phenol resin, an epoxy resin, and a cyanate resin.

A fiber-reinforced resin molded body obtained by curing the fiber-reinforced resin molding prepreg through heat compression.

Third Aspect

A fiber-reinforced molded body including: a fiber substrate; and a resin sheet containing a thermosetting resin, the fiber substrate being integrated by the thermosetting resin of the resin sheet, wherein
  the thermosetting resin has a viscosity of 2,000 Pa·s or less at a curing reaction start temperature $Tb°$ C., and a maximum viscosity of 1,000 Pa·s or more in a temperature range of the curing reaction start temperature $Tb°$ C. to 190° C.

The fiber-reinforced molded body, wherein the resin sheet includes a sheet substrate.

The fiber-reinforced molded body, wherein, in the thermosetting resin, a value of (Tb−Ta) satisfies $$30 \leq (Tb-Ta) \leq 100,$$

wherein a melting start temperature of the thermosetting resin is $Ta°$ C. and a curing reaction start temperature of the thermosetting resin is $Tb°$ C.

The fiber-reinforced molded body, wherein the thermosetting resin is a resin selected from the group consisting of a phenol resin, a mixed resin of a phenol resin and an epoxy resin, a mixed resin of a phenol resin and a cyanate resin, a mixed resin of an epoxy resin and a cyanate resin, and a mixed resin of a phenol resin, an epoxy resin, and a cyanate resin.

A method for producing the fiber-reinforced molded body, the method including:
  heat-compressing the fiber substrate and the resin sheet by a mold in a state in which the fiber substrate and the resin sheet are stacked, so that the thermosetting resin is impregnated into the fiber substrate and cured.

The method for producing a fiber-reinforced molded body, wherein a temperature $Tc°$ C. during heat compression is a temperature satisfying $$[Tb+(Tb-Ta)/3]-15 \leq Tc \leq [Tb+(Tb-Ta)/3]+20.$$

A resin sheet for producing a fiber-reinforced molded body, the resin sheet containing a thermosetting resin.

Fourth Aspect

A fiber-reinforced sandwich composite including: a fiber substrate; and a core component, the fiber substrate and the core component being bonded and integrated by being laminated and heat-compressed together with a thermosetting resin,
  wherein the core component has a 5% compressive stress of 0.10 MPa or more,
  the thermosetting resin before heating is in a form of a powder, and
  the thermosetting resin has a viscosity of 2,000 Pa·s or less at a curing reaction start temperature Tb° C., and a maximum viscosity of 1,000 Pa·s or more in a temperature range of the curing reaction start temperature Tb° C. to 190° C.

The fiber-reinforced sandwich composite, wherein a melting start temperature Ta° C. and a curing reaction start temperature Tb° C. of the thermosetting resin are temperatures satisfying $$[Tb+(Tb-Ta)/3]-15 \leq Tc \leq [Tb+(Tb-Ta)/3]+20$$

with respect to a temperature Tc° C. during heat compression.

The fiber-reinforced sandwich composite, wherein in the thermosetting resin, a value obtained by subtracting the melting start temperature Ta° C. from the curing reaction start temperature Tb° C. satisfies $$30 \leq (Tb-Ta) \leq 100.$$

The fiber-reinforced sandwich composite, wherein the thermosetting resin has a melting start temperature Ta° C. of 60 to 100° C.

The fiber-reinforced sandwich composite, wherein the core component is a foam having a closed cell structure.

The fiber-reinforced sandwich composite, wherein the thermosetting resin is a resin selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin.

Fifth Aspect

A method for producing a fiber-reinforced molded body including a core material obtained by impregnating a thermosetting resin into a resin foam and curing the thermosetting resin; and a fiber reinforcing material obtained by impregnating the thermosetting resin into a fiber substrate and curing the thermosetting resin, the core material and the fiber reinforcing material being laminated and integrated, wherein
  the resin foam has an open-cell structure,
  the method including:
  forming a pre-molding laminate with the resin foam having an open-cell structure, the thermosetting resin, and the fiber substrate; and
  heat-compressing the pre-molding laminate so that the thermosetting resin is melted, and the thermosetting resin melted is impregnated into the resin foam having an open-cell structure and the fiber substrate, and cured.

The method for producing a fiber-reinforced molded body, wherein in the pre-molding laminate, the fiber substrate is disposed on both sides of the resin foam having an open-cell structure.

The method for producing a fiber-reinforced molded body, wherein the thermosetting resin in the pre-molding laminate is in a form of a powder, and has a viscosity of 2,000 Pa·s or less at a curing reaction start temperature Tb° C. and a maximum viscosity of 1,000 Pa·s or more in a temperature range of the curing reaction start temperature Tb° C. to 190° C.

The method for producing a fiber-reinforced molded body, wherein a melting start temperature Ta° C. and a curing reaction start temperature Tb° C. of the thermosetting resin are temperatures satisfying $$[Tb+(Tb-Ta)/3]-15 \leq Tc \leq [Tb+(Tb-Ta)/3]+20$$

in a relationship between a temperature Tc° C. during heat compression.

The method for producing a fiber-reinforced molded body, wherein in the thermosetting resin, a value obtained by subtracting the melting start temperature Ta° C. from the curing reaction start temperature Tb° C. satisfies $$30 \leq (Tb-Ta) \leq 100.$$

The method for producing a fiber-reinforced molded body, wherein the thermosetting resin has a melting start temperature Ta° C. of 60 to 100° C.

The method for producing a fiber-reinforced molded body, wherein a resin proportion defined by Equation (A1) is 50 to 80%.

[Mathematical Formula 1]

$$\text{Resin proportion} = \frac{\text{Weight of fiber-reinforced molded body} - \text{Total weight of fiber substrate and resin foam before molding}}{\text{Weight of fiber-reinforced molded body}} \times 100 \quad (A1)$$

The method for producing a fiber-reinforced molded body, wherein a compression percentage defined by Equation (A2) is 200 to 5,000%.

[Mathematical Formula 2]

$$\text{Compression percentage} = \frac{\text{Thickness of resin foam before molding} - \text{Thickness of core material of fiber-reinforced molded body}}{\text{Thickness of core material of fiber-reinforced molded body}} \times 100 \quad (A2)$$

The method for producing a fiber-reinforced molded body, wherein the thermosetting resin is a resin selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin.

A fiber-reinforced molded body including: a core material obtained by impregnating a thermosetting resin into a resin foam having an open-cell structure and curing the thermosetting resin; and a fiber reinforcing material obtained by impregnating a fiber substrate with the thermosetting resin and curing the thermosetting resin, the core material and the fiber reinforcing material being laminated and integrated, wherein
  the thermosetting resin has a viscosity of 2,000 Pa·s or less at a curing reaction start temperature Tb° C., and a maximum viscosity of 1,000 Pa·s or more in a temperature range of the curing reaction start temperature Tb° C. to 190° C.

Advantageous Effects of Invention

First Aspect

According to the fiber-reinforced resin molded body of the first aspect, by using the powder of the thermosetting resin disposed in contact with the fiber substrate, a fiber-reinforced resin molded body having high strength and high rigidity can be obtained without requiring a solvent, without a risk of environmental pollution, and without a pot life.

According to the invention of the method for producing a fiber-reinforced resin molded body, the powder of the thermosetting resin is disposed in contact with the fiber substrate, and the fiber substrate is heat-compressed together with the powder of the thermosetting resin to produce a fiber-reinforced resin molded body. The production method according to the invention thus does not require preparation of prepreg, or preparation of preform as in the RTM method, does not require a solvent for liquid thermosetting resin, which eliminates a risk of environmental pollution, and there is no pot life of the thermosetting resin. As a result, a fiber-reinforced resin molded body having high strength and high rigidity can be produced easily and inexpensively, and safely without the risk of environmental pollution.

When the fiber substrate is heat-compressed together with the powder of the thermosetting resin, with the temperature $Tc°$ C. of the mold set to a temperature satisfying $[Tb+(Tb-Ta)/3]-15 \leq Tc \leq [Tb+(Tb-Ta)/3]+20$ with respect to the melting start temperature $Ta°$ C. and the curing reaction start temperature $Tb°$ C. of the thermosetting resin, melting of the powder of the thermosetting resin in contact with the fiber substrate is improved, so that the thermosetting resin is easily impregnated into the fiber substrate. As a result, a fiber-reinforced resin molded body having uniform physical properties can be produced with high production efficiency.

When the thermosetting resin satisfies the relationship of $30 \leq (Tb-Ta) \leq 100$, the melted thermosetting resin can be sufficiently impregnated into the fiber substrate, and a fiber-reinforced resin molded body having uniform physical properties can be produced.

When the thermosetting resin has a minimum viscosity of 2,000 Pa·s or less at the melting start temperature of $Ta°$ C. or higher, the melted thermosetting resin can be sufficiently impregnated into the fiber substrate, and a fiber-reinforced resin molded body having uniform physical properties can be produced.

When the thermosetting resin has a maximum viscosity of 1,000 Pa·s or more in a temperature range of the curing reaction start temperature $Tb°$ C. to 190° C., the melted thermosetting resin can be impregnated into the fiber substrate and retained therein. As a result, the shapability of the fiber-reinforced resin molded body is good, and sufficient strength can be obtained in a short time.

When the melting start temperature $Ta°$ C. of the thermosetting resin is 60 to 100° C., temperature control is easy when the fiber substrate is heat-compressed together with the powder of the thermosetting resin to melt and cure the thermosetting resin.

When the thermosetting resin is a resin selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin, a fiber-reinforced resin molded body excellent in strength and flame retardancy can be obtained.

Second Aspect

According to the means of the second aspect, it is possible to obtain a prepreg that can be prepared simply and inexpensively and has good storage stability, and a fiber-reinforced resin molded body that is prepared from the prepreg and has good quality.

Third Aspect

The fiber-reinforced molded body of the third aspect can be produced at low cost.

Fourth Aspect

According to the fourth aspect, it is possible to obtain a fiber-reinforced sandwich composite that is integrated with a core component and can be produced easily, inexpensively, and safely without a risk of environmental pollution, without using a prepreg and without concern for storage stability of a prepreg.

Fifth Aspect

According to the fifth aspect, a fiber-reinforced molded body can be obtained without using a prepreg. In addition, according to the fifth aspect, a fiber-reinforced molded body shaped into an irregularity shape can also be obtained.

BRIEF DESCRIPTION OF DRAWINGS

FIG. 4 is a table showing melting start temperatures, reaction start temperatures, and the like of thermosetting resins used in Examples and Comparative Examples according to the first aspect.

FIG. 5 is a table showing configurations, physical property values, and the like of Examples and Comparative Examples according to the first aspect.

FIG. 8 is a cross-sectional view showing a fiber-reinforced resin molding prepreg according to a second embodiment of the second aspect, and heat compression in the preparation of the prepreg.

FIG. 9 is a cross-sectional view showing a fiber-reinforced resin molding prepreg according to a third embodiment of the second aspect, and heat compression in the preparation of the prepreg.

FIG. 10 is a table showing melting start temperatures, curing reaction start temperatures, and the like of thermosetting resins used in fiber-reinforced resin molding prepregs in Examples and Comparative Examples according to the second aspect.

FIG. 12 is a table showing configurations, physical property values, and the like of fiber-reinforced resin molded bodies prepared from fiber-reinforced resin molding prepregs in Examples and Comparative Examples according to the second aspect.

FIG. 13 is a table showing appearances, physical properties, and the like of fiber-reinforced resin molded bodies prepared by using fiber-reinforced resin molding prepregs of Examples 1B and 4B to 7B according to the second aspect, the prepregs being used 90 days after preparation.

FIG. 21 is a table showing materials, thicknesses, and the like of core components used in Examples and Comparative Examples according to the fourth aspect.

FIG. 22 is a table showing melting start temperatures, curing reaction start temperatures, and the like of thermosetting resins used in Examples and Comparative Examples according to the fourth aspect.

FIG. 23 is a table showing configurations, physical property values, and the like of Examples and Comparative Examples according to the fourth aspect.

FIG. 35 is a table showing types, melting start temperatures, curing reaction start temperatures, and the like of powdery thermosetting resins used in Examples and Comparative Examples according to the fifth aspect.

FIG. 36 is a table, split across multiple sheets labeled as views FIGS. 36A-36C because it is too large to fit on a single sheet within the margins, showing configurations, physical property values, and the like of Examples and Comparative Examples according to the fifth aspect.

DESCRIPTION OF EMBODIMENTS

Figure 1:
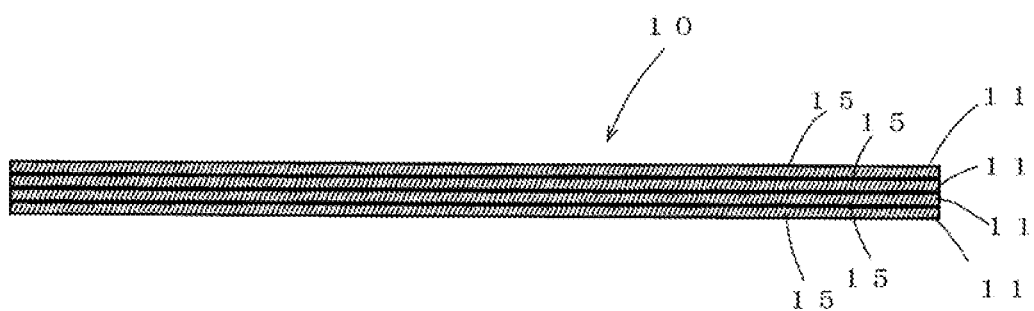
FIG. 1 is a cross-sectional view of a fiber-reinforced resin molded body according to an embodiment of the first aspect.

Hereinafter, the present disclosure will be described in detail. In the present specification, the description using "to" for the numerical range includes the lower limit and the upper limit unless otherwise specified. For example, the expression "10 to 20" includes both the lower limit value "10" and the upper limit value "20". That is, the expression "10 to 20" has the same meaning as "10 or more and 20 or less".

First Aspect

An embodiment of the first aspect will be described. In a fiber-reinforced resin molded body 10 of an embodiment shown in FIG. 1, a plurality of laminated fiber substrates 11 are heat-compressed together with a thermosetting resin 15, and shaped and integrated by curing of the thermosetting resin 15.

The fiber substrate 11 may be a single layer or a plurality of layers, and the number of layers is determined according to, for example, the use of the fiber-reinforced resin molded body 10. In the illustrated form, the fiber substrate 11 is composed of four layers. Examples of the fiber substrate 11 include woven fabrics and nonwoven fabrics made of glass fibers, aramid fibers, basalt fibers, and carbon fibers, but are not particularly limited thereto. The fiber substrate 11 is preferably a carbon fiber woven fabric because it is excellent in lightweight and high rigidity. The carbon fiber woven fabric is preferably a woven fabric in which fibers are not unidirectional. Preferred examples thereof include plain weave, twill weave, satin weave, all of which are constituted of warp and weft, and triaxial weave which is constituted of threads in three directions. The carbon fiber woven fabric preferably has a fiber weight of 50 to 600 g/m² from the viewpoint of impregnation of the thermosetting resin 15 and rigidity of the fiber-reinforced resin molded body 10.

As the thermosetting resin 15, a solid powder is used in the production of the fiber-reinforced resin molded body 10. The shape of the powder is not particularly limited, and examples thereof include a spherical shape, a needle shape, and a flake shape. The thermosetting resin powder is disposed in contact with the fiber substrate 11, and when the fiber substrate 11 is heat-compressed together with the thermosetting resin powder, the thermosetting resin powder is melted, impregnated into the fiber substrate 11, and cured. As a form of disposing the thermosetting resin powder in contact with the fiber substrate 11, the following forms are exemplified. When the fiber substrate 11 is a single layer, the thermosetting resin powder is disposed on at least one of the upper surface and the lower surface of the single layer of the fiber substrate 11, and when the fiber substrate 11 is a plurality of layers, the thermosetting resin powder is disposed on at least one surface, that is, at least one surface among the uppermost surface, the lowermost surface, and the lamination surface (between fiber substrates) of the plurality of layers.

The thermosetting resin 15 preferably satisfies $30 \leq (Tb-Ta) \leq 100$, and more preferably $40 \leq (Tb-Ta) \leq 70$, when the melting start temperature is Ta° C. and the curing reaction start temperature is Tb° C. When the value of (Tb−Ta) is in this range, the melted thermosetting resin 15 can be sufficiently impregnated into the fiber substrate 11, so that the fiber-reinforced resin molded body 10 having uniform physical properties can be obtained.

The thermosetting resin 15 has a minimum viscosity of preferably 2,000 Pa·s or less, more preferably 1,500 Pa·s or less at a melting start temperature of Ta° C. or higher. When the minimum viscosity is in this range, the melted thermosetting resin 15 can be sufficiently impregnated into the fiber substrate 11, so that the fiber-reinforced resin molded body 10 having uniform physical properties can be obtained.

The thermosetting resin 15 preferably has a maximum viscosity of 1,000 Pa·s or more in a temperature range of the curing reaction start temperature Tb° C. to 190° C. When the maximum viscosity is in this range, the melted thermosetting resin 15 can be impregnated into the fiber substrate 11 and retained therein. As a result, the shapability of the fiber-reinforced resin molded body 10 is good, and sufficient strength can be obtained in a short time.

The thermosetting resin 15 preferably has a melting start temperature Ta° C. of 60 to 100° C. When the melting start temperature Ta° C. of the thermosetting resin 15 is in this range, temperature control can be easily performed when the laminate in which a powder of the thermosetting resin 15 is disposed between at least any two adjacent fiber substrates 11 is heat-compressed to melt and cure the thermosetting resin 15.

The thermosetting resin that can satisfy the melting start temperature Ta° C., the curing reaction start temperature Tb° C., the range of the value of (Tb−Ta), the minimum viscosity, and the maximum viscosity as described above is preferably selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin. The phenol resin is excellent in flame retardancy, and thus can impart excellent strength and flame retardancy to the fiber-reinforced resin molded body 10.

Various powder additives such as a pigment, an antibacterial agent, and an ultraviolet absorber may be added to the thermosetting resin 15 as long as the viscosity and reactivity of the thermosetting resin are not affected.

The method for producing a fiber-reinforced resin molded body according to the present aspect is performed by disposing a thermosetting resin powder in contact with a fiber substrate; and heat-compressing the fiber substrate together with the thermosetting resin powder by a mold so that the thermosetting resin powder is melted, impregnated into the fiber substrate, and cured. The fiber substrate and the thermosetting resin are as described above for the fiber-reinforced resin molded body 10.

The form of disposing the thermosetting resin powder is as described above, i.e., when the fiber substrate is a single layer, the thermosetting resin powder is disposed on at least one of the upper surface and the lower surface of the fiber substrate, and when the fiber substrate is a plurality of layers, the thermosetting resin powder is disposed on at least one of the uppermost surface, the lowermost surface, and the lamination surface (between fiber substrates) of a plurality of layers.

When the thermosetting resin powder is disposed on the lamination surface (between fiber substrates) of a plurality of layers of the fiber substrate, the thermosetting resin powder may be disposed on not only one lamination surface (between two adjacent fiber substrates), but also on all lamination surfaces (between all fiber substrates) or on every predetermined number of lamination surfaces (between every predetermined number of fiber substrates). The position of the surface where the powder is to be disposed and the number of surfaces where the powder is to be disposed are appropriately determined according to, for example, the number of laminated fiber substrates.

When the thermosetting resin powder is disposed in contact with the upper surface or the lower surface of the single layer of the fiber substrate or the uppermost surface or the lowermost surface of the plurality of layers of the fiber substrate, a mold release paper may be disposed between the thermosetting resin powder and the mold surface of the mold for convenience of operation.

An embodiment of a method for producing the fiber-reinforced resin molded body 10 including the fiber substrate 11 composed of four layers as shown in FIG. 1, will be described with reference to FIG. 2. In the following description of the production method, the plurality of fiber substrates 11 are denoted by a combined reference numeral of "11" and "alphabet", such as "11A", in order to easily grasp the vertical positional relationship in the plurality of fiber substrates 11.

Figure 2:
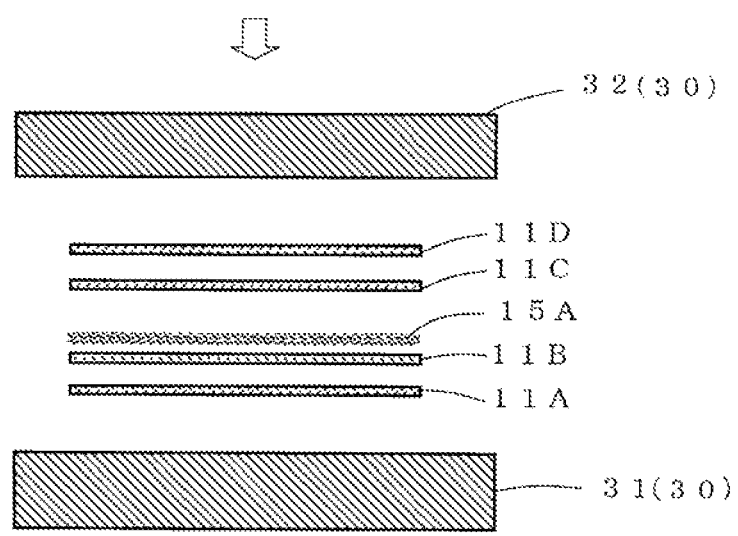
FIG. 2 is a cross-sectional view showing lamination and heat compression in an embodiment of a method for producing a fiber-reinforced resin molded body of the first aspect.

In the embodiment shown in FIG. 2, when four fiber substrates 11A to 11D are laminated, a thermosetting resin powder 15A is disposed between lower two fiber substrates 11A and 11B and upper two fiber substrates 11C and 11D (between the fiber substrate 11B and the fiber substrate 11C). The particle size of the thermosetting resin powder 15A is preferably 10 to 500 μm from the viewpoint of ease of melting. The amount of the thermosetting resin powder 15A is preferably adjusted so that the VF value (%) of the molded body is 40 to 70%. The VF value (%) is a value calculated by (total weight of fiber substrate/density of fiber)/(volume of molded body)×100.

A laminate of the fiber substrates 11A to 11D, the laminate being prepared by disposing the thermosetting resin powder 15A between the fiber substrates 11B and 11C and laminating the fiber substrates, is sandwiched between a lower mold 31 and an upper mold 32 of a mold 30 that has been heated, and then the laminate is heat-compressed. The mold 30 is heated by a heating unit such as an electric heater to a temperature Tc° C. at which the thermosetting resin powder 15A can be melted and cured.

The temperature Tc° C. of the mold 30 is set to a temperature satisfying preferably $[Tb+(Tb-Ta)/3]-15 \leq Tc \leq [Tb+(Tb-Ta)/3]+20$, more preferably $[Tb+(Tb-Ta)/3]-10 \leq Tc \leq [Tb+(Tb-Ta)/3]+20$ with respect to the melting start temperature Ta° C. and the curing reaction start temperature Tb° C. of the thermosetting resin. For example, when Ta° C. is 70° C. and Tb° C. is 130° C., Tc° C. is 140° C. to 170° C.

Pressurization (compression) of the fiber substrates 11A to 11D during heat compression by the mold 30 is preferably 2 to 20 MPa so that the melted thermosetting resin of the thermosetting resin powder 15A between the fiber substrates can be satisfactorily impregnated into the fiber substrates 11A to 11D.

The compression percentage (%) of the fiber substrates 11A to 11D is a value calculated as (distance between mold surface of lower mold 31 and mold surface of upper mold 32)/(total thickness of all layers of fiber substrate)×100, and is preferably 60 to 100%.

The thermosetting resin powder 15A between the fiber substrates (between the fiber substrate 11B and the fiber substrate 11C) is melted through heating of the laminate by the mold 30, and the melted thermosetting resin is impregnated into the fiber substrates 11B and 11A on the lower side and the fiber substrates 11C and 11D on the upper side through compression of the laminate. Then, the thermosetting resin that has been impregnated into the fiber substrates 11A to 11D is cured, whereby the fiber substrates 11A to 11D are integrated in a compressed state. Thus, the fiber-reinforced resin molded body 10 of FIG. 1, which is shaped into the shape of the mold surface of the lower mold 31 and the upper mold 32, is obtained.

Figure 3:
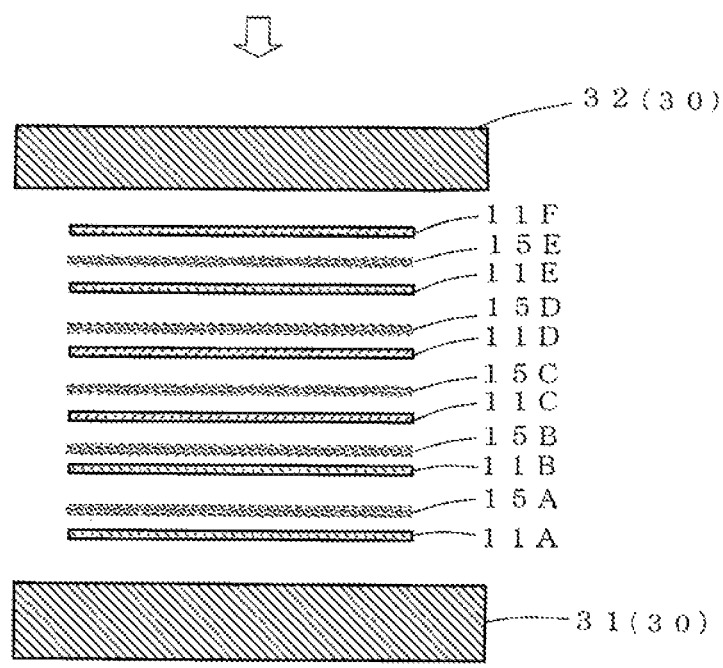
FIG. 3 is a cross-sectional view showing lamination and heat compression in another embodiment of the method for producing a fiber-reinforced resin molded body of the first aspect.

FIG. 3 shows an embodiment in which six fiber substrates 11A to 11F are laminated, thermosetting resin powders 15A to 15E are disposed between all the fiber substrates, and the laminate is heat-compressed by the mold 30.

The amount (total amount) of the thermosetting resin powder 15A, the heating temperature of the mold 30, the pressurization of the laminate, and the like are as described in the embodiment of FIG. 2.

Examples

Fiber-reinforced resin molded bodies of Examples 1A to 7A and Comparative Examples 1A and 2A were prepared as follows using the thermosetting resins shown in FIG. 4. The viscosity of the thermosetting resin was measured under the following conditions using a rheometer Rheosol-G3000, manufactured by UBM.
1) An amount of 0.4 g of a sample is formed into pellets (diameter φ: 18 mm, thickness: about 0.4 mm), and the formed pellets are sandwiched between parallel plates having a diameter φ of 18 mm.
2) The dynamic viscosity was measured at 2° C. intervals over a temperature range of 40° C. to 200° C. at a temperature rising rate of 5° C./min, a frequency of 1 Hz, and a rotation angle (strain) of 0.1 deg under constant temperature rising.

Preparation of Example 1A

As the fiber substrate, four sheets of carbon fiber woven fabric (manufactured by Teijin Limited, product name: W-3101, weight per unit area: 200 g/m², thickness: 0.22 mm) each cut into 250×200 mm were prepared. The weight of the cut fiber substrate was 10 g per sheet. Two fiber substrates were laminated, 25 g of a resin A1 as the thermosetting resin powder was disposed thereon substantially uniformly, and then the remaining two fiber substrates were laminated thereon to prepare a pre-molding laminate.

The resin A1 is a phenol resin (manufactured by Sumitomo Bakelite Co., Ltd., product name: PR-50252) having an average particle size of 30 μm, a melting start temperature Ta of 69° C., a reaction start temperature Tb of 135° C., a value of (Tb−Ta) of 66° C., a minimum viscosity (minimum viscosity at a temperature of the melting start temperature Ta° C. or higher) of 59 Pa·s, a maximum viscosity (maximum viscosity in a temperature range of the curing reaction start temperature Tb° C. to 190° C.) of 8,768 Pa·s, a value of (Tb−Ta)/3 of 22° C., and a value of Tb+(Tb−Ta)/3 of 157° C.

Figure 6:
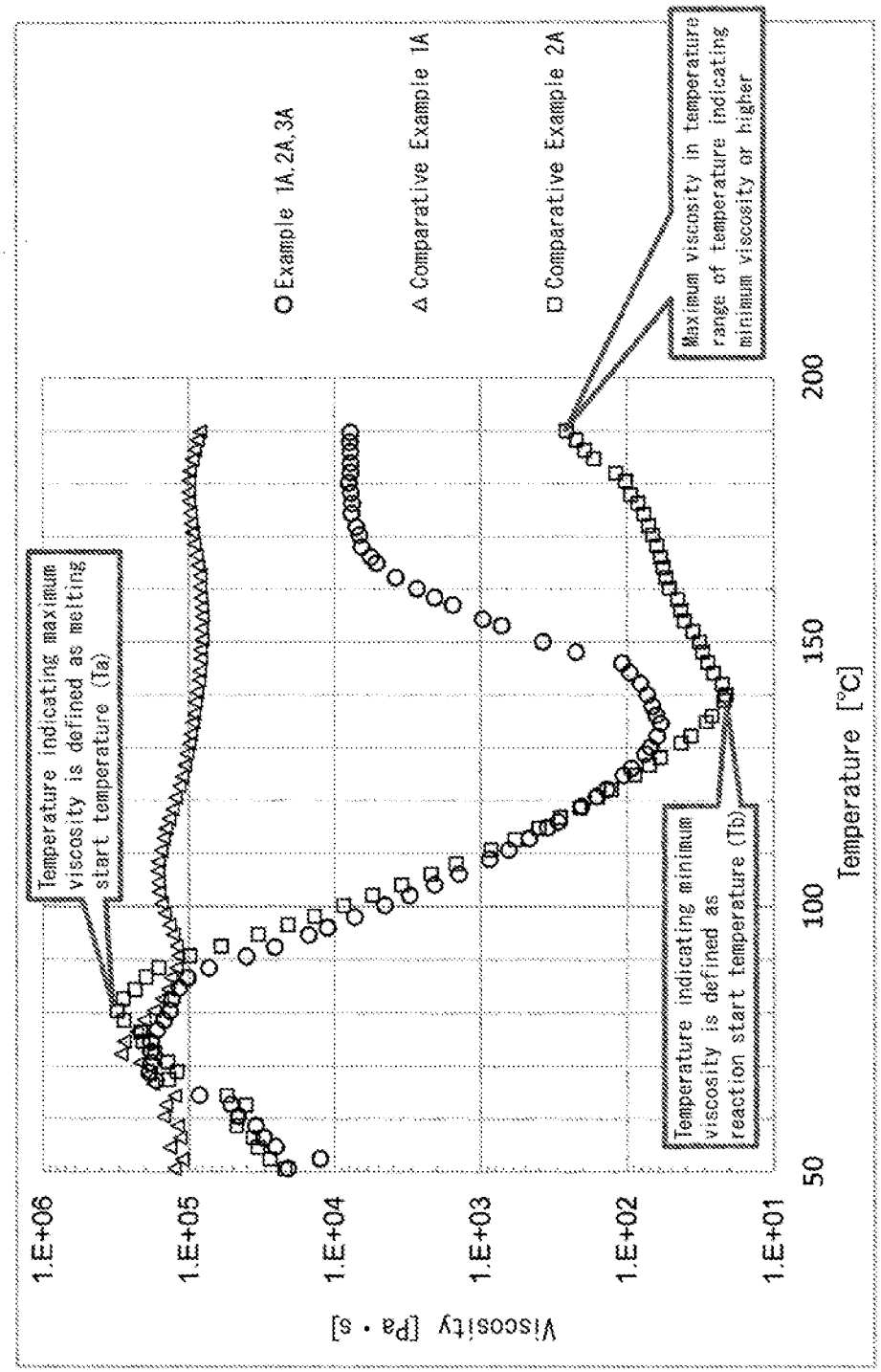
FIG. 6 is a graph showing results of viscosity measurement of thermosetting resins used in Examples 1A to 3A and Comparative Examples 1A and 2A according to the first aspect.

The results of viscosity measurement of the resin A1 (Examples 1A, 2A, 3A) are shown in the graph of FIG. 6.

The pre-molding laminate was disposed on a molding surface (mold surface) of a lower mold of a mold heated to 150° C., and an upper mold of the mold was placed on the pre-molding laminate to close the mold. The laminate was heat-compressed at a pressure of 5 MPa and 150° C. for 10 minutes. The thermosetting resin powder disposed between the fiber substrates at the center was melted by heating, and impregnated into the respective layers of the fiber substrates by compression of the pre-molding laminate, and in this state, curing of the thermosetting resin was completed. Thus, a fiber-reinforced resin molded body of Example 1A composed of an integrated laminate product in which the thermosetting resin was impregnated into four layers of fiber substrates and cured, was prepared.

Preparation of Example 2A

A fiber-reinforced resin molded body of Example 2A was prepared by heat-compressing under the same conditions as in Example 1A except that the same four fiber substrates and resin A1 as in Example 1A were used, and 8.3 g of the resin A1 (the total amount of the resin A1 between all the substrates: 24.9 g) was disposed between the respective fiber substrates (between all the fiber substrates) substantially uniformly to prepare a pre-molding laminate.

Preparation of Example 3A

A fiber-reinforced resin molded body of Example 3A was prepared by heat-compressing under the same conditions as in Example 1A except that the same ten fiber substrates as in Example 1A were prepared, five fiber substrates were laminated, 60 g of the resin A was disposed thereon substantially uniformly, and then the remaining five fiber substrates were laminated thereon to prepare a pre-molding laminate.

Preparation of Example 4A

A fiber-reinforced resin molded body of Example 4A was prepared in the same manner as in Example 1A except that the resin B1 was used as the thermosetting resin.

The resin B1 is a phenol resin (manufactured by Sumitomo Bakelite Co., Ltd., product name: PR-310) having an average particle size of 30 μm, a melting start temperature Ta of 95° C., a reaction start temperature Tb of 135° C., a value of (Tb–Ta) of 40° C., a minimum viscosity (minimum viscosity at a temperature of the melting start temperature Ta° C. or higher) of 1,500 Pa·s, a maximum viscosity (maximum viscosity in a temperature range of the curing reaction start temperature Tb° C. to 190° C.) of 209,004 Pa·s, a value of (Tb–Ta)/3 of 13° C., and a value of Tb+(Tb–Ta)/3 of 148° C.

Preparation of Example 5A

A fiber-reinforced resin molded body of Example 5A was prepared in the same manner as in Example 1A except that a resin (25 g) prepared by uniformly mixing 12.5 g of the resin A1 and 12.5 g of a resin C1 was used as the thermosetting resin, and the mold temperature was 170° C.

As the resin C1, an epoxy resin (manufactured by Mitsubishi Chemical Corporation, product name: jER-1001) was pulverized in a mortar and used. The average particle size was 100 μm.

The resin prepared by uniformly mixing 12.5 g of the resin A1 and 12.5 g of the resin C1 has a melting start temperature Ta of 73° C., a reaction start temperature Tb of 140° C., a value of (Tb–Ta) of 67° C., a minimum viscosity (minimum viscosity at a temperature of the melting start temperature Ta° C. or higher) of 22 Pa·s, a maximum viscosity (maximum viscosity in a temperature range of the curing reaction start temperature Tb° C. to 190° C.) of 5,180 Pa·s, a value of (Tb–Ta)/3 of 22° C., and a value of Tb+(Tb–Ta)/3 of 162° C.

Preparation of Example 6A

A fiber-reinforced resin molded body of Example 6A was prepared in the same manner as in Example 1A except that a resin (25 g) prepared by uniformly mixing 12.5 g of a resin D1 and 12.5 g of a resin E1 was used as the thermosetting resin, and the mold temperature was 160° C.

As the resin D1, a phenol resin (manufactured by Sumitomo Bakelite Co., Ltd., product name: PR-50235D) was pulverized in a mortar and used. The average particle size was 90 μm.

As the resin E1, a cyanate resin (manufactured by Mitsubishi Gas Chemical Company, Inc., product name: CYTESTER TA) was pulverized in a mortar and used. The average particle size was 100 μm.

The resin prepared by uniformly mixing 12.5 g of the resin D1 and 12.5 g of the resin E1 has a melting start temperature Ta of 76° C., a reaction start temperature Tb of 138° C., a value of (Tb–Ta) of 62° C., a minimum viscosity (minimum viscosity at a temperature of the melting start temperature Ta° C. or higher) of 475 Pa·s, a maximum viscosity (maximum viscosity in a temperature range of the curing reaction start temperature Tb° C. to 190° C.) of 51,895 Pa·s, a value of (Tb–Ta)/3 of 21° C., and a value of Tb+(Tb–Ta)/3 of 159° C.

Preparation of Example 7A

A fiber-reinforced resin molded body of Example 7A was prepared in the same manner as in Example 1A except that a resin (24.9 g) prepared by uniformly mixing 8.3 g of the resin D1, 8.3 g of the resin E1, and 8.3 g of the resin C1 was used as the thermosetting resin, and the mold temperature was 170° C.

The resin prepared by uniformly mixing 8.3 g of the resin D1, 8.3 g of the resin E1, and 8.3 g of the resin C1 has a melting start temperature Ta of 75° C., a reaction start temperature Tb of 139° C., a value of (Tb–Ta) of 64° C., a minimum viscosity (minimum viscosity at a temperature of the melting start temperature Ta° C. or higher) of 575 Pa·s, a maximum viscosity (maximum viscosity in a temperature range of the curing reaction start temperature Tb° C. to 190° C.) of 19,025 Pa·s, a value of (Tb–Ta)/3 of 21° C., and a value of Tb+(Tb–Ta)/3 of 160° C.

Preparation of Comparative Example 1A

A fiber-reinforced resin molded body of Comparative Example 1A was prepared in the same manner as in Example 1A except that a resin F1 was used as the thermosetting resin and the mold temperature was 100° C.

The resin F1 is a phenol resin (manufactured by Sumitomo Bakelite Co., Ltd., product name: PR-50699) having an average particle size of 30 μm, a melting start temperature Ta of 72° C., a reaction start temperature Tb of 91° C., a value of (Tb–Ta) of 19° C., a minimum viscosity (minimum viscosity at a temperature of the melting start temperature Ta° C. or higher) of 118,908 Pa·s, a maximum viscosity (maximum viscosity in a temperature range of the curing reaction start temperature Tb° C. to 190° C.) of 164,468 Pa·s, a value of (Tb–Ta)/3 of 6° C., and a value of Tb+(Tb–Ta)/3 of 97° C.

The results of viscosity measurement of the resin F1 (Comparative Example 1A) are shown in the graph of FIG. 6.

In Comparative Example 1A, the minimum viscosity and the maximum viscosity of the resin F1 used were high, and the impregnation property of the resin F1 into the fiber substrate (carbon fiber woven fabric) was poor. As a result, a molded body uniformly impregnated with the thermosetting resin was not obtained.

Preparation of Comparative Example 2A

A fiber-reinforced resin molded body of Comparative Example 2A was prepared in the same manner as in Example 1A except that a resin (24.9 g) prepared by uniformly mixing 8.3 g of the resin A1 and 16.6 g of the resin D1 was used as the thermosetting resin, and the mold temperature was 160° C.

The resin prepared by uniformly mixing 8.3 g of the resin A1 and 16.6 g of the resin D1 has a melting start temperature Ta of 80° C., a reaction start temperature Tb of 140° C., a value of (Tb–Ta) of 60° C., a minimum viscosity (minimum viscosity at a temperature of the melting start temperature Ta° C. or higher) of 21 Pa·s, a maximum viscosity (maximum viscosity in a temperature range of the curing reaction start temperature Tb° C. to 190° C.) of 260 Pa·s, a value of (Tb–Ta)/3 of 20° C., and a value of Tb+(Tb–Ta)/3 of 160° C.

The results of viscosity measurement of the mixed resin of the resin A1 and the resin D1 (weight ratio: 1/2) (Comparative Example 2A) are shown in the graph of FIG. 6.

In Comparative Example 2A, the thermosetting resin was not sufficiently cured, and deformation occurred at the time of demolding the molded body. As a result, good molded body was not obtained.

For the obtained fiber-reinforced resin molded bodies of Examples 1A to 7A and Comparative Examples 1A and 2A, the thickness (mm), the VF value (%), the flexural strength (MPa), and the flexural modulus (GPa) were measured and the appearance was evaluated. The results are as shown in FIG. 5 and will be described below.

The VF value (%) was calculated as (total weight of fiber substrate/density of fiber)/(volume of molded body)×100.

The flexural strength (MPa) and the flexural modulus (GPa) were measured based on the method according to JIS K7074 A.

In the evaluation of the appearance, presence of a defect such as deformation or non-uniformity of impregnation of resin on the surface of the molded body was visually confirmed, and the case where there was no defect was evaluated as "○", and the case where there was a defect was evaluated as "×".

Physical Properties and the Like of Example 1A

The fiber-reinforced resin molded body of Example 1A was prepared by disposing a thermosetting resin powder between fiber substrates at the center, with the number of laminated fiber substrates being four and the thermosetting resin being the resin A1. The molded body had a thickness of 0.8 mm, a VF value of 58%, a flexural strength of 550 MPa, a flexural modulus of 54 GPa, and an appearance of "○", and thus had high strength and rigidity, and a good appearance.

Physical Properties and the Like of Example 2A

The fiber-reinforced resin molded body of Example 2A was prepared by disposing a thermosetting resin powder between respective fiber substrates, with the number of laminated fiber substrates being four and the thermosetting resin being the resin A1. The molded body had a thickness of 0.8 mm, a VF value of 58%, a flexural strength of 600 MPa, a flexural modulus of 55 GPa, and an appearance of "○". Example 2A was prepared by disposing the thermosetting resin powder between the respective fiber substrates, and accordingly, Example 2A had a higher strength and rigidity than those of Example 1A.

Physical Properties and the Like of Example 3A

The fiber-reinforced resin molded body of Example 3A was prepared by disposing a thermosetting resin powder between fiber substrates at the center, with the number of laminated fiber substrates being ten and the thermosetting resin being the resin A1. The molded body had a thickness of 2.0 mm, a VF value of 59%, a flexural strength of 620 MPa, and a flexural modulus of 53 GPa, and an appearance of "○", and thus had high strength and rigidity, and a good appearance.

Physical Properties and the Like of Example 4A

The fiber-reinforced resin molded body of Example 4A was prepared by disposing a thermosetting resin powder between fiber substrates at the center, with the number of laminated fiber substrates being four and the thermosetting resin being the resin B1. The molded body had a thickness of 0.8 mm, a VF value of 55%, a flexural strength of 450 MPa, and a flexural modulus of 45 GPa, and an appearance of "○", and thus had high strength and rigidity, and a good appearance. Example 4A, which used the resin B1, had lower strength and rigidity than that of Example 1A which used the resin A1.

Physical Properties and the Like of Example 5A

The fiber-reinforced resin molded body of Example 5A was prepared by disposing a thermosetting resin powder between fiber substrates at the center, with the number of laminated fiber substrates being four and the thermosetting resin being a mixed resin of the resin A1 and the resin C1 (weight ratio: 1/1). The molded body had a thickness of 0.8 mm, a VF value of 57%, a flexural strength of 990 MPa, and a flexural modulus of 60 GPa, and an appearance of "○", and thus had high strength and rigidity, and a good appearance. Example 5A, which used the mixed resin of the resin A1 and the resin C1 (weight ratio: 1/1), had higher strength and rigidity than those of Example 1A which used the resin A1 and Example 4A which used the resin B1.

Physical Properties and the Like of Example 6A

The fiber-reinforced resin molded body of Example 6A was prepared by disposing a thermosetting resin powder between fiber substrates at the center, with the number of laminated fiber substrates being four and the thermosetting resin being a mixed resin of the resin D1 and the resin E1 (weight ratio: 1/1). The molded body had a thickness of 0.8 mm, a VF value of 59%, a flexural strength of 900 MPa, and a flexural modulus of 61 GPa, and an appearance of "○", and thus had high strength and rigidity, and a good appearance. Example 6A, which used the mixed resin of the resin D1 and the resin E1 (weight ratio: 1/1), had high strength and rigidity equivalent to those of Example 5A which used the mixed resin of the resin A1 and the resin C1 (weight ratio: 1/1).

Physical Properties and the Like of Example 7A

The fiber-reinforced resin molded body of Example 7A was prepared by disposing a thermosetting resin powder between fiber substrates at the center, with the number of laminated fiber substrates being four and the thermosetting resin being a mixed resin of the resin D1, the resin E1, and the resin C1 (weight ratio: 1/1/1). The molded body had a thickness of 0.8 mm, a VF value of 58%, a flexural strength of 930 MPa, and a flexural modulus of 58 GPa, and an appearance of "○", and thus had high strength and rigidity, and a good appearance. Example 7A, which used the mixed resin of the resin D1, the resin E1, the resin C1 (weight ratio: 1/1/1), had high strength and rigidity equivalent to those of Example 5A which used the mixed resin of the resin A1 and the resin C1 (weight ratio: 1/1) and Example 6A which used the mixed resin of the resin D1 and the resin E1 (weight ratio: 1/1).

Physical Properties and the Like of Comparative Example 1A

The fiber-reinforced resin molded body of Comparative Example 1A was prepared by disposing a thermosetting resin powder between fiber substrates at the center, with the number of laminated fiber substrates being four and the thermosetting resin being the resin F1. In this case, the impregnation property of the resin F1 was poor, and a molded body uniformly impregnated with the thermosetting resin was not obtained. Therefore, the thickness, VF value, flexural strength, and flexural modulus could not be measured.

Physical Properties and the Like of Comparative Example 2A

The fiber-reinforced resin molded body of Comparative Example 2A was prepared by disposing a thermosetting resin powder between the fiber substrates at the center, with the number of laminated fiber substrates being four and the thermosetting resin being a mixed resin of the resin A1 and the resin D1 (weight ratio: 1/2). In this case, the thermosetting resin was not sufficiently cured, and deformation occurred at the time of demolding the molded body. Therefore, the thickness, VF value, flexural strength, and flexural modulus could not be measured.

In Examples, only the flat plate shape is shown as the shape of the fiber-reinforced resin molded body, but in the present disclosure, the shape of the fiber-reinforced resin molded body (the shape of the mold) is not limited to the flat plate shape, and may be any shape such as a curved shape or an irregularity shape.

As described above, according to the present aspect, it is possible to obtain a fiber-reinforced resin molded body easily and inexpensively without using a prepreg and safely without a risk of environmental pollution.

Second Aspect

An embodiment of the second aspect will be described.

Figure 7:
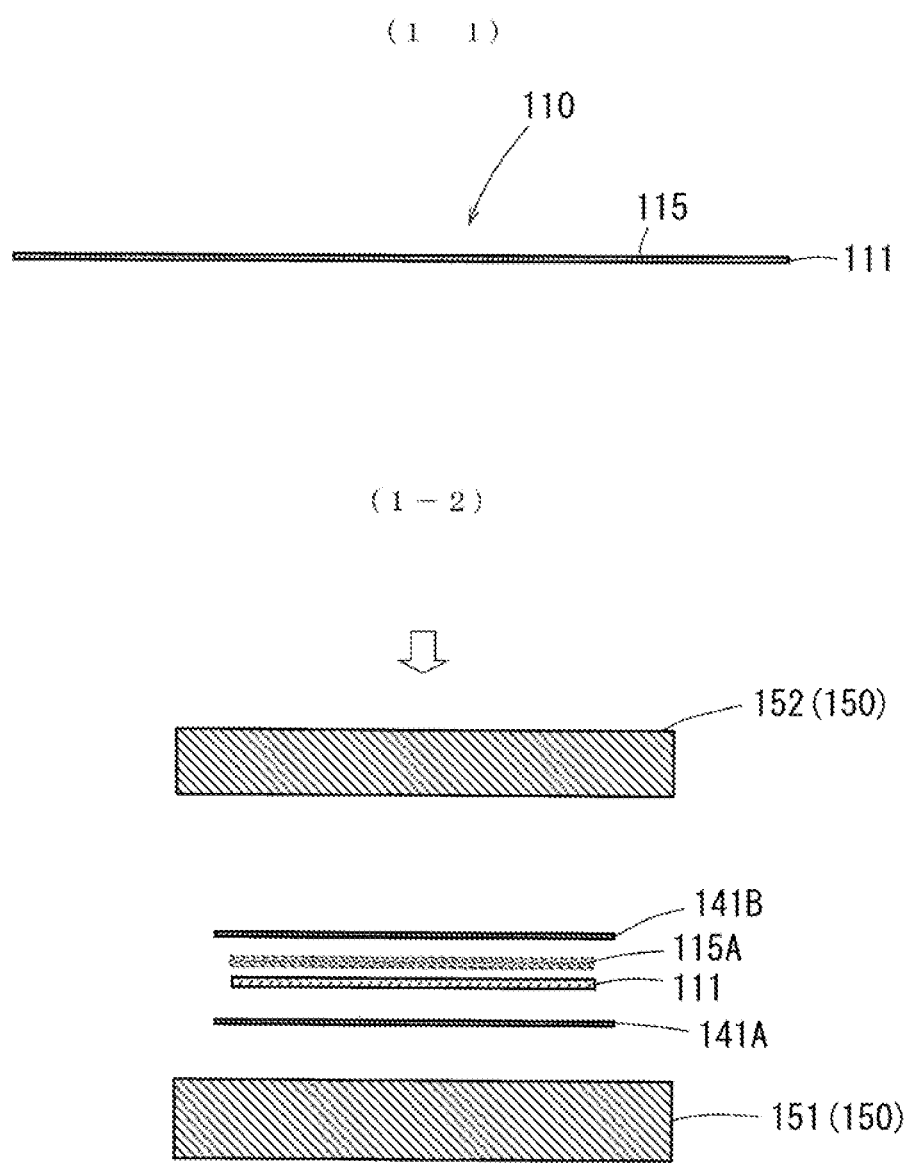
FIG. 7 is a cross-sectional view showing a fiber-reinforced resin molding prepreg according to a first embodiment of the second aspect, and heat compression in the preparation of the prepreg.

In a fiber-reinforced resin molding prepreg 110 of the first embodiment shown in (1-1) of FIG. 7, a fiber substrate 111 is heat-compressed together with a thermosetting resin 115, and the thermosetting resin 115 is in a state of being adhering to the fiber substrate 111. The thermosetting resin 115 adhering to the fiber substrate 111 is in a solid state before the start of the curing reaction.

The fiber substrate 111 is composed of one layer in the prepreg 110 of the first embodiment, but may be composed of a plurality of layers. Examples of the fiber substrate 111 include woven fabrics and nonwoven fabrics made of glass fibers, aramid fibers, basalt fibers, and carbon fibers, but are not particularly limited thereto. The fiber substrate 111 is preferably a carbon fiber woven fabric because it is excellent in lightweight and high rigidity. The carbon fiber woven fabric is preferably a woven fabric in which fibers are not unidirectional. Preferred examples thereof include plain weave, twill weave, satin weave, all of which are constituted of warp and weft, and triaxial weave which is constituted of threads in three directions. The carbon fiber woven fabric preferably has a fiber weight of 50 to 600 g/m² from the viewpoint of impregnation of the thermosetting resin 115 and rigidity of the fiber-reinforced resin molded body.

As the thermosetting resin 115, one that is in a solid powder form before heat compression is used in the preparation of the prepreg 110. The shape of the powder is not particularly limited, and examples thereof include a spherical shape, a needle shape, and a flake shape.

In the preparation of the prepreg 110, the powder of the thermosetting resin 115 is disposed in contact with the fiber substrate 111, and when the fiber substrate 111 is heat-compressed together with the powder of the thermosetting resin 115, the powder of the thermosetting resin is melted and impregnated into the fiber substrate 111, and then cooled and solidified in a state before the start of the curing reaction.

The thermosetting resin 115 has a viscosity of 2,000 Pa·s or less, preferably 1,500 Pa·s or less at the curing reaction start temperature Tb° C.

With the viscosity of 2,000 Pa·s or less at the curing reaction start temperature Tb° C., the thermosetting resin 115 can be uniformly impregnated into the fiber substrate 111 when a fiber-reinforced resin molded body is produced using the prepreg 110. As a result, a fiber-reinforced resin molded body with good quality is obtained.

The thermosetting resin 115 has a maximum viscosity of 1,000 Pa·s or more in a temperature range of the curing reaction start temperature Tb° C. to 190° C.

With the maximum viscosity of 1,000 Pa·s or more in a temperature range of the curing reaction start temperature Tb° C. to 190° C., the melted thermosetting resin 115 can be impregnated into the fiber substrate 111 and sufficiently cured when a fiber-reinforced resin molded body is produced using the prepreg 110. As a result, the shapability of the fiber-reinforced resin molded body is good, and sufficient strength can be obtained in a short time (about 10 minutes).

The thermosetting resin 115 preferably has a melting start temperature Ta° C. of 60 to 100° C. When the melting start temperature Ta° C. is in the above range, the heating temperature in the preparation of the prepreg 110 does not need to be so high, which facilitates the preparation of the prepreg 110.

The melting start temperature Ta° C. and the curing reaction start temperature Tb° C. of the thermosetting resin 115 preferably satisfy $30 \leq (Tb-Ta) \leq 100$, and more preferably satisfy $40 \leq (Tb-Ta) \leq 70$. When the value of (Tb–Ta) is in this range, the thermosetting resin 115 is sufficiently impregnated into the fiber substrate 111 when a fiber-reinforced resin molded body is produced using the prepreg 110. As a result, a fiber-reinforced resin molded body having uniform physical properties can be obtained.

In the thermosetting resin 115, it is preferable that, with respect to Tc° C. which is a temperature during heat compression in the preparation of the prepreg 110, the melting start temperature Ta° C. be equal to or lower than Tc° C., and the curing reaction start temperature Tb° C. be equal to or higher than Tc° C. More preferably, Ta° C. is Tc° C. minus 5° C. or lower, and Tb° C. is Tc° C. plus 5° C. or higher. When Ta° C. and Tb° C. are in these ranges, the thermosetting resin 115 can be melted and impregnated into the fiber substrate 111 in the preparation of the prepreg 110, and the curing reaction of the thermosetting resin 115 does not start in the preparation of the prepreg 110. Therefore, the quality of the prepreg 110 is improved and the storage stability of the prepreg 110 is improved.

The particle size of the powder of the thermosetting resin 115 used in the preparation of the prepreg 110 is preferably 10 to 500 μm from the viewpoint of ease of melting. The amount of the thermosetting resin 115 used in the preparation of the prepreg is preferably adjusted so that the VF value (%) of the fiber-reinforced resin molded body is 40 to 70%. The VF value (%) is a value calculated by (total weight of fiber substrate/density of fiber)/(volume of fiber-reinforced resin molded body)×100.

The thermosetting resin that can satisfy the melting start temperature Ta° C., the curing reaction start temperature Tb° C., the range of the value of (Tb–Ta), the minimum viscosity, the maximum viscosity, and the like as described above is preferably selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin. The phenol resin is excellent in flame retardancy, and thus can impart excellent strength and flame retardancy to the fiber-reinforced resin molded body.

Various powder additives such as a pigment, an antibacterial agent, and an ultraviolet absorber may be added to the thermosetting resin 115 as long as the viscosity and reactivity of the thermosetting resin are not affected.

One mode of preparation of the fiber-reinforced resin molding prepreg 110 of the first embodiment will be described below. In the following description, the "thermosetting resin powder 115" may be denoted by a combined reference numeral of number "115" and "alphabet", such as "thermosetting resin powder 115A".

As shown in (1-2) of FIG. 7, the fiber substrate 111 and the thermosetting resin powder 115A disposed in contact with the fiber substrate 111 are sandwiched between plastic mold release films 141A and 141B, and these are sandwiched between a lower mold 151 and an upper mold 152 of a heated mold 150, and heat-compressed to prepare the prepreg 110 of the first embodiment. At this time, the thermosetting resin powder 115A is disposed on one or both of the upper and lower surfaces of the fiber substrate 111.

The mold 150 is heated by a heating unit such as an electric heater. The temperature Tc° C. during heat compression (temperature of the mold) in the preparation of the prepreg 110 is equal to or higher than the melting start temperature Ta° C. and equal to lower than the curing reaction start temperature Tb° C. of the thermosetting resin powder 115A (thermosetting resin 115). More preferably, the temperature Tc° C. during heat compression (temperature of the mold) is the melting start temperature Ta° C. of the thermosetting resin 115 plus 5° C. or higher, and the curing reaction start temperature Tb° C. minus 5° C. or lower.

Pressurization (compression) by the mold 150 in the preparation of the prepreg is preferably 0.1 to 10 MPa so that the melted thermosetting resin of the thermosetting resin powder 115A can be satisfactorily impregnated into the fiber substrate 111.

The compression percentage (%) of the fiber substrate 111 is a value calculated as (distance between mold surface of lower mold 151 and mold surface of upper mold 152−total thickness of mold release film)/(total thickness of all layers of fiber substrate)×100. The compression percentage is preferably 60 to 100%.

The thermosetting resin powder 115A is melted by heat compression and impregnated into the fiber substrate 111, and then cooled and solidified in a state before the start of the curing reaction.

The method for preparing the prepreg is not limited to the above-described method using the mold, but may be other methods such as a heat roller method in which heat compression is performed by a heat roller, and a double belt method in which heat compression is performed between upper and lower belts.

The second embodiment will be described. In the following description, the fiber substrates may be denoted by a combined reference numeral of number "111" and "alphabet", such as "111A", in order to easily grasp the vertical positional relationship in the plurality of fiber substrates 111.

A fiber-reinforced resin molding prepreg 120 of the second embodiment shown in (2-1) of FIG. 8 includes four layers of fiber substrates 111A, 111B, 111C, and 111D and the thermosetting resin 115, and the thermosetting resin 115 is in a state of being adhering to the fiber substrates 111A to 111D. The fiber substrates 111A to 111D and the thermosetting resin 115 are as described in the prepreg 110 of the first embodiment.

One mode of preparation of the fiber-reinforced resin molding prepreg 120 of the second embodiment will be described below.

As shown in (2-2) of FIG. 8, a laminate, in which the thermosetting resin powder 115A is sandwiched between two fiber substrates 111A and 111B on the lower side and two fiber substrates 111C and 111D on the upper side, is sandwiched between the plastic mold release films 141A and 141B, and these are sandwiched between the lower mold 151 and the upper mold 152 of the heated mold 150, and heat-compressed to prepare the fiber-reinforced resin molding prepreg 120 of the second embodiment. Heat-compression conditions are as described in the first embodiment. The thermosetting resin powder 115A is melted by heat compression and impregnated into the fiber substrates 111A to 111D, and then cooled and solidified in a state before the start of the curing reaction.

The third embodiment will be described. A fiber-reinforced resin molding prepreg 130 of the third embodiment shown in (3-1) of FIG. 9 includes four layers of the fiber substrates 111A, 111B, 111C, and 111D and the thermosetting resin 115 as in the second embodiment, and the thermosetting resin 115 is in a state of being adhering to the fiber substrates 111A to 111D. In the third embodiment, the disposition of the thermosetting resin powder 115 for preparing the prepreg 130 is different from that of the second embodiment as described below.

One mode of preparation of the fiber-reinforced resin molding prepreg 130 of the third embodiment will be described below.

As shown in (3-2) of FIG. 9, a laminate, in which thermosetting resin powders 115A, 115B, and 115C are sandwiched between respective fiber substrates (between respective layers) of four fiber substrates 111A to 111D, is sandwiched between the plastic mold release films 141A and 141B, and these are sandwiched between the lower mold 151 and the upper mold 152 of the heated mold 150, and heat-compressed to prepare the fiber-reinforced resin molding prepreg 130 of the third embodiment. Heat-compression conditions are as described in the first embodiment. The thermosetting resin powders 115A to 115C are melted by heat compression and impregnated into the fiber substrates 111A to 111D, and then cooled and solidified in a state before the start of the curing reaction.

The method for producing a fiber-reinforced resin molded body using the fiber-reinforced resin molding prepreg of the present disclosure is performed by heat-compressing a fiber-reinforced resin molding prepreg including the fiber substrate 111 composed of a single layer or a plurality of layers, by a shaping mold to react and cure the thermosetting resin 115. The shape of the mold surface of the shaping mold is not limited to a flat surface, and may be uneven, curved, or the like depending on the product.

The heating temperature (temperature of the shaping mold) Td° C. in the production of the fiber-reinforced resin molded body is set to a temperature satisfying preferably $[Tb+(Tb-Ta)/3]-15 \leq Td \leq [Tb+(Tb-Ta)/3]+20$, more preferably $[Tb+(Tb-Ta)/3]-10 \leq Td \leq [Tb+(Tb-Ta)/3]+20$ with respect to the melting start temperature Ta° C. and the curing reaction start temperature Tb° C. of the thermosetting resin 115. For example, when Ta° C. is 70° C. and Tb° C. is 130° C., Td° C. is 140° C. to 170° C.

Pressurization (compression) of the fiber-reinforced resin molding prepreg during heat compression by the shaping mold is preferably 2 to 20 MPa so that the melted thermosetting resin 115 can be satisfactorily impregnated into the fiber substrate 111.

The compression percentage (%) of the fiber-reinforced resin molding prepreg during heat compression by the shaping mold is a value calculated as (distance between mold surface of lower mold 151 and mold surface of upper mold 152)/(thickness of prepreg)×100, and is preferably 60 to 100%.

The thermosetting resin 115 in the prepreg is melted by heat compression of the fiber-reinforced resin molding prepreg by the shaping mold, and the melted thermosetting resin 115 is reacted and cured, whereby a fiber-reinforced resin molded body shaped into the shape of the mold surface of the lower mold and the upper mold is obtained.

EXAMPLES

Fiber-reinforced resin molding prepregs of Examples 1B to 7B and Comparative Examples 1B and 2B were prepared by using the thermosetting resin powders shown in FIG. 10, and fiber-reinforced resin molded bodies were prepared using the prepreg immediately after preparation. The viscosity of the thermosetting resin was measured under the following conditions using a rheometer Rheosol-G3000, manufactured by UBM.
1) An amount of 0.4 g of a sample is formed into pellets (diameter φ: 18 mm, thickness: about 0.4 mm), and the formed pellets are sandwiched between parallel plates having a diameter φ of 18 mm.
2) The dynamic viscosity was measured at 2° C. intervals over a temperature range of 40° C. to 200° C. at a temperature rising rate of 5° C./min, a frequency of 1 Hz, and a rotation angle (strain) of 0.1 deg under constant temperature rising.

Example 1B

Preparation of Prepreg

Example 1B is an example in which the fiber substrate of the prepreg is one sheet (one layer), as shown in (1-1) and (1-2) of FIG. 7. As the fiber substrate, a carbon fiber woven fabric (manufactured by Teijin Limited, product name: W-3101, weight per unit area: 200 g/m², thickness: 0.22 mm) cut into 250×200 mm was prepared. The weight of the cut fiber substrate was 10 g per sheet. The prepared fiber substrate was disposed on a PET film (plastic mold release film) subjected to mold release treatment (applied with a mold release agent), 7 g of the following resin A2 as the thermosetting resin powder was disposed on the fiber substrate substantially uniformly, and a PET film subjected to mold release treatment was placed thereon to prepare a laminate before prepreg molding.

The resin A2 is a phenol resin (manufactured by Sumitomo Bakelite Co., Ltd., product name: PR-50252, average particle size: 30 μm).

Figure 11:
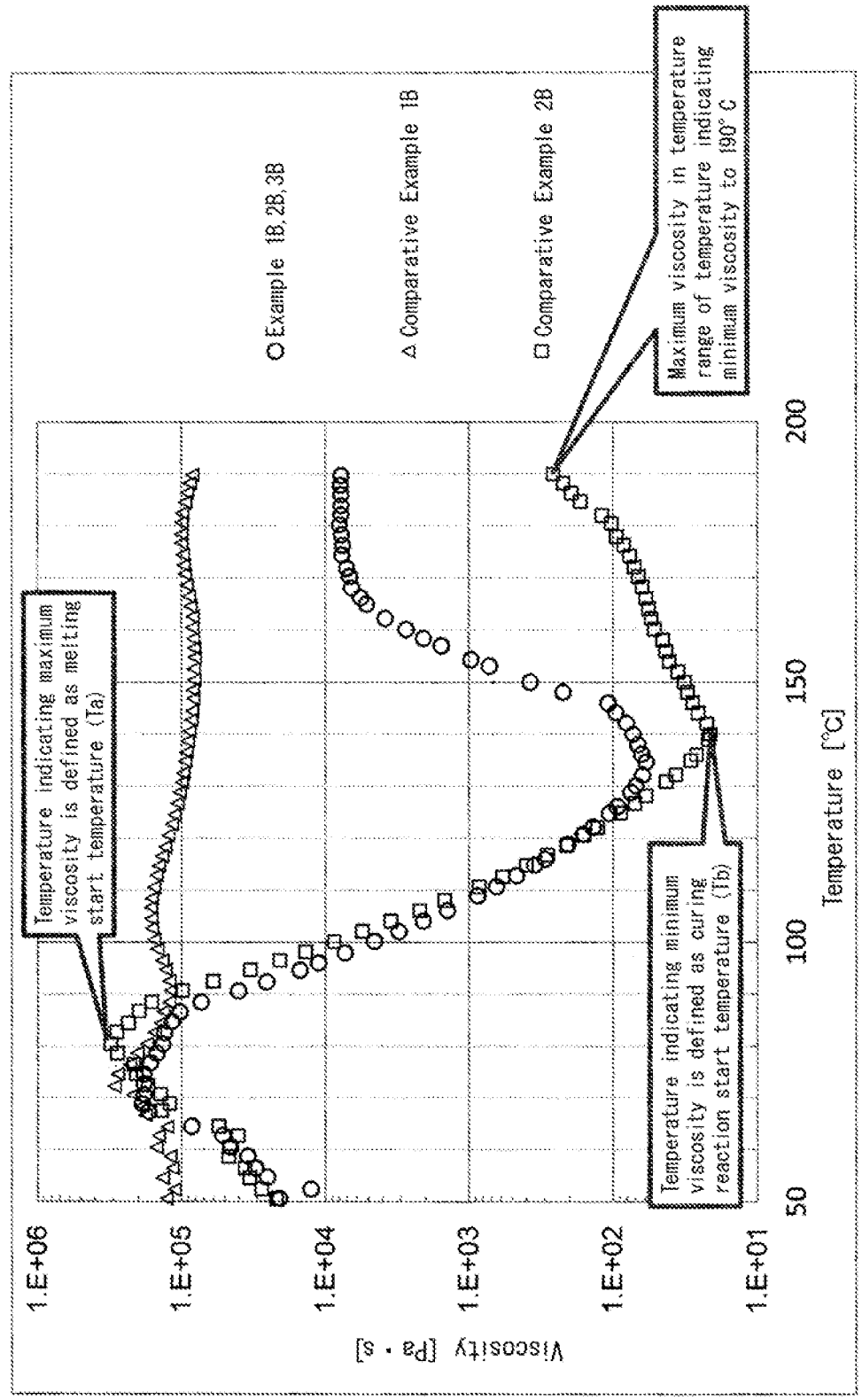
FIG. 11 is a graph showing results of viscosity measurement of thermosetting resins used in fiber-reinforced resin molding prepregs in Examples 1B to 3B and Comparative Examples 1B and 2B according to the second aspect.

The results of viscosity measurement of the resin A2 (Examples 1B, 2B, 3B) are shown in the graph of FIG. 11.

The laminate before prepreg molding was disposed on a molding surface (mold surface) of a lower mold of a mold heated to 100° C., and an upper mold of the mold was placed on the laminate before prepreg molding to close the mold. The laminate was heat-compressed at a pressure of 0.1 MPa for 5 minutes. The powder of the resin A2 on the fiber substrate was melted and impregnated into the fiber substrate through the heat compression. Then, the mold was opened, the laminate together with the PET films was taken out and naturally cooled to room temperature, and the PET films were removed. Thus, a prepreg of Example 1B was obtained.

Preparation of Fiber-Reinforced Resin Molded Body

A laminate, in which four prepregs of Example 1B were stacked, was disposed on a molding surface (mold surface) of a lower mold of a mold heated to 150° C. in advance, and an upper mold of the mold was placed on the laminate to close the mold. The laminate was heat-compressed at a pressure of 5 MPa for 10 minutes to react and cure the resin A2. Then, the mold was opened and a fiber-reinforced resin molded body of Example 1B was taken out.

Example 2B

Preparation of Prepreg

Example 2B is an example in which the number of fiber substrates of the prepreg is four (four layers), as shown in (2-1) and (2-2) of FIG. 8. A prepreg of Example 2B was prepared in the same manner as in Example 1B except that the same four fiber substrates and resin A2 as in Example 1B were used, and 28 g of the resin A2 was disposed in the middle of the four fiber substrates substantially uniformly.

Preparation of Fiber-Reinforced Molded Body

The prepreg of Example 2B was disposed on a molding surface (mold surface) of a lower mold of a mold heated to 150° C. in advance, and an upper mold of the mold was placed on the laminate to close the mold. The laminate was heat-compressed at a pressure of 5 MPa for 10 minutes to react and cure the resin A2. Then, the mold was opened and a fiber-reinforced resin molded body of Example 2B was taken out.

Example 3B

Preparation of Prepreg

Example 3B is an example in which a prepreg was prepared by disposing the resin A2 between respective layers of four fiber substrates (four layers) of the prepreg, as shown in (3-1) and (3-2) of FIG. 9. A prepreg of Example 3B was prepared in the same manner as in Example 1B except that 9.3 g of the resin A2 was disposed between respective layers of the same four fiber substrates as in Example 1B substantially uniformly.

Preparation of Fiber-Reinforced Molded Body

The prepreg of Example 3B was disposed on a molding surface (mold surface) of a lower mold of a mold heated to 150° C. in advance, and an upper mold of the mold was placed on the laminate to close the mold. The laminate was heat-compressed at a pressure of 5 MPa for 10 minutes to react and cure the resin A2. Then, the mold was opened and a fiber-reinforced resin molded body of Example 3B was taken out.

Example 4B

Preparation of Prepreg

Example 4B is an example in which the fiber substrate of the prepreg is one sheet. A prepreg of Example 4B was prepared in the same manner as in Example 1B except that the following resin B2 was used as the thermosetting resin powder.

The resin B2 is a phenol resin (manufactured by Sumitomo Bakelite Co., Ltd., product name: PR-310, average particle size: 30 μm).

Preparation of Fiber-Reinforced Resin Molded Body

A fiber-reinforced resin molded body of Example 4B was prepared by using four prepregs of Example 4B in the same manner as in Example 1B.

Example 5B

Preparation of Prepreg

Example 5B is an example in which the fiber substrate of the prepreg is one sheet. A prepreg of Example 5B was prepared in the same manner as in Example 1B except that 7 g of a resin prepared by uniformly mixing the resin A2 and the following resin C2 at a weight ratio of 1:1 was used as the thermosetting resin powder.

As the resin C2, an epoxy resin (manufactured by Mitsubishi Chemical Corporation, product name: jER-1001) was pulverized in a mortar and used. The average particle size was 100 μm.

Preparation of Fiber-Reinforced Resin Molded Body

A fiber-reinforced resin molded body of Example 5B was prepared in the same manner as in Example 1B except that four prepregs of Example 5B were used and the temperature of the mold was 170° C.

Example 6B

Preparation of Prepreg

Example 6B is an example in which the fiber substrate of the prepreg is one sheet. A prepreg of Example 6B was prepared in the same manner as in Example 1B except that 7 g of a resin prepared by uniformly mixing the following resin D2 and the following resin E2 at a weight ratio of 1:1 was used as the thermosetting resin powder.

As the resin D2, a phenol resin (manufactured by Sumitomo Bakelite Co., Ltd., product name: PR-50235D) was pulverized in a mortar and used. The average particle size was 90 μm.

As the resin E2, a cyanate resin (manufactured by Mitsubishi Gas Chemical Company, Inc., product name: CYTESTER TA) was pulverized in a mortar and used. The average particle size was 100 μm.

Preparation of Fiber-Reinforced Resin Molded Body

A fiber-reinforced resin molded body of Example 6B was prepared in the same manner as in Example 1B except that four prepregs of Example 6B were used and the temperature of the mold was 160° C.

Example 7B

Preparation of Prepreg

Example 7B is an example in which the fiber substrate of the prepreg is one sheet. A prepreg of Example 7B was prepared in the same manner as in Example 1B except that 7 g of a resin prepared by uniformly mixing the resin D2, the resin E2, and the resin C2 at a weight ratio of 1:1:1 was used as the thermosetting resin powder.

Preparation of Fiber-Reinforced Resin Molded Body

A fiber-reinforced resin molded body of Example 7B was prepared in the same manner as in Example 1B except that four prepregs of Example 7B were used and the temperature of the mold was 170° C.

Comparative Example 1B

Preparation of Prepreg

A prepreg of Comparative Example 1 was prepared in the same manner as in Example 1B except that 7 g of the following resin F2 was used as the thermosetting resin powder, and the mold temperature was 80° C.

The resin F2 is a phenol resin (manufactured by Sumitomo Bakelite Co., Ltd., product name: PR-50699, average particle size: 30 μm).

The results of viscosity measurement of the resin F2 (Comparative Example 1B) are shown in the graph of FIG. 11.

Preparation of Fiber-Reinforced Resin Molded Body

A fiber-reinforced resin molded body of Comparative Example 1B was prepared in the same manner as in Example 1B except that four prepregs of Comparative Example 1B were used and the temperature of the mold was 100° C.

In Comparative Example 1B, the minimum viscosity and the maximum viscosity of the resin F2 used were high, the impregnation property of the resin F2 into the fiber substrate (carbon fiber woven fabric) was poor. As a result, a fiber-reinforced resin molded body uniformly impregnated with the thermosetting resin was not obtained.

Comparative Example 2B

Preparation of Prepreg

A prepreg of Comparative Example 2B was prepared in the same manner as in Example 1B by using, as the thermosetting resin powder, 7 g of a resin prepared by uniformly mixing the resin A2 and the resin D2 at a weight ratio of 1:2.

The results of viscosity measurement of the resin (Comparative Example 2B) prepared by uniformly mixing the resin A2 and the resin D2 at a weight ratio of 1:2 are shown in the graph of FIG. 11.

Preparation of Fiber-Reinforced Resin Molded Body

A fiber-reinforced resin molded body of Comparative Example 2B was prepared by using four prepregs of Comparative Example 2B in the same manner as in Example 1B.

In Comparative Example 2B, the thermosetting resin used was not sufficiently cured, deformation occurred at the time of demolding the fiber-reinforced resin molded body. As a result, a good molded body was not obtained.

For the fiber-reinforced resin molded bodies of Examples 1B to 7B and Comparative Examples 1B and 2B, the thickness (mm), the VF value (%), the flexural strength (MPa), and the flexural modulus (GPa) were measured and the appearance was evaluated. The results are as shown in FIG. 12 and will be described below.

The flexural strength (MPa) and the flexural modulus (GPa) were measured based on the method according to JIS K7074 A.

In the evaluation of the appearance, presence of a defect such as deformation or non-uniformity of impregnation of resin on the surface of the molded body was visually confirmed, and the case where there was no defect was evaluated as "○", and the case where there was a defect was evaluated as "×".

Physical Properties and the Like of Fiber-Reinforced Resin Molded Body of Example 1B The fiber-reinforced resin molded body of Example 1B was prepared by laminating four prepregs of Example 1B each prepared by using the resin A2 as the thermosetting resin powder and one fiber substrate. The fiber-reinforced resin molded body of Example 1B had a thickness of 0.8 mm, a VF value of 58%, a flexural strength of 610 MPa, a flexural modulus of 52 GPa, and an appearance of "○", and thus had high strength and rigidity (flexural modulus) and a good appearance.

Physical Properties and the Like of Fiber-Reinforced Resin Molded Body of Example 2B The fiber-reinforced resin molded body of Example 2B was prepared from the prepreg of Example 2B prepared by disposing the resin A2 in the middle of four fiber substrates. The fiber-reinforced resin molded body of Example 2B had a thickness of 0.8 mm, a VF value of 58%, a flexural strength of 600 MPa, a flexural modulus of 53 GPa, and an appearance of "○", and thus had high strength and rigidity, and a good appearance.

Physical Properties and the Like of Fiber-Reinforced Resin Molded Body of Example 3B The fiber-reinforced resin molded body of Example 3B was prepared from the prepreg of Example 3B prepared by disposing the resin A2 between respective layers of four fiber substrates. The fiber-reinforced resin molded body of Example 3B had a thickness of 0.8 mm, a VF value of 58%, a flexural strength of 620 MPa, a flexural modulus of 53 GPa, and an appearance of "○", and thus had high strength and rigidity, and a good appearance.

Physical Properties and the Like of Fiber-Reinforced Resin Molded Body of Example 4B The fiber-reinforced resin molded body of Example 4B was prepared by laminating four prepregs of Example 4B each prepared by using the resin B2 as the thermosetting resin powder and one fiber substrate. The fiber-reinforced resin molded body of Example 4B had a thickness of 0.8 mm, a VF value of 55%, a flexural strength of 460 MPa, a flexural modulus of 46 GPa, and an appearance of "○", and thus had high strength and rigidity, and a good appearance. Example 4B, which used the resin B2, had lower strength and rigidity than that of Example 1B which used the resin A2.

Physical Properties and the Like of Fiber-Reinforced Resin Molded Body of Example 5B The fiber-reinforced resin molded body of Example 5B was prepared by laminating four prepregs of Example 5B each prepared by using the mixed resin of the resin A2 and the resin C2 (weight ratio: 1/1) as the thermosetting resin powder, and one fiber substrate. The fiber-reinforced resin molded body of Example 5B had a thickness of 0.8 mm, a VF value of 57%, a flexural strength of 980 MPa, a flexural modulus of 60 GPa, and an appearance of "○", and thus had high strength and rigidity, and a good appearance. Example 5B, which used the mixed resin of the resin A2 and the resin C2 (weight ratio: 1/1), had higher strength and rigidity than those of Example 1B which used the resin A2 and Example 4B which used the resin B2.

Physical Properties and the Like of Fiber-Reinforced Resin Molded Body of Example 6B The fiber-reinforced resin molded body of Example 6B was prepared by laminating four prepregs of Example 6B each prepared by using the mixed resin of the resin D2 and the resin E2 (weight ratio: 1/1) as the thermosetting resin powder, and one fiber substrate. The fiber-reinforced resin molded body of Example 6B had a thickness of 0.8 mm, a VF value of 59%, a flexural strength of 910 MPa, a flexural modulus of 61 GPa, and an appearance of "○", and thus had high strength and rigidity, and a good appearance. Example 6B, which used the mixed resin of the resin D2 and the resin E2 (weight ratio: 1/1), had high strength and rigidity equivalent to those of Example 5B which used the mixed resin of the resin A2 and the resin C2 (weight ratio: 1/1).

Physical Properties and the Like of Fiber-Reinforced Resin Molded Body of Example 7B The fiber-reinforced resin molded body of Example 7B was prepared by laminating four prepregs of Example 7B each prepared by using the mixed resin of the resin D2, the resin E2, and the resin C2 (weight ratio: 1/1/1) as the thermosetting resin powder and one fiber substrate. The fiber-reinforced resin molded body of Example 7B had a thickness of 0.8 mm, a VF value of 58%, a flexural strength of 930 MPa, a flexural modulus of 59 GPa, and an appearance of "○", and thus had high strength and rigidity, and a good appearance. Example 7B, which used the mixed resin of the resin D2, the resin E2, and the resin C2 (weight ratio: 1/1/1), had high strength and rigidity equivalent to those of Example 5B which used the mixed resin of the resin A2 and the resin C2 (weight ratio: 1/1) and Example 6B which used the mixed resin of the resin D2 and the resin E2 (weight ratio: 1/1).

Physical Properties and the Like of Fiber-Reinforced Resin Molded Body of Comparative Example 1B The fiber-reinforced resin molded body of Comparative Example 1B was prepared by laminating four prepregs of Comparative Example 1 each prepared by using the resin F2 as the thermosetting resin powder and one fiber substrate. In this case, the impregnation property of the resin F2 was poor, and a molded body uniformly impregnated with the thermosetting resin was not obtained. Therefore, the thickness, VF value, flexural strength, and flexural modulus could not be measured.

Physical Properties and the Like of Fiber-Reinforced Resin Molded Body of Comparative Example 2B The fiber-reinforced resin molded body of Comparative Example 2B was prepared by laminating four prepregs of Comparative Example 2B each prepared by using the mixed resin of the resin A2 and the resin D2 (weight ratio: 1/2) as the thermosetting resin powder, and one fiber substrate. In this case, the thermosetting resin was not sufficiently cured and deformation occurred at the time of demolding the molded body. Therefore, the thickness, VF value, flexural strength, and flexural modulus could not be measured.

<Evaluation of Storage Stability of Prepreg>

In order to evaluate the storage stability of the prepregs due to the difference in thermosetting resins, the prepreg of Example 1B including the resin A2, the prepreg of Example 4B including the resin B2, the prepreg of Example 5B including the mixed resin of the resin A2 and the resin C2 (weight ratio: 1/1), the prepreg of Example 6B including the mixed resin of the resin D2 and the resin E2 (weight ratio: 1/1), and the prepreg of Example 7B including the mixed resin of the resin D2, the resin E2, the resin C2 (weight ratio: 1/1/1) were stored in an environment of 23° C. and humidity 50% for 90 days after preparation, and then fiber-reinforced molded bodies were prepared in the same manner as in the corresponding Examples.

For the prepared fiber-reinforced resin molded bodies, evaluation of the appearance of the molded bodies and measurement of the flexural strength and flexural modulus were performed. The results were compared with the results in the case of preparing a fiber-reinforced resin molded body by using a prepreg immediately after the preparation of the prepreg (the results shown in FIG. 12). The results of the storage stability of the prepregs are as shown in FIG. 13. The flexural strength retention in FIG. 13 is a percentage (%) with respect to the value of the flexural strength of a fiber-reinforced resin molded body prepared using a prepreg immediately after preparation (the value of flexural strength shown in FIG. 12). The flexural modulus retention is a percentage (%) with respect to the value of the flexural modulus of a fiber-reinforced resin molded body prepared using a prepreg immediately after preparation (the value of flexural modulus shown in FIG. 12).

The results shown in FIG. 13 for fiber-reinforced resin molded bodies prepared from prepregs after 90 days from the preparation will be described.

Example 1B (Resin A2)

The fiber-reinforced resin molded body of Example 1B, which was prepared 90 days after preparation of the prepreg of Example 1B including the resin A2, had an appearance of "○", a flexural strength of 570 MPa, a flexural modulus of 48 GPa, a flexural strength retention of 93%, and a flexural modulus retention of 92%. Thus, the deterioration in physical properties of the fiber-reinforced resin molded body due to storage of the prepreg was small.

Example 4B (Resin B2)

The fiber-reinforced resin molded body of Example 4B, which was prepared 90 days after preparation of the prepreg of Example 4B including the resin B2, had an appearance of "○", a flexural strength of 420 MPa, a flexural modulus of 42 GPa, a flexural strength retention of 91%, and a flexural modulus retention of 91%. Thus, the deterioration in physical properties of the fiber-reinforced resin molded body due to storage of the prepreg was small.

Example 5B (Resin A2 and Resin C2 at Weight Ratio of 1/1)

The fiber-reinforced resin molded body of Example 5B, which was prepared 90 days after preparation of the prepreg of Example 5B including the mixed resin of the resin A2 and the resin C2 (weight ratio: 1/1), had an appearance of "○", a flexural strength of 910 MPa, a flexural modulus of 56 GPa, a flexural strength retention of 93%, and a flexural modulus retention of 93%. Thus, the deterioration in physical properties of the fiber-reinforced resin molded body due to storage of the prepreg was small.

Example 6B (Resin D2 and Resin E2 at Weight Ratio of 1/1)

The fiber-reinforced resin molded body of Example 6B, which was prepared 90 days after preparation of the prepreg of Example 6B including the mixed resin of the resin D2 and the resin E2 (weight ratio: 1/1), had an appearance of "○", a flexural strength of 880 MPa, a flexural modulus of 60 GPa, a flexural strength retention of 97%, and a flexural modulus retention of 98%. Thus, the deterioration in physical properties of the fiber-reinforced resin molded body due to storage of the prepreg was small.

Example 7B (Resin D2, Resin E2, and Resin C2 at Weight Ratio of 1/1/1)

The fiber-reinforced resin molded body of Example 7B, which was prepared 90 days after preparation of the prepreg of Example 7B including the mixed resin of the resin D2, the resin E2, and the resin C2 (weight ratio: 1/1/1), had an appearance of "○", a flexural strength of 880 MPa, a flexural modulus of 56 GPa, a flexural strength retention of 95%, and a flexural modulus retention of 95%. Thus, the deterioration in physical properties of the fiber-reinforced resin molded body due to storage of the prepreg was small.

As described above, according to the present disclosure, it is possible to obtain a prepreg that is simple and inexpensive to prepare and has good storage stability. Further, a fiber-reinforced resin molded body having good quality prepared from the prepreg can be obtained.

In Examples, only the flat plate shape is shown as the shape of the fiber-reinforced resin molded body, but in the present disclosure, the shape of the fiber-reinforced resin molded body (the shape of the mold) is not limited to the flat plate shape, and may be any shape such as a curved shape or an irregularity shape.

In addition, the present aspect is not limited to the above Examples, and can be modified without departing from the spirit.

Third Aspect

An embodiment of the third aspect will be described.
1. Fiber-Reinforced Molded Body 210

In the fiber-reinforced molded body 210, a fiber substrate 211 is integrated by a thermosetting resin of a resin sheet 215 containing the thermosetting resin. The thermosetting resin has a viscosity of 2,000 Pa·s or less at the curing reaction start temperature Tb° C., and a maximum viscosity of 1,000 Pa·s or more in a temperature range of the curing reaction start temperature Tb° C. to 190° C.
(1) Fiber Substrate 211

Figure 14:
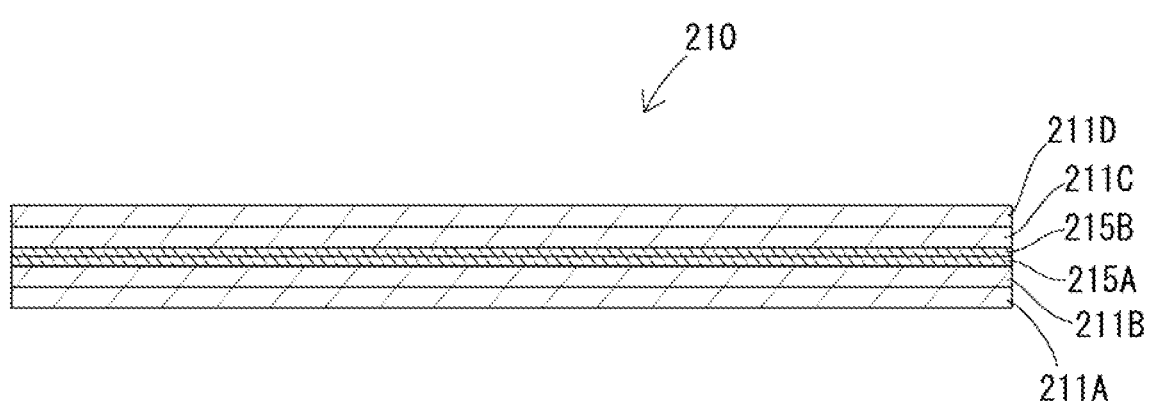
FIG. 14 is a cross-sectional view of a fiber-reinforced molded body according to an embodiment of the third aspect.
Figure 15:
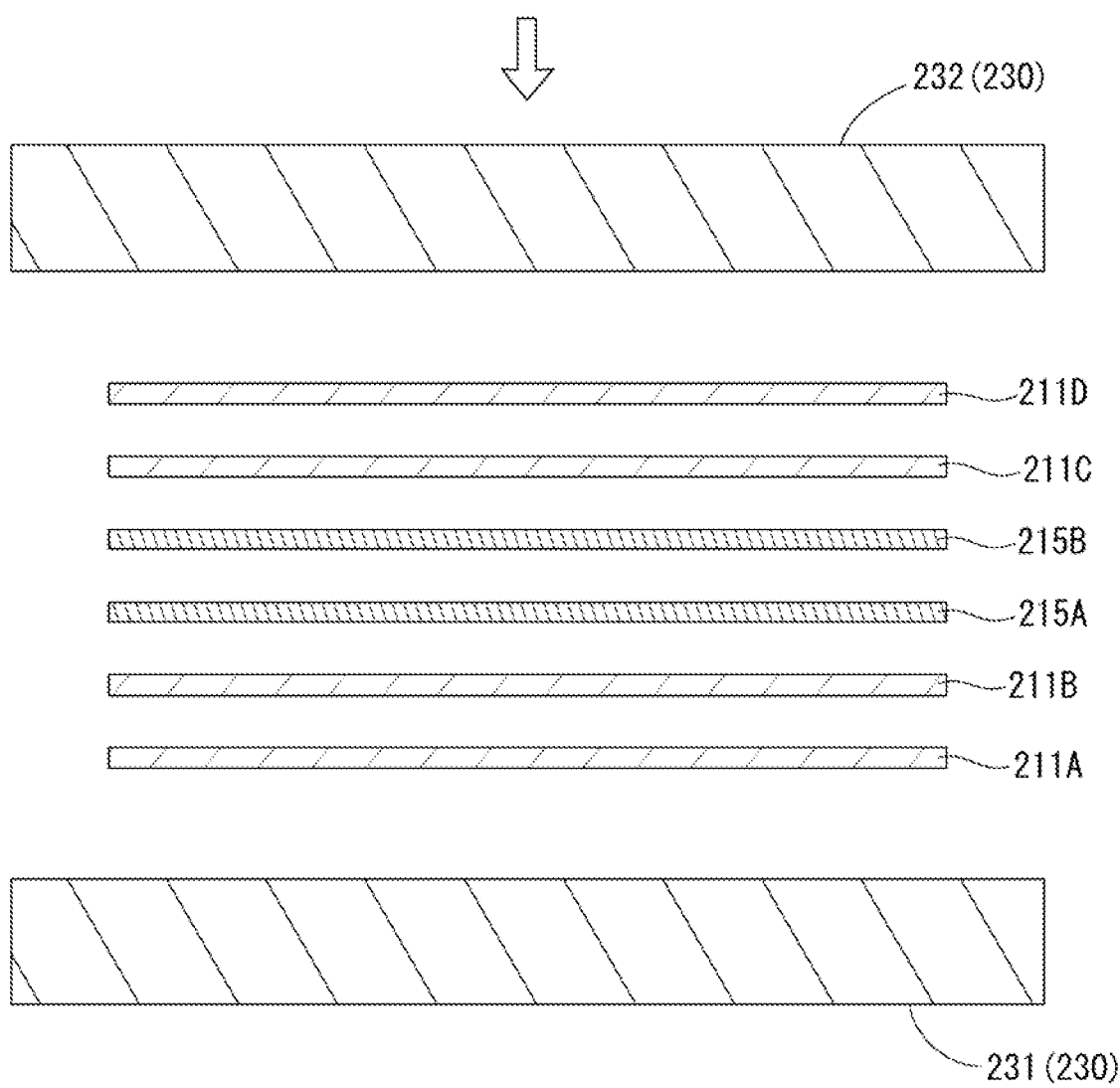
FIG. 15 is a cross-sectional view showing lamination and heat compression in an embodiment of a method for producing a fiber-reinforced molded body of the present disclosure.

The fiber substrate 211 may be a single layer or a plurality of layers, and the number of layers is determined according to, for example, the use of the fiber-reinforced molded body 210. In the forms of FIGS. 14 and 15, the fiber substrate 211 composed of four layers is exemplified. Examples of the fiber substrate 211 include woven fabrics and nonwoven fabrics made of glass fibers, aramid fibers, basalt fibers, and carbon fibers, but are not particularly limited thereto. The fiber substrate 211 is preferably a carbon fiber woven fabric because it is excellent in lightweight and high rigidity. The carbon fiber woven fabric is preferably a woven fabric in which fibers are not unidirectional. Preferred examples thereof include plain weave, twill weave, satin weave, all of which are constituted of warp and weft, and triaxial weave which is constituted of threads in three directions. The carbon fiber woven fabric preferably has a fiber weight of 50 to 600 g/m² from the viewpoint of impregnation of the thermosetting resin contained in the resin sheet 215 and rigidity of the fiber-reinforced molded body 210.
(2) Resin Sheet 215 Containing Thermosetting Resin As the thermosetting resin, a thermosetting resin that is solid at normal temperature (5° C. to 35° C.) is used in the production of the fiber-reinforced molded body 210. The shape of the solid is not particularly limited. Examples of the solid shape include spherical, needle-shaped, and flake-shaped powders.

The resin sheet 215 preferably includes a sheet substrate. When the resin sheet 215 includes the sheet substrate, the strength of the resin sheet 215 is increased, so that the handleability of the resin sheet 215 is improved. Even when the resin sheet 215 does not include the sheet substrate, the handleability is good as compared with the case of using a powder resin.

The structure of the sheet substrate is not particularly limited. The sheet substrate preferably has a structure into which the melted resin can permeate. The structure into which the melted resin can permeate is not particularly limited, and examples thereof include a structure having communication pores. Preferably, the sheet substrate is not melted at the reaction start temperature (Tb) of the thermosetting resin.

The sheet substrate is preferably one or more types selected from the group consisting of a foam, a nonwoven fabric, and a fiber sheet. When the sheet substrate has these structures, the thermosetting resin can be sufficiently retained in the space in the sheet substrate.

The material of the sheet substrate is not particularly limited. The material of the sheet substrate is preferably one or more types selected from the group consisting of urethane, rayon, polyester, and carbon.

Specifically, the sheet substrate is preferably one or more types selected from the group consisting of a urethane foam, a nonwoven fabric made of rayon and polyester (PET), a PET nonwoven fabric, and a carbon fiber sheet.

The thickness of the resin sheet substrate is not particularly limited. The thickness of the resin sheet substrate is preferably 0.05 mm or more and 1.0 mm or less, and more preferably 0.08 mm or more and 0.7 mm or less, from the viewpoint of sufficiently retaining the thermosetting resin necessary for adhesion.

The basis weight of the resin sheet substrate is not particularly limited. The basis weight of the resin sheet substrate is preferably 20 g/m$^2$ or more and 50 g/m$^2$ or less, and more preferably 30 g/m$^2$ or more and 45 g/m$^2$ or less.

The resin sheet 215 is disposed in contact with the fiber substrate 211. When the fiber substrate 211 is heat-compressed together with the resin sheet 215, the thermosetting resin contained in the resin sheet 215 is melted, impregnated into the fiber substrate 211, and cured. As a form of disposing the resin sheet 215 in contact with the fiber substrate 211, the following forms are exemplified. When the fiber substrate 211 is a single layer, the resin sheet 215 is disposed on at least one of the upper surface and the lower surface of the single layer of the fiber substrate 211. When the fiber substrate 211 has a plurality of layers, the resin sheet 215 is disposed on at least one surface, that is, at least one of the uppermost surface, the lowermost surface, and the lamination surface (between the fiber substrates) of the plurality of layers.

The thermosetting resin preferably satisfies $30 \leq (Tb-Ta) \leq 100$ when the melting start temperature is Ta° C. and the curing reaction start temperature is Tb° C. When the value of (Tb−Ta) is in this range, the melted thermosetting resin can be sufficiently impregnated into the fiber substrate 211, so that the fiber-reinforced molded body 210 having uniform physical properties can be obtained.

The thermosetting resin has a minimum viscosity of 2,000 Pa·s or less at a melting start temperature of Ta° C. or higher. The minimum viscosity is preferably 1,500 Pa·s or less. When the minimum viscosity is in this range, the melted thermosetting resin can be sufficiently impregnated into the fiber substrate 211, so that the fiber-reinforced molded body 210 having uniform physical properties can be obtained. The lower limit value of the minimum viscosity is not particularly limited. The lower limit value of the minimum viscosity is preferably 0.005 Pa·s.

The minimum viscosity at the melting start temperature of Ta° C. or higher is the same as the viscosity at the curing reaction start temperature Tb° C.

The thermosetting resin preferably has a maximum viscosity of 1,000 Pa·s or more in a temperature range of the curing reaction start temperature Tb° C. to 190° C. When the maximum viscosity is in this range, the melted thermosetting resin can be impregnated into the fiber substrate 211 and retained therein. As a result, the shapability of the fiber-reinforced molded body 210 is good, and sufficient strength can be obtained in a short time. The upper limit value of the maximum viscosity is not particularly limited, but the upper limit value is preferably 300,000 Pa·s.

The thermosetting resin preferably has a melting start temperature Ta° C. of 60 to 100° C. When the melting start temperature Ta° C. of the thermosetting resin is in this range, temperature control can be easily performed when the laminate in which the resin sheet 215 is disposed between at least any two adjacent fiber substrates 211 is heat-compressed to melt and cure the thermosetting resin.

The thermosetting resin that can satisfy the melting start temperature Ta° C., the curing reaction start temperature Tb° C., the range of the value of (Tb−Ta), the minimum viscosity, and the maximum viscosity as described above is preferably selected from the group consisting of a phenol resin, a mixed resin of a phenol resin and an epoxy resin, a mixed resin of a phenol resin and a cyanate resin, a mixed resin of an epoxy resin and a cyanate resin, and a mixed resin of a phenol resin, an epoxy resin, and a cyanate resin. The phenol resin is excellent in flame retardancy, and thus can impart excellent strength and flame retardancy to the fiber-reinforced molded body 210.

As the phenol resin, for example, a novolac-type powder phenol resin is preferably used. The physical properties of the phenol resin are not particularly limited. For example, a phenol resin having the following physical properties is suitably employed.

Melting point: 80° C. or higher and 100° C. or lower

As the epoxy resin, for example, a bisphenol A type solid resin is preferably used. The physical properties of the epoxy resin are not particularly limited. For example, an epoxy resin having the following physical properties is suitably employed.

Epoxy equivalent: 400 g/eq or more and 1,000 g/eq or less
Softening point: 60° C. or higher and 100° C. or lower
Viscosity: 0.10 Pa·s or more and 0.30 Pa·s or less (25° C.)

The cyanate resin is a thermosetting resin having a cyanato group, and is also called a cyanate monomer. The physical properties of the cyanate resin before curing are not particularly limited. For example, a cyanate resin having the following physical properties is suitably employed.

Melting point: 75° C. or higher and 85° C. or lower
Viscosity: 0.010 Pa·s or more and 0.015 Pa·s or less (80° C.)

Various powder additives such as a pigment, an antibacterial agent, and an ultraviolet absorber may be added to the thermosetting resin as long as the viscosity and reactivity of the thermosetting resin are not affected.

The basis weight of the thermosetting resin in the resin sheet 215 is not particularly limited. The basis weight of the thermosetting resin is preferably 200 g/m² or more and 800 g/m² or less, and more preferably 400 g/m² or more and 600 g/m² or less, from the viewpoint of securing the strength of the fiber-reinforced molded body 210 and from the viewpoint of not impairing the appearance.

(3) Physical Properties of Fiber-Reinforced Molded Body 210

The flexural modulus (based on the method according to JIS K7074 A) of the fiber-reinforced molded body 210 is not particularly limited. The flexural modulus of the fiber-reinforced molded body 210 is preferably 40 GPa or more, more preferably 50 GPa or more from the viewpoint of high rigidity.

The flexural strength (based on the method according to JIS K7074 A) of the fiber-reinforced molded body 210 is not particularly limited. The flexural strength of the fiber-reinforced molded body 210 is preferably 400 MPa or more, more preferably 800 MPa or more from the viewpoint of high strength.

The specific gravity of the fiber-reinforced molded body 210 is not particularly limited. The specific gravity of the fiber-reinforced molded body 210 is preferably 1.10 or more and 1.80 or less, and more preferably 1.30 or more and 1.69 or less from the viewpoint of reducing the weight and not impairing the appearance.

2. Method for Producing Fiber-Reinforced Molded Body 210

The method for producing the fiber-reinforced molded body 210 of the present disclosure is performed by heat-compressing, by a mold, the fiber substrate 211 and the resin sheet 215 in a state of being stacked, so that a thermosetting resin is impregnated into the fiber substrate 211 and cured. With regard to the fiber substrate 211, the resin sheet 215, and the thermosetting resin, the description in the section "1. Fiber-reinforced molded body 210" is referred to as it is.

The form of disposing the resin sheet 215 is as described above, i.e., when the fiber substrate 211 is a single layer, the resin sheet is disposed on at least one of the upper surface and the lower surface of the fiber substrate, and when the fiber substrate 211 is a plurality of layers, the resin sheet is disposed on at least one of the uppermost surface, the lowermost surface, and the lamination surface (between the fiber substrates 211) of the plurality of layers.

When the resin sheet 215 is disposed on the lamination surface (between the fiber substrates 211) of a plurality of layers of the fiber substrates 211, the resin sheet 215 may be disposed on not only one lamination surface (between two adjacent fiber substrates 211), but also on all lamination surfaces (between all fiber substrates) or on every predetermined number of lamination surfaces (between every predetermined number of fiber substrates 211). The position of the surface where the sheet is to be disposed and the number of surfaces where the sheet is disposed are appropriately determined according to, for example, the number of laminated fiber substrates 211.

When the resin sheet 215 is disposed in contact with the upper surface or the lower surface of a single layer of the fiber substrate 211 or the uppermost surface or the lowermost surface of a plurality of layers of the fiber substrates 211, a mold release sheet may be disposed between the resin sheet 215 and the mold surface of the mold for convenience of operation.

An embodiment of a method for producing the fiber-reinforced molded body 210 including the fiber substrate 211 composed of four layers, shown in FIG. 14, will be described with reference to FIG. 15. In the following description of the production method, the plurality of fiber substrates 211 are denoted by a combined reference numeral of "211" and "alphabet", such as "211A", in order to easily grasp the vertical positional relationship in the plurality of fiber substrates 211. Similarly, the plurality of resin sheets 215 are denoted by a combined reference numeral of "215" and "alphabet", such as "215A", in order to easily grasp the vertical positional relationship in the plurality of resin sheets 215.

In the embodiment shown in FIG. 15, when four fiber substrates 211A to 211D are laminated, resin sheets 215A and 215B are disposed between lower two fiber substrates 211A and 211B and upper two fiber substrates 211C and 211D (between the fiber substrate 211B and the fiber substrate 211C).

The amount of the thermosetting resin contained in the resin sheets 215A and 215B is preferably adjusted so that the VF value (%) of the fiber-reinforced molded body 210 is 40 to 70%. The VF value (%) is a value calculated by (total weight of fiber substrate/density of fiber)/(volume of fiber-reinforced molded body)×100.

A laminate of the fiber substrates 211A to 211D, the laminate being prepared by disposing the resin sheets 215A and 215B between the fiber substrate 211B and the fiber substrate 211C and laminating the fiber substrates, is sandwiched between a lower mold 231 and an upper mold 232 of a mold 230 that has been heated, and then the laminate is heat-compressed. The mold 230 is heated by a heating unit such as an electric heater to a temperature Tc° C. at which the thermosetting resin can be melted and cured.

The temperature Tc° C. during heat compression (the temperature Tc° C. of the mold 30) is preferably a temperature satisfying $$[Tb+(Tb-Ta)/3]-15 \leq Tc \leq [Tb+(Tb-Ta)/3]+20$$

with respect to the melting start temperature Ta° C. and the curing reaction start temperature Tb° C. of the thermosetting resin. For example, when Ta° C. is 70° C. and Tb° C. is 130° C., Tc° C. is 135° C. to 170° C.

Pressurization (compression) of the fiber substrates 211A to 211D during heat compression by the mold 230 is preferably 2 MPa to 20 MPa so that the melted thermosetting resin contained in the resin sheets 215A and 215B between the fiber substrates 211 can be satisfactorily impregnated into the fiber substrates 211A to 211D.

The compression percentage (%) of the fiber substrates 211A to 211D is a value calculated as (distance between mold surface of lower mold 231 and mold surface of upper mold 232)/(total thickness of all layers of fiber substrates)×100, and is preferably 60 to 100%.

The thermosetting resin contained in the resin sheets 215A and 215B between the fiber substrates 211 (between the fiber substrate 211B and the fiber substrate 211C) is melted through heating of the laminate by the mold 230, and the melted thermosetting resin is impregnated into the fiber substrates 211B and 211A on the lower side and the fiber substrates 211C and 211D on the upper side through compression of the laminate. Then, the thermosetting resin that has been impregnated into the fiber substrates 211A to 211D is cured, whereby the fiber substrates 211A to 211D are integrated in a compressed state. Thus, the fiber-reinforced molded body 210 of FIG. 14, which is shaped into the shape of the mold surface of the lower mold 231 and the upper mold 232, is obtained.

Figure 16:
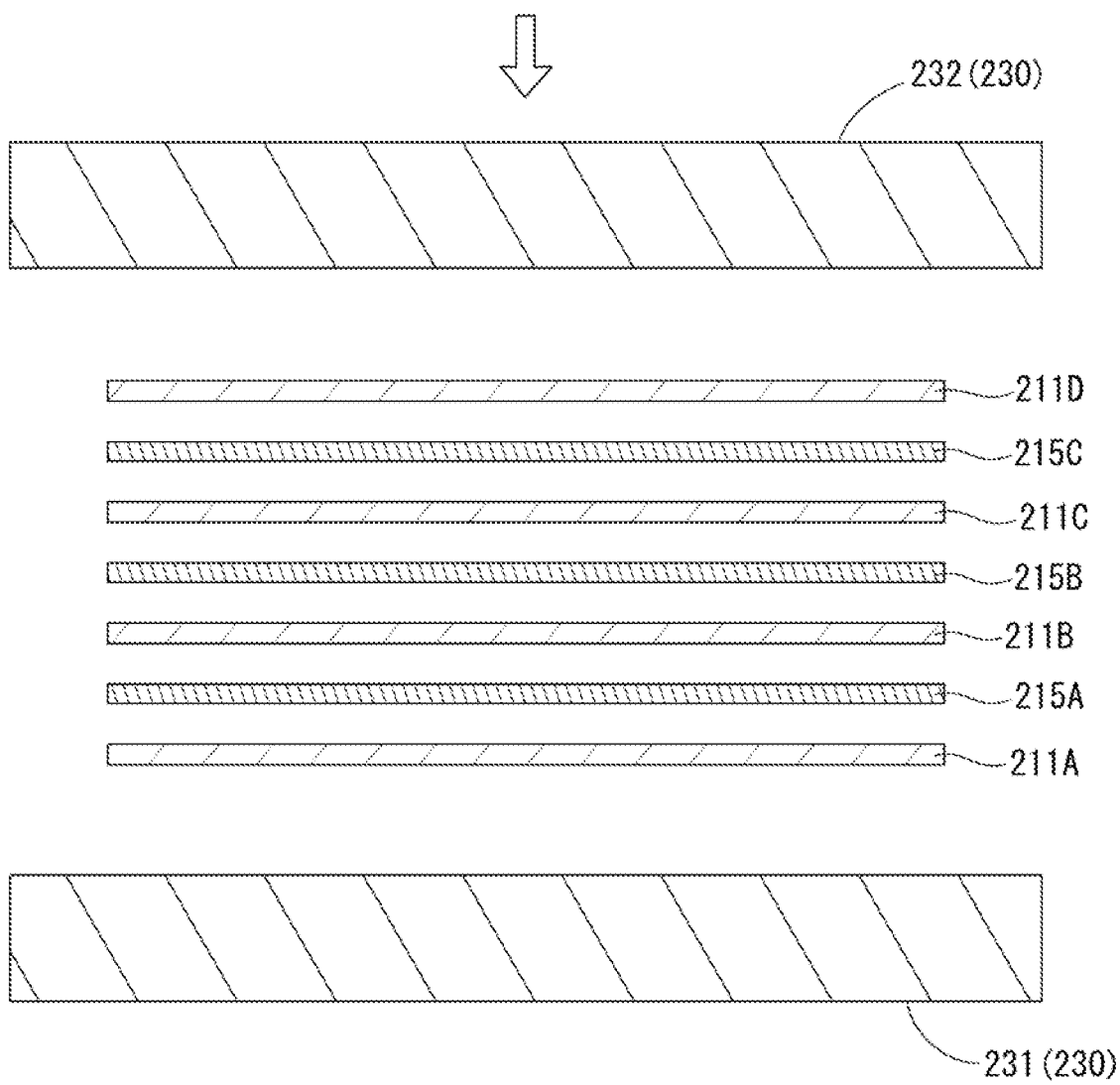
FIG. 16 is a cross-sectional view showing lamination and heat compression in an embodiment of a method for producing a fiber-reinforced molded body of the third aspect.

FIG. 16 shows an embodiment in which four fiber substrates 211A to 211D are laminated, resin sheets 215A to 215C are disposed between all the fiber substrates, and the laminate is heat-compressed by the mold 230.

The amount (total amount) of the thermosetting resin, the heating temperature of the mold 230, the pressurization of the laminate, and the like are as described in the embodiment of FIG. 15.

Figure 17:
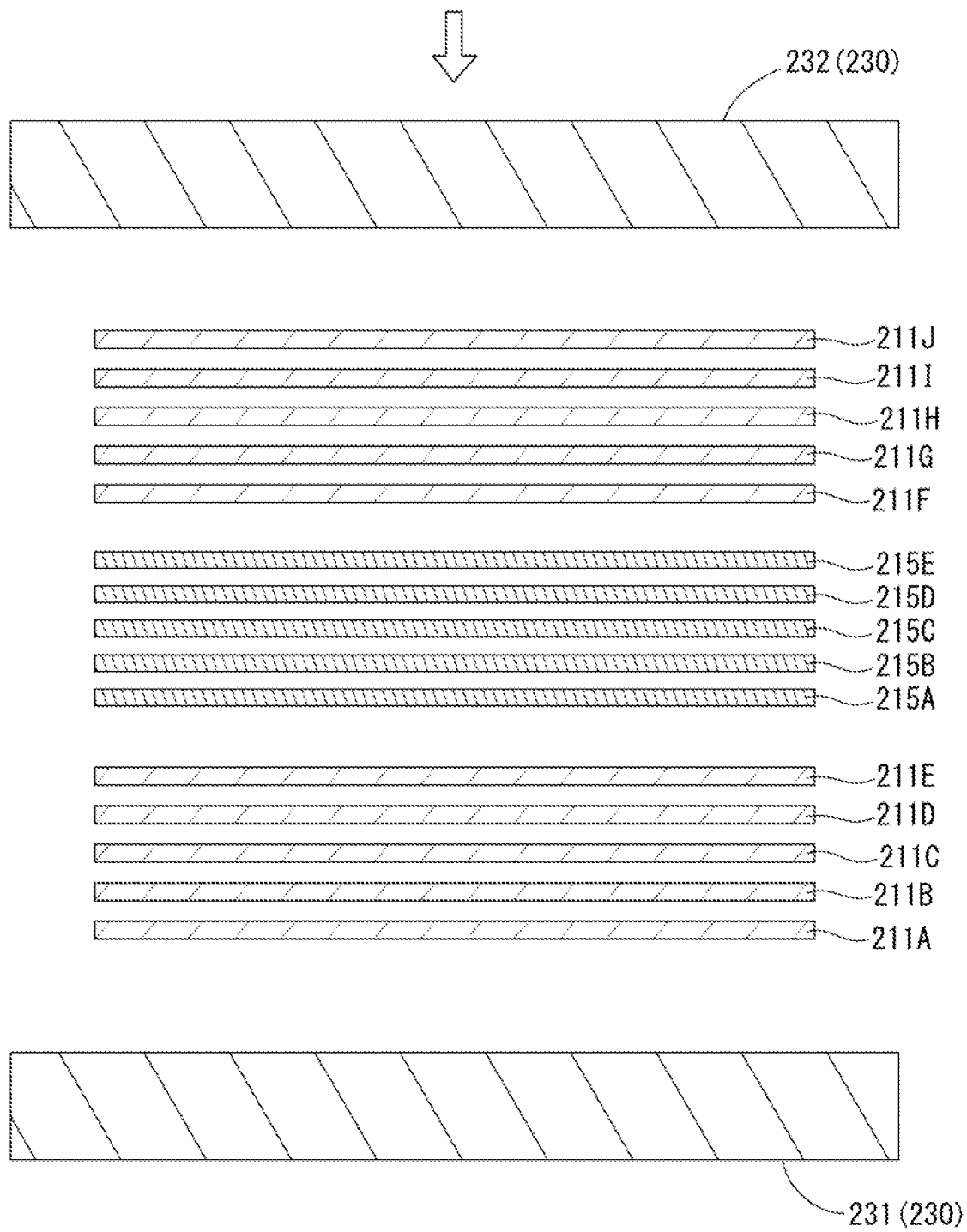
FIG. 17 is a cross-sectional view showing lamination and heat compression in an embodiment of the method for producing a fiber-reinforced molded body of the third aspect.

In the embodiment shown in FIG. 17, when ten fiber substrates 211A to 211J are laminated, five resin sheets 215A to 215E are disposed between lower five fiber substrates 211A to 211E and upper five fiber substrates 211F to 211J (between the fiber substrate 211E and the fiber substrate 211F).

3. Resin Sheet 215

The resin sheet 215 for producing the fiber-reinforced molded body 210 contains a thermosetting resin. That is, the resin sheet 215 supports the thermosetting resin in an uncured state. With regard to the resin sheet 215 and the thermosetting resin, the description in the section "1. Fiber-reinforced molded body 210" is referred to as it is.

EXAMPLES

Fiber-reinforced molded bodies of Examples 1C to 10C and Comparative Examples 1C and 2C were prepared as follows using the thermosetting resins shown in Tables 1 and 2. In Table 4, the characteristics of various sheet substrates used for preparing the fiber-reinforced molded body are collectively described. The viscosity of the thermosetting resin was measured under the following conditions using a rheometer Rheosol-G3000, manufactured by UBM.

1) An amount of 0.4 g of a sample is formed into pellets (diameter $\varphi$: 18 mm, thickness: about 0.4 mm), and the formed pellets are sandwiched between parallel plates having a diameter $\varphi$ of 18 mm.
2) The dynamic viscosity was measured at 2° C. intervals over a temperature range of 40° C. to 200° C. at a temperature rising rate of 5° C./min, a frequency of 1 Hz, and a rotation angle (strain) of 0.1 deg under constant temperature rising.

TABLE 1

|  | Type of thermosetting resin | Proportion of thermosetting resin | Melting start temperature (Ta) [° C.] | Preparation temperature of resin sheet [° C.] | Reaction start temperature (Tb) [° C.] | Tb − Ta [° C.] |
|---|---|---|---|---|---|---|
| Example 1C, 6C-10C | Cyanate resin/ Epoxy resin/ Phenol resin | TA/AM-020-P/ 50235D = 3/1/1 | 69 | 100 | 135 | 66 |
| Example 2C | Cyanate resin/ Epoxy resin/ Phenol resin | TA/AM-030-P/ 50235D = 1/1/1 | 95 | 100 | 135 | 40 |
| Example 3C | Phenol resin/ Epoxy resin | PR-50252/ 1001 = 1/1 | 73 | 100 | 140 | 67 |
| Example 4C | Phenol resin/ Cyanate resin | PR-50235D/ TA = 1/1 | 76 | 100 | 138 | 62 |
| Example 5C | Epoxy resin/ Cyanate resin | 1001/ TA = 1/1 | 75 | 100 | 139 | 64 |
| Comparative Example 1C | Phenol resin | PR-50699 | 72 | 80 | 91 | 19 |
| Comparative Example 2C | Phenol resin/ Phenol resin | PR-50252/ PR-50235D = 1/2 | 80 | 100 | 140 | 60 |

TABLE 2

|  | Minimum viscosity [Pa · s] (2,000 or less) | Maximum viscosity [Pa · s] (1,000 or more) | (Tb − Ta)/3 [° C.] | Tb + (Tb − Ta)/3 [° C.] | Mold temperature [° C.] |
|---|---|---|---|---|---|
| Example 1c, 6C-10C | 59 | 8,768 | 22 | 157 | 160 |
| Example 2C | 1,500 | 209,004 | 13 | 148 | 150 |
| Example 3C | 22 | 5,180 | 22 | 163 | 150 |
| Example 4C | 475 | 51,895 | 21 | 159 | 170 |
| Example 5C | 575 | 19,025 | 21 | 160 | 170 |
| Comparative Example 1C | 118,908 | 164,468 | 6 | 97 | 100 |

TABLE 2-continued

| | Minimum viscosity [Pa·s] (2,000 or less) | Maximum viscosity [Pa·s] (1,000 or more) | (Tb − Ta)/3 [° C.] | Tb + (Tb − Ta)/3 [° C.] | Mold temperature [° C.] |
|---|---|---|---|---|---|
| Comparative Example 2C | 21 | 260 | 20 | 160 | 160 |

TABLE 3

| | Sheet substrate of resin sheet | Number of resin sheets (sheet) | Number of laminated fiber substrates (sheet) | Flexural modulus (GPa) | Flexural strength (MPa) | Specific gravity | Thickness (mm) | Molded body appearance | Disposition of resin |
|---|---|---|---|---|---|---|---|---|---|
| Example 1C | PET nonwoven fabric | 2 | 4 | 71.4 | 1,085 | 1.36 | 0.92 | ○ | Resin sheet is disposed between fiber substrates at center |
| Example 2C | PET nonwoven fabric | 2 | 4 | 40.0 | 410 | 1.36 | 0.92 | ○ | Resin sheet is disposed between fiber substrates at center |
| Example 3C | PET nonwoven fabric | 2 | 4 | 51.0 | 820 | 1.36 | 0.92 | ○ | Resin sheet is disposed between fiber substrates at center |
| Example 4C | PET nonwoven fabric | 2 | 4 | 52.0 | 860 | 1.36 | 0.92 | ○ | Resin sheet is disposed between fiber substrates at center |
| Example 5C | PET nonwoven fabric | 2 | 4 | 40.0 | 410 | 1.36 | 0.92 | ○ | Resin sheet is disposed between fiber substrates at center |
| Example 6C | PET nonwoven fabric | 3 | 4 | 70.0 | 1,000 | 1.36 | 0.90 | ○ | Resin sheet is disposed between respective fiber substrates |
| Example 7C | PET nonwoven fabric | 5 | 10 | 72.0 | 1,100 | 1.40 | 2.00 | ○ | Resin sheet is disposed between fiber substrates at center |
| Example 8C | Urethane resin foam | 2 | 4 | 66.1 | 1,134 | 1.52 | 0.80 | ○ | Resin sheet is disposed between fiber substrates at center |
| Example 9C | Rayon/ Polyester nonwoven fabric | 2 | 4 | 75.0 | 1,003 | 1.45 | 0.85 | ○ | Resin sheet is disposed between fiber substrates at center |
| Example 10C | Carbon fiber sheet | 2 | 4 | 67.5 | 905 | 1.31 | 1.10 | ○ | Resin sheet is disposed between fiber substrates at center |
| Comp. Example 1C | PET nonwoven fabric | 2 | 4 | — | — | — | — | X | Resin sheet is disposed between fiber substrates at center |
| Comp. Example 2C | PET nonwoven fabric | 2 | 4 | — | — | — | — | X | Resin sheet is disposed between fiber substrates at center |

TABLE 4

| Sheet substrate of resin sheet | Thickness (mm) | Weight per unit area (g/m$^2$) |
| --- | --- | --- |
| PET nonwoven fabric | 0.08 | 45 |
| Urethane resin foam | 0.70 | 35 |
| Rayon/Polyester nonwoven fabric | 0.22 | 31 |
| Carbon fiber sheet | 0.34 | 31 |

1. Preparation of Fiber-Reinforced Molded Body (1) Example 1C

As the solid thermosetting resin, a mixed resin prepared by uniformly mixing a cyanate resin (manufactured by Mitsubishi Gas Chemical Company, Inc., product name: CYTESTER TA, average particle size: 100 μm), an epoxy resin (manufactured by DIC Corporation, product name: AM-020-P, average particle size: 100 μm), and a phenol resin (manufactured by Sumitomo Bakelite Co., Ltd., product name: PR-50235D, average particle size: 90 μm) at a weight ratio of 3:1:1 was used.

Figure 18:
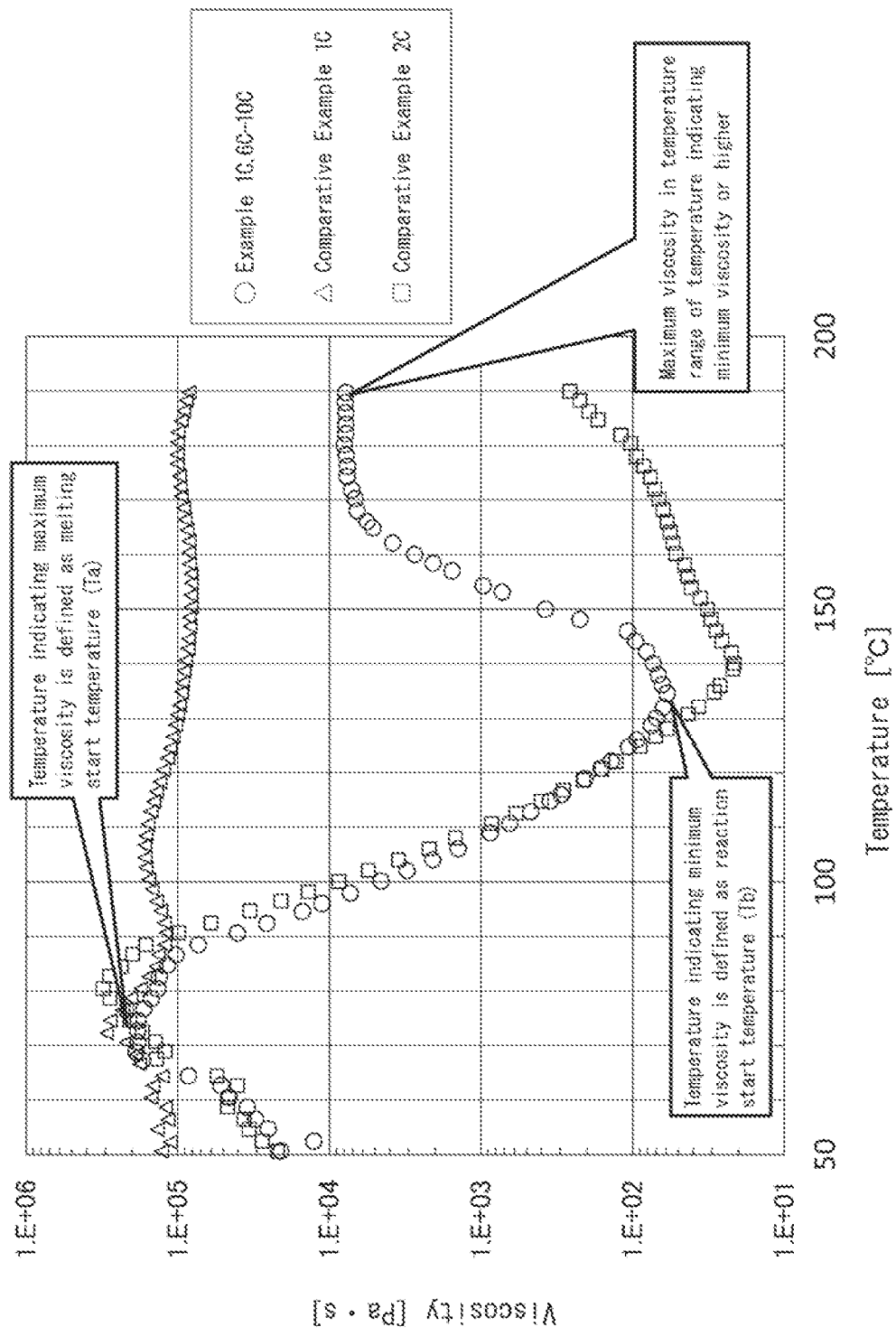
FIG. 18 is a graph showing results of viscosity measurement of mixed resins used in Examples 1C and 6C to 10C, and Comparative Examples 1C and 2C according to the third aspect.

The characteristics of the mixed resin of Example 1C are as follows, and are described in Tables 1 and 2. The results of viscosity measurement of the mixed resin of Example 1C are shown in the graph of FIG. 18.
  Melting start temperature Ta: 69° C.
  Reaction start temperature Tb: 135° C.
  (Tb−Ta): 66° C.
  Minimum viscosity (minimum viscosity at melting start temperature of Ta° C. or higher): 59 Pa·s
  Maximum viscosity (maximum viscosity in temperature range of curing reaction start temperature Tb° C. to 190° C.) 8,768 Pa·s
  Value of (Tb−Ta)/3: 22° C.
  Value of Tb+(Tb−Ta)/3: 157° C.

As the sheet substrate of the resin sheet, a sheet substrate obtained by cutting a PET nonwoven fabric (manufactured by Japan Vilene Company, Ltd., product name: JH-1004N1, weight per unit area: 45 g/m$^2$, thickness: 0.08 mm) shown in Table 4 into a size of 200 mm×250 mm was used.

The solid thermosetting resin (20 g) was disposed on one sheet substrate to prepare a pre-molding sheet substrate.

Next, one pre-molding sheet substrate was disposed on the molding surface of the lower mold of the mold heated to 100° C., and the mold was closed. Then, heat-compression was performed at a pressure of 1 MPa for 1 minute, thereby melting the solid thermosetting resin and causing the sheet substrate to support the thermosetting resin. Thereafter, cooling was performed to prepare a resin sheet.

Two resin sheets thus prepared were prepared. The thickness of the resin sheet was adjusted by disposing a SUS spacer having a thickness of 1 mm between the lower mold and the upper mold, and disposing PET films having a thickness of 0.05 mm above and below the pre-molding sheet substrate.

As the fiber substrate for reinforcement, four sheets of carbon fiber woven fabric (manufactured by Teijin Limited, product name: W-3101, weight per unit area: 200 g/m$^2$, thickness: 0.22 mm) each cut into 200 mm×250 mm were prepared. The weight of the cut carbon fiber woven fabric was 12 g per sheet. First, two sheets of carbon fiber woven fabric were disposed, two resin sheets were disposed thereon, and two sheets of carbon fiber woven fabric were further disposed thereon in this order to prepare a pre-molding laminate. In FIG. 15, a state of lamination is schematically illustrated. In Example 1C, as shown in FIG. 15, two resin sheets are disposed between fiber substrates (carbon fiber woven fabrics) at the center to form a pre-molding laminate.

Next, the pre-molding laminate was disposed on the molding surface of the lower mold of the mold heated to 160° C., and the mold was closed. Then, heat-compression was performed at a pressure of 10 MPa for 10 minutes to melt and cure the solid thermosetting resin. When the solid thermosetting resin was melted and pressure was applied, the resin was impregnated into the fiber substrate of each layer, and then thermal curing of the solid thermosetting resin was completed. Thus, a fiber-reinforced molded body, in which the fiber substrate was integrated by the thermosetting resin of the resin sheet, was prepared. The thickness of the fiber-reinforced molded body was adjusted by disposing a SUS spacer having a thickness of 1 mm between the lower mold and the upper mold for press molding to adjust the distance between the lower mold and the upper mold.

(2) Example 2C

A fiber-reinforced molded body was prepared in the same manner as in Example 1C except that a mixed resin prepared by uniformly mixing a cyanate resin (manufactured by Mitsubishi Gas Chemical Company, Inc., product name: CYTESTER TA, average particle size: 100 μm), an epoxy resin (manufactured by DIC Corporation, product name: AM-030-P, average particle size: 100 μm), and a phenol resin (manufactured by Sumitomo Bakelite Co., Ltd., product name; PR-50235D, average particle size: 90 μm) at a weight ratio of 1:1:1 was used as the solid thermosetting resin, and the mold temperature during molding of the fiber-reinforced molded body was 150° C.

The characteristics of the mixed resin of Example 2C are as follows, and are described in Tables 1 and 2.
  Melting start temperature Ta: 95° C.
  Reaction start temperature Tb: 135° C.
  (Tb−Ta): 40° C.
  Minimum viscosity (minimum viscosity at melting start temperature of Ta° C. or higher): 1,500 Pa·s
  Maximum viscosity (maximum viscosity in temperature range of curing reaction start temperature Tb° C. to 190° C.) 209,004 Pa·s
  Value of (Tb−Ta)/3: 13° C.
  Value of Tb+(Tb−Ta)/3: 148° C.

(3) Example 3C

A fiber-reinforced molded body was prepared in the same manner as in Example 1C except that a mixed resin prepared by uniformly mixing a phenol resin (manufactured by Sumitomo Bakelite Co., Ltd., product name: PR-50252, average particle size: 30 μm) and an epoxy resin (manufactured by Mitsubishi Chemical Corporation, product name: jER-1001, average particle size: 100 μm) at a weight ratio of 1:1 was used as the solid thermosetting resin, and the mold temperature during molding of the fiber-reinforced molded body was 150° C.

The characteristics of the mixed resin of Example 3C are as follows, and are described in Tables 1 and 2.
  Melting start temperature Ta: 73° C.
  Reaction start temperature Tb: 140° C.
  (Tb−Ta): 67° C.

Minimum viscosity (minimum viscosity at melting start temperature of Ta° C. or higher): 22 Pa·s
Maximum viscosity (maximum viscosity in temperature range of curing reaction start temperature Tb° C. to 190° C.) 5,180 Pa·s
Value of (Tb−Ta)/3: 22° C.
Value of Tb+(Tb−Ta)/3: 163° C.

(4) Example 4C

A fiber-reinforced molded body was prepared in the same manner as in Example 1C except that a mixed resin prepared by uniformly mixing a phenol resin (manufactured by Sumitomo Bakelite Co., Ltd., product name; PR-50235D, average particle size: 90 μm) and a cyanate resin (manufactured by Mitsubishi Gas Chemical Company, Inc., product name: CYTESTER TA, average particle size: 100 μm) at a weight ratio of 1:1 was used as the solid thermosetting resin, and the mold temperature during molding of the fiber-reinforced molded body was 170° C.

The characteristics of the mixed resin of Example 4C are as follows, and are described in Tables 1 and 2.
  Melting start temperature Ta: 76° C.
  Reaction start temperature Tb: 138° C.
  (Tb−Ta): 62° C.
  Minimum viscosity (minimum viscosity at melting start temperature of Ta° C. or higher): 475 Pa·s
  Maximum viscosity (maximum viscosity in temperature range of curing reaction start temperature Tb° C. to 190° C.) 51,895 Pa·s
  Value of (Tb−Ta)/3: 21° C.
  Value of Tb+(Tb−Ta)/3: 159° C.

(5) Example 5C

A fiber-reinforced molded body was prepared in the same manner as in Example 1C except that a mixed resin prepared by uniformly mixing an epoxy resin (manufactured by Mitsubishi Chemical Corporation, product name: jER-1001, average particle size: 100 μm) and a cyanate resin (manufactured by Mitsubishi Gas Chemical Company, Inc., product name: CYTESTER TA, average particle size: 100 μm) at a weight ratio of 1:1 was used as the solid thermosetting resin, and the mold temperature during molding of the fiber-reinforced molded body was 170° C.

The characteristics of the mixed resin of Example 5C are as follows, and are described in Tables 1 and 2.
  Melting start temperature Ta: 75° C.
  Reaction start temperature Tb: 139° C.
  (Tb−Ta): 64° C.
  Minimum viscosity (minimum viscosity at melting start temperature of Ta° C. or higher): 575 Pa·s
  Maximum viscosity (maximum viscosity in temperature range of curing reaction start temperature Tb° C. to 190° C.) 19,025 Pa·s
  Value of (Tb−Ta)/3: 21° C.
  Value of Tb+(Tb−Ta)/3: 160° C.

(6) Example 6C

A fiber-reinforced molded body was prepared in the same manner as in Example 1C except that same four fiber substrates for reinforcement as in Example 1C and the same three resin sheets as in Example 1C were prepared, and one resin sheet was disposed between respective layers of the fiber substrate as shown in FIG. 16.

(7) Example 7C

A fiber-reinforced molded body was prepared in the same manner as in Example 1C except that a pre-molding substrate was prepared by preparing the same ten fiber substrates for reinforcement as in Example 1C, laminating five fiber substrates, disposing five resin sheets thereon, and further laminating the remaining five fiber substrates thereon. In FIG. 17, a state of lamination is schematically illustrated.

(8) Example 8C

A fiber-reinforced molded body was prepared in the same manner as in Example 1C except that a urethane resin foam (manufactured by INOAC Corporation, product name: MF-50, weight per unit area: 35 g/m$^2$) cut into a thickness of 0.7 mm and a planar size of 200 mm×300 mm was used as the sheet substrate.

(9) Example 9C

A fiber-reinforced molded body was prepared in the same manner as in Example 1C except that a rayon/polyester nonwoven fabric (manufactured by Kuraray Trading Co., Ltd., product name: SF-30C, weight per unit area: 31 g/m$^2$) cut into a thickness of 0.22 mm and a planar size of 200 mm×300 mm was used as the sheet substrate.

(10) Example 10C

A fiber-reinforced molded body was prepared in the same manner as in Example 1C except that a carbon fiber sheet (manufactured by Awa Paper & Technological Company, Inc., product name: CARMIX C-2, weight per unit area: 31 g/m$^2$) cut into a thickness of 0.34 mm and a planar size of 200 mm×300 mm was prepared as a sheet substrate.

(11) Comparative Example 1C

A fiber-reinforced molded body was prepared in the same manner as in Example 1C except that a phenol resin (manufactured by Sumitomo Bakelite Co., Ltd., product name: PR-50699, average particle size: 30 μm) was used as the solid thermosetting resin, the mold temperature in the preparation of the resin sheet was 80° C., and the mold temperature during molding of the fiber-reinforced molded body was 100° C. The viscosity of the resin was high (the reaction was fast), the impregnation property of the resin was poor, and a uniform fiber-reinforced molded body could not be obtained.

The characteristics of the resin of Comparative Example 1C are as follows, and are described in Tables 1 and 2. The results of viscosity measurement of the resin of Comparative Example 1C are shown in the graph of FIG. 18.
  Melting start temperature Ta: 72° C.
  Reaction start temperature Tb: 91° C.
  (Tb−Ta): 19° C.
  Minimum viscosity (minimum viscosity at melting start temperature of Ta° C. or higher): 118,908 Pa·s
  Maximum viscosity (maximum viscosity in temperature range of curing reaction start temperature Tb° C. to 190° C.) 164,468 Pa·s
  Value of (Tb−Ta)/3: 6° C.
  Value of Tb+(Tb−Ta)/3: 100° C.

(12) Comparative Example 2C

A fiber-reinforced molded body was prepared in the same manner as in Example 1C except that a mixed resin of two types of phenol resins (weight ratio: 1:2) (product name: PR-50252, average particle size: 30 μm, manufactured by Sumitomo Bakelite Co., Ltd., and product name: PR-50235D, average particle size: 90 μm, manufactured by Sumitomo Bakelite Co., Ltd.) was used as the solid thermosetting resin, and the mold temperature during molding of the fiber-reinforced molded body was 160° C. The resin was not sufficiently cured, and deformation occurred at the time of demolding.

The characteristics of the resin of Comparative Example 2C are as follows, and are described in Tables 1 and 2. The results of viscosity measurement of the resin of Comparative Example 2C are shown in the graph of FIG. 18.

Melting start temperature Ta: 80° C.
Reaction start temperature Tb: 140° C.
(Tb−Ta): 60° C.
Minimum viscosity (minimum viscosity at melting start temperature of Ta° C. or higher): 21 Pa·s
Maximum viscosity (maximum viscosity in temperature range of curing reaction start temperature Tb° C. to 190° C.) 260 Pa·s
Value of (Tb−Ta)/3: 20° C.
Value of Tb+(Tb−Ta)/3: 160° C.

2. Physical Properties and the Like of Fiber-Reinforced Molded Body (1) Measurement Method The thickness (mm), flexural strength (MPa), and flexural modulus (GPa) of each of the fiber-reinforced molded bodies of Examples 1C to 10C and Comparative Examples 1C and 2C were measured, and the appearance thereof was evaluated. The results are shown in Table 3.

A test piece was cut out from the fiber-reinforced molded body, and the flexural strength and the flexural modulus thereof were measured based on the method according to JIS K7074 A.

The appearance was visually confirmed. In the evaluation of the appearance, presence of a defect such as deformation or non-uniformity of impregnation of resin on the surface of the fiber-reinforced molded body was visually confirmed, and the case where there was no defect was evaluated as "○", and the case where there was a defect was evaluated as "×"

The thickness of each part of the fiber-reinforced molded body was measured by observing the cross section of the fiber-reinforced molded body with a digital microscope VHX-5000 (manufactured by Keyence Corporation). The thickness in Table 3 is the thickness near the central part of the fiber-reinforced molded body.

The specific gravity was calculated from the weight of the fiber-reinforced molded body and the volume of the fiber-reinforced molded body. The volume of the fiber-reinforced molded body was calculated from the thickness and area of the fiber-reinforced molded body.

(2) Measurement Results

The measurement results are shown in Table 3.

The fiber-reinforced molded bodies of Examples 1C to 10C satisfy the following requirements (a) and (b). On the other hand, the fiber-reinforced molded body of Comparative Example 1C does not satisfy the requirement (a). In Comparative Example 1C which did not satisfy the requirement (a), the viscosity of the resin was high, and thus impregnation property of the resin was poor, and a uniform fiber-reinforced molded body could not be obtained. The fiber-reinforced molded body of Comparative Example 2C does not satisfy the requirement (b). In the fiber-reinforced molded body of Comparative Example 2C which did not satisfy the requirement (b), the curing of the resin was not sufficient, and deformation occurred at the time of demolding.

In the fiber-reinforced molded bodies of Examples 1C to 10C which satisfied the requirements (a) and (b), a fiber-reinforced resin composite excellent in appearance, strength, and weight reduction could be obtained by a simple method without using a prepreg, by controlling the melting characteristics and curing characteristics of the solid thermosetting resin. In addition, it can be seen that in the fiber-reinforced molded bodies of Examples 1C to 10C, the resin sheet (resin-supporting sheet) can be prepared by a simple method, scattering of the powder can be prevented, an organic solvent or the like is not used in the production process, therefore, the working environment is excellent, and the problem of air pollution does not occur.

Requirement (a): the viscosity at the curing reaction start temperature Tb° C. (minimum viscosity) is 2,000 Pa·s or less.

Requirement (b): the maximum viscosity in a temperature range of the curing reaction start temperature Tb° C. to 190° C. is 1,000 Pa·s or more.

In the fiber-reinforced molded bodies of Examples 1C to 10C which further satisfy the following requirement (c), the fiber substrate could be sufficiently impregnated with the melted thermosetting resin, and a fiber-reinforced molded body having uniform physical properties could be obtained.

Requirement (c): 30≤(Tb−Ta)≤100 is satisfied.

The following inventions can also be grasped from the above Examples and Comparative Examples. The above description is appropriately incorporated for the description of specific matters of the following disclosure.

A fiber-reinforced molded body obtained by impregnating a thermosetting resin into a laminate in which a fiber substrate and a sheet substrate different from the fiber substrate are laminated.

3. Effects of Examples

According to the above Examples, a fiber-reinforced resin composite excellent in appearance, strength, and weight reduction could be obtained. In addition, it has been confirmed that a resin sheet can be prepared by a simple method, scattering of powder can be prevented, and an organic solvent or the like is not used in the production process, so that the working environment is excellent, and the problem of air pollution does not occur.

The present aspect is not limited to Examples described in detail above, and various modifications or changes can be made.

Fourth Aspect

An embodiment of the fourth aspect will be described. In a fiber-reinforced sandwich composite 310 of an embodiment shown in FIG. 19, a fiber substrate 311 and a core component 315 are heat-compressed together with a thermosetting resin 321, and bonded and integrated by curing of the thermosetting resin 321.

The fiber substrate 311 may be a single layer or a plurality of layers, and the number of layers is determined according to, for example, the use of the fiber-reinforced sandwich composite 310. In the illustrated form, the fiber substrate 311 is composed of four layers. Examples of the fiber substrate 311 include woven fabrics and nonwoven fabrics made of glass fibers, aramid fibers, basalt fibers, and carbon fibers, but are not particularly limited thereto. The fiber substrate 311 is preferably a carbon fiber woven fabric because it is excellent in lightweight and high rigidity. The carbon fiber woven fabric is preferably a woven fabric in which fibers are not unidirectional. Preferred examples thereof include plain weave, twill weave, satin weave, all of which are constituted of warp and weft, and triaxial weave which is constituted of threads in three directions. The carbon fiber woven fabric preferably has a fiber weight of 50 to 600 g/m² from the viewpoint of impregnation of the thermosetting resin 321 and rigidity of the fiber-reinforced sandwich composite 310.

The core component 315 has an effect of improving the strength of the fiber-reinforced sandwich composite 310, and preferably has a 5% compressive stress value of 0.15 MPa or more. A more preferable range of the 5% compressive stress is 0.15 to 1 MPa. The 5% compressive stress is a stress when a core component cut into a size of 50×50 mm is compressed by 5% with respect to the thickness of the core component at a speed of 5 mm/min with a disk-shaped compression element having a diameter of 80 mm. An example of the stress measuring device is Autograph AG-X, manufactured by Shimadzu Corporation.

The density (JIS 28807) of the core component 315 is preferably 20 to 120 kg/m³.

The core component 315 is preferably a foam having a closed cell structure. The foam having a closed cell structure has a structure in which cells (air bubbles) do not communicate with each other and are closed and independent from each other. When a foam having a closed cell structure is used as the core component 315, the thermosetting resin melted in the production of the fiber-reinforced sandwich composite 310 does not easily permeate the core component 315 having a closed cell structure, and the surface appearance of the fiber-reinforced sandwich composite 310 becomes excellent. If the core component 315 is composed of a foam having an open-cell structure in which cells are opened and communicated with each other, the melted thermosetting resin easily permeates the core component 315 having an open-cell structure in the production of the fiber-reinforced sandwich composite 310. As a result, the thermosetting resin may be reduced on the surface of the fiber-reinforced sandwich composite 310, which may impair the appearance of the fiber-reinforced sandwich composite.

Examples of the foam having a closed cell structure that constitutes the core component 315 include polyethylene terephthalate foam (PET foam), polymethacrylamide foam (PMI foam), polyvinyl chloride foam (PVC foam), and rigid polyurethane foam (rigid PU foam).

The thickness of the core component 315 is determined according to the use of the fiber-reinforced sandwich composite 310 or the like, and is, for example, about 3 to 20 mm.

The core component 315 is not limited to a single layer, and may be a multilayer. When the core component 315 is a single layer and the fiber substrate 311 is a multilayer, the core component 315 is preferably located between the fiber substrates 311.

A method for producing the core component 315 is not particularly limited. Examples thereof include the following production methods.

A method in which resin foam particles are charged into a mold, the resin foam particles are heated by a heat medium such as hot water or water vapor to be foamed, and the foamed particles are fused and integrated by foaming pressure of the resin foam particles, thereby producing a foam having a desired shape (in-mold foaming molding method).

A method in which a resin is supplied to an extruder together with an air bubble adjusting agent and the like, melt-kneaded in the presence of a foaming agent such as a chemical foaming agent or a physical foaming agent, and the melt-kneaded product is extruded and foamed from the extruder, thereby producing a foam (extrusion foaming method).

A method in which a massive foamable resin molded body containing a chemical foaming agent is produced, and the foamable resin molded body is foamed in a mold, thereby producing a foam.

As the thermosetting resin 321, a solid powdery thermosetting resin is used in the production of the fiber-reinforced sandwich composite 310. The shape of the powder is not particularly limited, and examples thereof include a spherical shape, a needle shape, and a flake shape. The powder of the thermosetting resin 321 is preferably disposed in contact with at least the fiber substrate 311 and the core component 315. For example, when the core component 315 is composed of a single layer, the powder of the thermosetting resin 321 may be disposed at least between the fiber substrate 311 and the core component 315. When the fiber substrate 311 is composed of a plurality of layers, the powder of the thermosetting resin 321 may be disposed not only between the fiber substrate 311 and the core component 315 but also between the fiber substrates 311. Further, when a plurality of layers of the core component 315 are laminated in contact with each other, the thermosetting resin powder 321 is preferably disposed between the fiber substrate 311 and the core component 315 and between the core components 315.

The powder of the thermosetting resin 321 is melted when heat-compressed together with the fiber substrate 311 and the core component 315, and the melted thermosetting resin is impregnated into the fiber substrate 311 and is cured in contact with the core component 315.

The thermosetting resin 321 preferably has a viscosity of preferably 2,000 Pa·s or less, and more preferably 1,500 Pa·s or less at the curing reaction start temperature $Tb°$ C. When the viscosity at the curing reaction start temperature $Tb°$ C. is in this range, the melted thermosetting resin 321 can be sufficiently impregnated into the fiber substrate 311. As a result, the fiber-reinforced sandwich composite 310 having uniform physical properties can be obtained.

The thermosetting resin 321 preferably has a maximum viscosity of 1,000 Pa·s or more in a temperature range of the curing reaction start temperature $Tb°$ C. to 190° C. When the maximum viscosity is in this range, the melted thermosetting resin 321 can be impregnated into the fiber substrate 311 and sufficiently cured. As a result, the shapability of the fiber-reinforced sandwich composite 310 is good, and sufficient strength can be obtained in a short time.

The melting start temperature $Ta°$ C. and the curing reaction start temperature $Tb°$ C. of the thermosetting resin 321 are set to temperatures satisfying preferably $[Tb+(Tb-Ta)/3]-15 \leq Tc \leq [Tb+(Tb-Ta)/3]+20$, more preferably $[Tb+(Tb-Ta)/3]-10 \leq Tc \leq [Tb+(Tb-Ta)/3]+20$ with respect to the temperature $Tc°$ C. during heat compression. When the melting start temperature $Ta°$ C. and the curing reaction start temperature $Tb°$ C. of the thermosetting resin 321, and the temperature $Tc°$ C. during heat compression are in this relationship, the powder of the thermosetting resin 321 is favorably melted during heat compression, and the thermosetting resin 321 is easily impregnated into the fiber substrate 311. As a result, the fiber-reinforced sandwich composite 310 having uniform physical properties can be obtained.

The value obtained by subtracting the melting start temperature Ta° C. from the curing reaction start temperature Tb° C. of the thermosetting resin 321 satisfies preferably 30 (Tb−Ta)≤100, and more preferably 40≤(Tb−Ta)≤70. When the value of (Tb−Ta) is in this range, the melted thermosetting resin 321 can be sufficiently impregnated into the fiber substrate 311, and the fiber-reinforced sandwich composite 310 having uniform physical properties can be obtained.

The thermosetting resin 321 preferably has a melting start temperature Ta° C. of 60 to 100° C. When the melting start temperature Ta° C. of the thermosetting resin 321 is in this range, temperature control can be easily performed during heat compression.

The thermosetting resin that can satisfy the melting start temperature Ta° C., the curing reaction start temperature Tb° C., the range of the value of (Tb−Ta), the minimum viscosity, the maximum viscosity, and the like as described above is preferably selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin. The phenol resin is excellent in flame retardancy, and thus can impart excellent strength and flame retardancy to the fiber-reinforced sandwich composite 310.

Various powder additives such as a pigment, an antibacterial agent, and an ultraviolet absorber may be added to the thermosetting resin 321 as long as the viscosity and reactivity of the thermosetting resin are not affected.

The production of the fiber-reinforced sandwich composite of the present disclosure can be performed by disposing the powder of the thermosetting resin 321 in contact with the fiber substrate 311 and the core component 315; heat-compressing the fiber substrate 311 and the core component 315 together with the powder of the thermosetting resin 321 by a mold so that the powder of the thermosetting resin 321 is melted, impregnated into the fiber substrate 311, and cured in a state being in contact with the core component 315.

Figure 19:
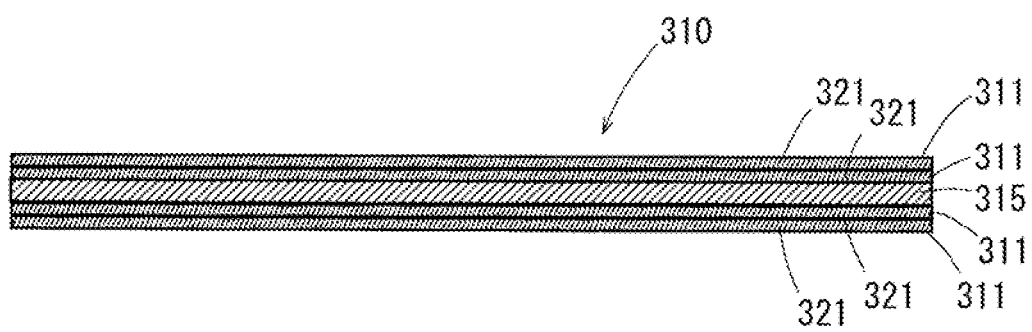
FIG. 19 is a cross-sectional view of a fiber-reinforced sandwich composite according to an embodiment of the fourth aspect.

An embodiment of a method for producing the fiber-reinforced sandwich composite 310 shown in FIG. 19 will be described with reference to FIG. 20. In the following description of the production method, the fiber substrates 311 located at a plurality of positions are denoted by a combined reference numeral of number and alphabet, such as "311A", in order to easily grasp the vertical positional relationship.

Figure 20:
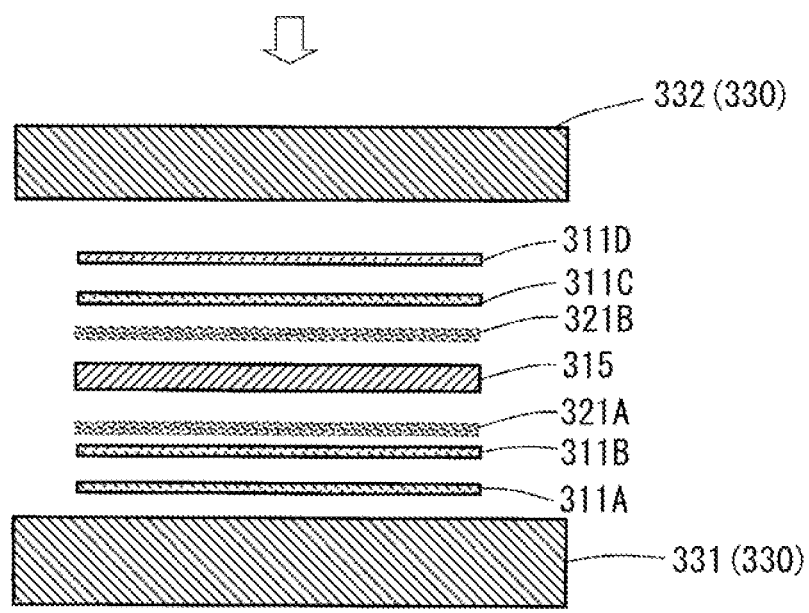
FIG. 20 is a cross-sectional view showing lamination and heat compression in an embodiment of a method for producing a fiber-reinforced sandwich composite of the fourth aspect.

In the embodiment shown in FIG. 20, a pre-molding laminate is prepared by laminating two fiber substrates 311A and 311B among four fiber substrates 311A to 311D, disposing the thermosetting resin powder 321A on the two fiber substrates, disposing the core component 315 thereon, disposing a thermosetting resin powder 321B thereon, and laminating the remaining two fiber substrates 311C and 311D thereon.

The particle sizes of the thermosetting resin powders 321A and 321B are preferably 10 to 500 μm from the viewpoint of ease of melting. The amounts of the thermosetting resin powders 321A and 321B are preferably adjusted so that the VF value (%) of the molded body excluding the foam portion of the core component is 40 to 70%. The VF value (%) is a value calculated by (total weight of fiber substrate/density of fiber)/(volume of molded body excluding foam portion of core component)×100.

The prepared pre-molding laminate is sandwiched between a lower mold 331 and an upper mold 332 of a heated mold 330, and is heat-compressed. A plastic mold release film or the like may be disposed on the mold surface of the mold. The mold 330 is heated by a heating unit such as an electric heater to Tc° C. that is the temperature during heat compression.

Pressurization (compression) of the pre-molding laminate during heat compression by the mold 330 is preferably 2 to 20 MPa so that the melted thermosetting resin of the thermosetting resin powders 321A and 321B can be satisfactorily impregnated into the fiber substrates 311A to 311D.

The thermosetting resin powders 321A and 321B located on both sides (upper and lower sides) of the core component 315 are melted through heating of the laminate by the mold 330, and the melted thermosetting resin are impregnated into the fiber substrates 311B and 311A on the lower side and the fiber substrates 311C and 311D on the upper side through compression of the pre-molding laminate. Then, the thermosetting resin impregnated into the fiber substrates 311A to 311D and in contact with the core component 315 is cured, whereby the fiber substrates 311A to 311D and the core component 315 between the fiber substrates 311B and 311C are bonded and integrated in a compressed state. Thus, the fiber-reinforced sandwich composite 310 of FIG. 19, which is shaped into the shape of the mold surface of the lower mold 331 and the upper mold 332, is obtained.

EXAMPLES

Fiber-reinforced sandwich composites of Examples 1D to 7D and Comparative Examples 1D to 3D shown in FIG. 23 were prepared using the core components shown in FIG. 21 and the thermosetting resin powders shown in FIG. 22.

The 5% compressive stress of the core component was determined by measuring a stress when a core component cut into a size of 50×50 mm was compressed by 5% with respect to the thickness of the core component at a speed of 5 mm/min with a disk-shaped compression element having a diameter of 80 mm. The stress measuring device is Autograph AG-X, manufactured by Shimadzu Corporation.

The viscosity of the thermosetting resin was measured under the following conditions using a rheometer Rheosol-G3000, manufactured by UBM.
 1) An amount of 0.4 g of a sample is formed into pellets (diameter φ: 18 mm, thickness: about 0.4 mm), and the formed pellets are sandwiched between parallel plates having a diameter φ of 18 mm.
 2) The dynamic viscosity was measured at 2° C. intervals over a temperature range of 40° C. to 200° C. at a temperature rising rate of 5° C./min, a frequency of 1 Hz, and a rotation angle (strain) of 0.1 deg under constant temperature rising.

For the fiber-reinforced sandwich composites of Examples 1D to 7D and Comparative Examples 1D to 3D, the product appearance was evaluated, and the density, thickness, flexural strength, and flexural modulus were measured.

For the product appearance, presence of a defect such as deformation or non-uniformity of impregnation of resin on the surface of the fiber-reinforced sandwich composite was visually confirmed, and the case where there was no defect was evaluated as "○", and the case where there was a defect was evaluated as "×"

The density was measured according to JIS Z8807. The flexural strength and flexural modulus were measured based on the method according to JIS K7074 A.

Example 1D

As the fiber substrate, four sheets of carbon fiber woven fabric (manufactured by Teijin Limited, product name:

W-3101, weight per unit area: 200 g/m², thickness: 0.22 mm) each cut into 210×297 mm were prepared. The weight of the cut fiber substrate was 12.5 g per sheet. Two cut fiber substrates were laminated, and 25 g of the following resin A3 as the thermosetting resin powder was disposed thereon substantially uniformly. A core component obtained by cutting a polyethylene terephthalate foam (3A, manufactured by Composites Airex, AIREX (T10)) having a closed cell structure into a size of 210×297 mm was disposed on the resin A3. Then, 25 g of the resin A3 was disposed thereon substantially uniformly, and the remaining two fiber substrates were laminated thereon. Thus, a pre-molding laminate was prepared.

The resin A3 is a phenol resin (manufactured by Sumitomo Bakelite Co., Ltd., product name: PR-50252, average particle size: 30 μm).

Figure 24:
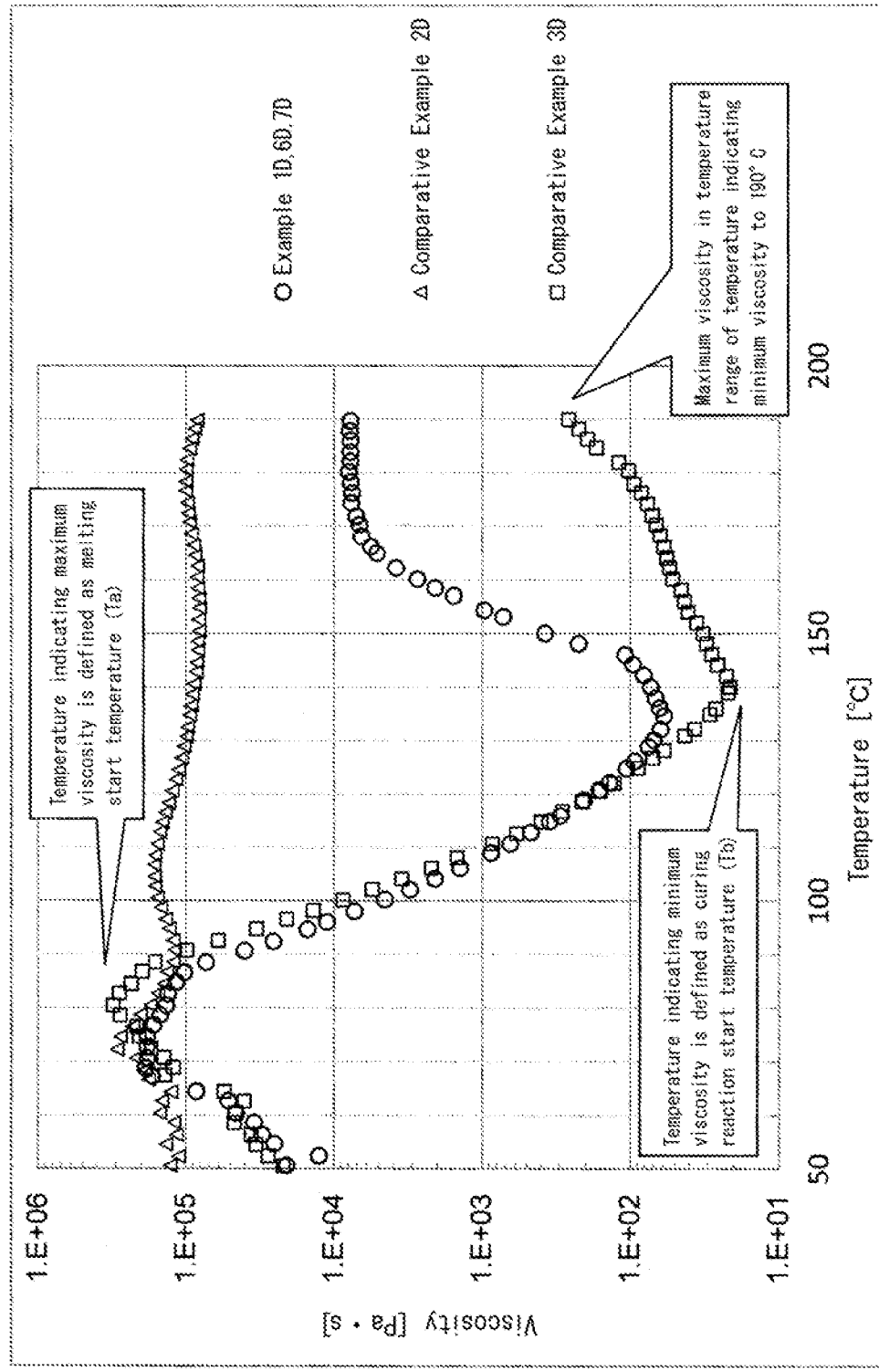
FIG. 24 is a graph showing results of viscosity measurement of thermosetting resins used in Examples 1D, 6D, and 7D and Comparative Examples 2D and 3D according to the fourth aspect.

The results of viscosity measurement of the resin A3 (Examples 1D, 6D, 7D) are shown in the graph of FIG. 24.

The pre-molding laminate was disposed on a molding surface (mold surface) of a lower mold of a mold heated to 150° C., and an upper mold of the mold was placed on the pre-molding laminate to close the mold. The laminate was heat-compressed at a pressure of 5 MPa for 10 minutes. The thermosetting resin powder is melted through heating, the melted thermosetting resin is impregnated into the fiber substrate of each layer through compression of the pre-molding laminate, and the thermosetting resin was completely cured in a state of being in contact with the core component. Thus, a fiber-reinforced sandwich composite of Example 1D, in which the fiber substrate and the core component are laminated and integrated by curing of the thermosetting resin, was prepared.

The fiber-reinforced sandwich composite of Example 1D has a product appearance of "○", a density of 0.24 g/cm³, a flexural strength of 23 MPa, and a flexural modulus of 6.2 GPa, and thus has a good appearance, high strength and rigidity, and light weight.

Example 2D

A fiber-reinforced sandwich composite of Example 2D was prepared in the same manner as in Example 1D except that the following resin B3 was used as the thermosetting resin powder.

The resin B3 is a phenol resin (manufactured by Sumitomo Bakelite Co., Ltd., product name: PR-310, average particle size: 30 μm).

The fiber-reinforced sandwich composite of Example 2D has a product appearance of "○", a density of 0.26 g/cm³, a flexural strength of 19 MPa, and a flexural modulus of 4.3 GPa, and thus has a good appearance, high strength and rigidity, and light weight.

Example 3D

A fiber-reinforced sandwich composite of Example 3D was prepared in the same manner as in Example 1D except that a resin (25 g) prepared by uniformly mixing 12.5 g of the resin A3 and 12.5 g of the following resin C3 was used as the thermosetting resin powder, and the mold temperature was 170° C.

As the resin C3, an epoxy resin (manufactured by Mitsubishi Chemical Corporation, product name: jER-1001) was pulverized in a mortar and used. The average particle size was 100 μm.

The fiber-reinforced sandwich composite of Example 3D has a product appearance of "○", a density of 0.23 g/cm³, a flexural strength of 24 MPa, and a flexural modulus of 6.8 GPa, and thus has a good appearance, high strength and rigidity, and light weight.

Example 4D

A fiber-reinforced sandwich composite of Example 4D was prepared in the same manner as in Example 1D except that a resin (25 g) prepared by uniformly mixing 12.5 g of the following resin D3 and 12.5 g of the following resin E3 was used as the thermosetting resin powder, and the mold temperature was 160° C.

As the resin D3, a phenol resin (manufactured by Sumitomo Bakelite Co., Ltd., product name: PR-50235D) was pulverized in a mortar and used. The average particle size was 90 μm.

As the resin E3, a cyanate resin (manufactured by Mitsubishi Gas Chemical Company, Inc., product name: CYTESTER TA) was pulverized in a mortar and used. The average particle size was 100 μm.

The fiber-reinforced sandwich composite of Example 4D has a product appearance of "○", a density of 0.26 g/cm³, a flexural strength of 30 MPa, and a flexural modulus of 7.5 GPa, and thus has a good appearance, high strength and rigidity, and light weight.

Preparation of Example 5D

A fiber-reinforced sandwich composite of Example 5D was prepared in the same manner as in Example 1D except that a resin (24.9 g) prepared by uniformly mixing 8.3 g of the resin D3, 8.3 g of the resin E3, and 8.3 g of the resin C3 was used as the thermosetting resin powder, and the mold temperature was 170° C.

The fiber-reinforced sandwich composite of Example 5D has a product appearance of "○", a density of 0.28 g/cm³, a flexural strength of 28 MPa, and a flexural modulus of 7.2 GPa, and thus has a good appearance, high strength and rigidity, and light weight.

Example 6D

A fiber-reinforced sandwich composite of Example 6D was prepared in the same manner as in Example 1D except that a polymethacrylamide foam (manufactured by Evonik Industries, product name: Rohacell (IG-31)) having a closed cell structure was used as the core component.

The fiber-reinforced sandwich composite of Example 6D has a product appearance of "○", a density of 0.38 g/cm³, a flexural strength of 41 MPa, and a flexural modulus of 14.3 GPa, and thus has a good appearance, high strength and rigidity, and light weight.

Example 7D

A fiber-reinforced sandwich composite of Example 7D was prepared in the same manner as in Example 1D except that a polyvinyl chloride foam (manufactured by GURIT, product name: CoreCell (HT-80)) having a closed cell structure was used as the core component.

The fiber-reinforced sandwich composite of Example 7D has a product appearance of "○", a density of 0.25 g/cm³, a flexural strength of 26 MPa, and a flexural modulus of 5.7 GPa, and thus has a good appearance, high strength and rigidity, and light weight.

Comparative Example 1D

A fiber-reinforced sandwich composite of Comparative Example 1D was prepared in the same manner as in Example 1D except that a rigid polyurethane foam (manufactured by INOAC Corporation, product name: THERMAX (SII-25)) was used as the core component.

The fiber-reinforced sandwich composite of Comparative Example 1D had a product appearance of "o", a density of 0.21 g/cm³, a flexural strength of 5 MPa, and a flexural modulus of 0.6 GPa. The strength of the fiber-reinforced sandwich composite was insufficient because the 5% compressive strength of the core component used was low.

Comparative Example 2D

A fiber-reinforced sandwich composite of Comparative Example 2D was prepared in the same manner as in Example 1D except that the following resin F3 was used as the thermosetting resin powder and the mold temperature was 100° C.

The resin F3 is a phenol resin (manufactured by Sumitomo Bakelite Co., Ltd., product name: PR-50699, average particle size: 30 μm).

The results of viscosity measurement of the resin F3 (Comparative Example 2D) are shown in the graph of FIG. 24.

In Comparative Example 2D, the viscosity of the thermosetting resin was high (reaction was fast) and the impregnation property of the thermosetting resin into the fiber substrate was poor, and therefore, a uniform fiber-reinforced sandwich composite could not be obtained, and the density, thickness, flexural strength, and flexural modulus could not be measured.

Comparative Example 3D

A fiber-reinforced sandwich composite of Comparative Example 3D was prepared in the same manner as in Example 1D except that a resin (24.9 g) prepared by uniformly mixing 8.3 g of the resin A3 and 16.6 g of the resin D3 was used as the thermosetting resin powder, and the mold temperature was 160° C.

The results of viscosity measurement of the mixed resin of the resin A3 and the resin D3 (weight ratio: 1/2) (Comparative Example 3D) are shown in the graph of FIG. 24.

In Comparative Example 3D, the thermosetting resin was not sufficiently cured, deformation occurred in the fiber-reinforced sandwich composite at the time of demolding, and the density, thickness, flexural strength, and flexural modulus could not be measured.

As described above, according to the present aspect, there is no need for use of a prepreg, a solvent for a liquid thermosetting resin is not required, which eliminates a risk of environmental pollution, and there is no pot life of a thermosetting resin. It is therefore possible to obtain a fiber-reinforced sandwich composite that can be produced easily and inexpensively and safely without a risk of environmental pollution.

The present aspect is not limited to Examples, and can be modified without departing from the spirit.

Fifth Aspect

Figure 25:
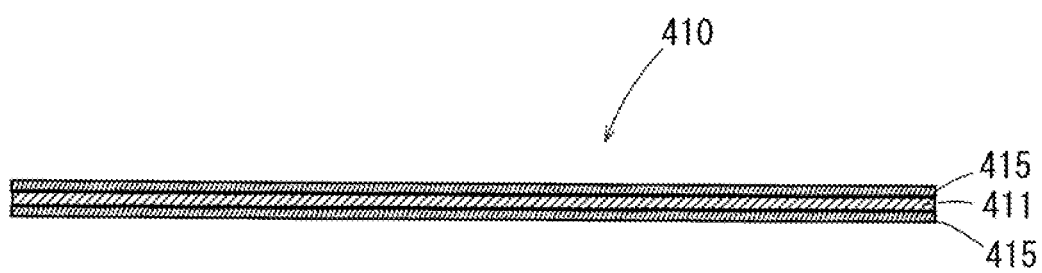
FIG. 25 is a cross-sectional view of a fiber-reinforced molded body according to a first embodiment of the fifth aspect.

An embodiment of the fifth aspect will be described. A fiber-reinforced molded body 410 of the first embodiment shown in FIG. 25 is obtained by laminating and integrating a core material 411 and a fiber reinforcing material 415, the core material 411 being obtained by impregnating a thermosetting resin into a resin foam and curing the thermosetting resin, and the fiber reinforcing material 415 being obtained by impregnating the thermosetting resin into a fiber substrate and curing the thermosetting resin. The fiber-reinforced molded body 410 is obtained by the method for producing a fiber-reinforced molded body of the present disclosure. The thermosetting resin impregnated into the resin foam and cured, and the thermosetting resin impregnated into the fiber substrate and cured are common thermosetting resins.

The fiber reinforcing material 415 is preferably laminated on both surfaces of the core material 411 in order to prevent warpage of the fiber-reinforced molded body 410. The number of laminated layers of the fiber reinforcing material 415 for each of both surfaces of the core material 411 is not limited to one, but may be two or more. In addition, the number of laminated fiber reinforcing materials 415 on the respective surfaces of the core material 411 may be different.

As the resin foam, a resin foam having an open-cell structure is used. In the present disclosure, the resin foam having an open-cell structure means a resin foam mainly having an open-cell structure, and is not a resin foam mainly having a closed cell structure but slightly having an open-cell structure.

The resin foam having an open-cell structure is not particularly limited, but a thermosetting resin foam having an open-cell structure is preferable. Examples thereof include urethane resin foams and melamine resin foams. When the fiber-reinforced molded body 410 is required to have flame retardancy, the resin foam having an open-cell structure is preferably a resin foam having flame retardancy, and the melamine resin foam is preferable.

Examples of the fiber substrate include woven fabrics and nonwoven fabrics made of glass fibers, aramid fibers, basalt fibers, and carbon fibers, but are not particularly limited thereto. The fiber substrate is preferably a carbon fiber woven fabric because it is excellent in lightweight and high rigidity. The carbon fiber woven fabric is preferably a woven fabric in which fibers are not unidirectional. Preferred examples thereof include plain weave, twill weave, satin weave, all of which are constituted of warp and weft, and triaxial weave which is constituted of threads in three directions. The carbon fiber woven fabric preferably has a weight per unit area (fiber weight) of 50 to 600 g/m² from the viewpoint of impregnation of the thermosetting resin and rigidity of the fiber-reinforced molded body 410.

The thermosetting resin to be impregnated into the resin foam having an open-cell structure and the fiber substrate and cured has a viscosity of preferably 2,000 Pas or less, more preferably 1,500 Pa·s or less at the curing reaction start temperature Tb° C. When the viscosity at the curing reaction start temperature Tb° C. is in this range, the melted thermosetting resin 419 can be sufficiently impregnated into the resin foam having an open-cell structure and the fiber substrate in the production of the fiber-reinforced molded body 410. As a result, the fiber-reinforced molded body 410 having uniform physical properties can be obtained. The thermosetting resin will be described in more detail in a method for producing the fiber-reinforced molded body 410 described later.

The flexural modulus (based on the method according to JIS K7074 A) of the fiber-reinforced molded body 410 is preferably 24 GPa or more, more preferably 30 GPa or more.

The flexural strength (based on the method according to JIS K7074 A) of the fiber-reinforced molded body 410 is preferably 300 MPa or more, more preferably 380 MPa or more.

Figure 26:
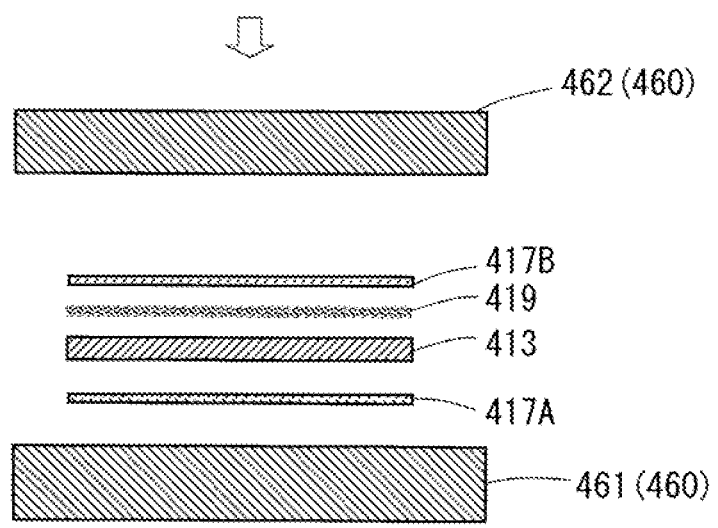
FIG. 26 is a cross-sectional view showing lamination and heat compression in an embodiment of a method for producing the fiber-reinforced molded body in FIG. 25 of the fifth aspect.

FIG. 26 relates to an embodiment of a method for producing the fiber-reinforced molded body 410. In the following description of the production method, when members having the same names are disposed at a plurality of positions, the members are denoted by a combined reference numeral of number and alphabet, such as "417A", in order to easily grasp the vertical positional relationship.

In the embodiment shown in FIG. 26, a pre-molding laminate is prepared by disposing a resin foam 413 having an open-cell structure on one fiber substrate 417A, disposing a powdery thermosetting resin 419 thereon, and further disposing a fiber substrate 417B thereon.

The position and the number of positions where the powdery thermosetting resin 419 is disposed are not limited, but it is preferable to dispose the thermosetting resin 419 at least at a position in contact with the resin foam 413.

The prepared pre-molding laminate is sandwiched between a lower mold 461 and an upper mold 462 of a heated mold 460, and is heat-compressed. The mold 460 is heated by a heating unit such as an electric heater to Tc° C. that is the temperature during heat compression.

The powdery thermosetting resin 419 used in the method for producing the fiber-reinforced molded body 410 is the thermosetting resin as described above for the fiber-reinforced molded body 410. The powdery thermosetting resin 419 has a viscosity of preferably 2,000 Pas or less, more preferably 1,500 Pa·s or less at the curing reaction start temperature Tb° C. When the viscosity at the curing reaction start temperature Tb° C. is in this range, the melted thermosetting resin 419 can be sufficiently impregnated into the resin foam 413 having an open-cell structure and the fiber substrates 417A and 417B, and a fiber-reinforced molded body 410 having uniform physical properties can be obtained.

Further, the thermosetting resin 419 preferably has a maximum viscosity of 1,000 Pa·s or more in a temperature range of the curing reaction start temperature Tb° C. to 190° C. When the maximum viscosity is in this range, the melted thermosetting resin 419 can be impregnated into the resin foam 413 having an open-cell structure and the fiber substrates 417A and 417B and sufficiently cured in the production of the fiber-reinforced molded body 410. As a result, the shapability of the fiber-reinforced molded body 410 is good, and sufficient strength can be obtained in a short time.

The melting start temperature Ta° C. and the curing reaction start temperature Tb° C. of the thermosetting resin 419 are set to temperatures satisfying preferably $[Tb+(Tb-Ta)/3]-15 \leq Tc \leq [Tb+(Tb-Ta)/3]+20$, more preferably $[Tb+(Tb-Ta)/3]-10 \leq Tc \leq [Tb+(Tb-Ta)/3]+20$ with respect to the temperature Tc° C. during heat compression. When the melting start temperature Ta° C. and the curing reaction start temperature Tb° C. of the thermosetting resin, and the temperature Tc° C. during heat compression are in this relationship, the thermosetting resin 419 is favorably melted during heat compression, and the thermosetting resin 419 is easily impregnated into the resin foam 413 having an open-cell structure and the fiber substrates 417A and 417B. As a result, the fiber-reinforced molded body 410 having uniform physical properties can be obtained.

The value obtained by subtracting the melting start temperature Ta° C. from the curing reaction start temperature Tb° C. of the thermosetting resin 419 satisfies preferably $30 \leq (Tb-Ta) \leq 100$, and more preferably $40 \leq (Tb-Ta) \leq 70$. When the value of (Tb-Ta) is in this range, the melted thermosetting resin 419 can be sufficiently impregnated into the resin foam 413 having an open-cell structure and the fiber substrates 417A and 417B, and a fiber-reinforced molded body 410 having uniform physical properties can be obtained.

The thermosetting resin 419 preferably has a melting start temperature Ta° C. of 60 to 100° C. When the melting start temperature Ta° C. of the thermosetting resin 419 is in this range, temperature control can be easily performed during heat compression.

The thermosetting resin that can satisfy the melting start temperature Ta° C., the curing reaction start temperature Tb° C., the range of the value of (Tb-Ta), the viscosity at the curing reaction start temperature Tb° C., the maximum viscosity, and the like as described above is preferably selected from the group consisting of a phenol resin, a mixed resin of a phenol resin and an epoxy resin, a mixed resin of a phenol resin and a cyanate resin, and a mixed resin of a phenol resin, a cyanate resin, and an epoxy resin. The phenol resin is excellent in flame retardancy, and thus can impart excellent strength and flame retardancy to the fiber-reinforced molded body.

Various powder additives such as a pigment, an antibacterial agent, and an ultraviolet absorber may be added to the thermosetting resin 419 as long as the viscosity and reactivity of the thermosetting resin are not affected. The shape of powder of the thermosetting resin 419 is not particularly limited, and examples thereof include a spherical shape, a needle shape, and a flake shape. The particle size of the powdery thermosetting resin 419 is preferably 10 to 500 μm from the viewpoint of ease of melting.

The amount of the thermosetting resin 419 is preferably such an amount that a resin proportion defined by Equation (A1) is 50 to 80%. When the resin proportion is in this range, the fiber-reinforced molded body 410 can have high strength.

[Mathematical Formula 1]

$$\text{Resin proportion} = \frac{\text{Weight of fiber-reinforced molded body} - \text{Total weight of fiber substrate and resin foam before molding}}{\text{Weight of fiber-reinforced molded body}} \times 100 \quad (A1)$$

Pressurization (compression) of the pre-molding laminate during heat compression by the mold 460 is preferably 2 to 20 MPa so that the melted thermosetting resin 419 can be satisfactorily impregnated into the resin foam 413 having an open-cell structure and the fiber substrates 417A and 417B. The compression of the pre-molding laminate is preferably set such that a compression percentage defined by Equation (A2) is 200 to 5,000%. When the compression percentage is in this range, the fiber-reinforced molded body 410 can have high strength.

[Mathematical Formula 4]

$$\text{Compression percentage} = \frac{\text{Thickness of resin foam before molding} - \text{Thickness of core material of fiber-reinforced molded body}}{\text{Thickness of core material of fiber-reinforced molded body}} \times 100 \quad (A2)$$

At the time of heat-compressing the pre-molding laminate by the mold 460, the thermosetting resin 419 is melted through heating of the pre-molding laminate by the mold 460, and the melted thermosetting resin is impregnated into the resin foam 413 having an open-cell structure and the fiber substrates 417A and 417B through compression of the pre-molding laminate by the mold 460. When the thermosetting resin 419 that has been impregnated into the resin foam 413 having an open-cell structure and the fiber substrates 417A and 417B is cured, the fiber substrates 417A and 417B and the resin foam 413 having an open-cell structure between the fiber substrates 417A and 417B are fixed in shape in a compressed state, and bonded and integrated. Thus, the fiber-reinforced molded body 410 of FIG. 25, which is shaped into the shape of the mold surface of the lower mold 461 and the upper mold 462, is obtained.

In the embodiment of the production method shown in FIG. 26, the powdery thermosetting resin 419 is disposed only on one side (one surface) of the resin foam 413 having an open-cell structure, but the fiber-reinforced molded body 410 may be produced by disposing the thermosetting resin on both sides of the resin foam 413.

Figure 27:
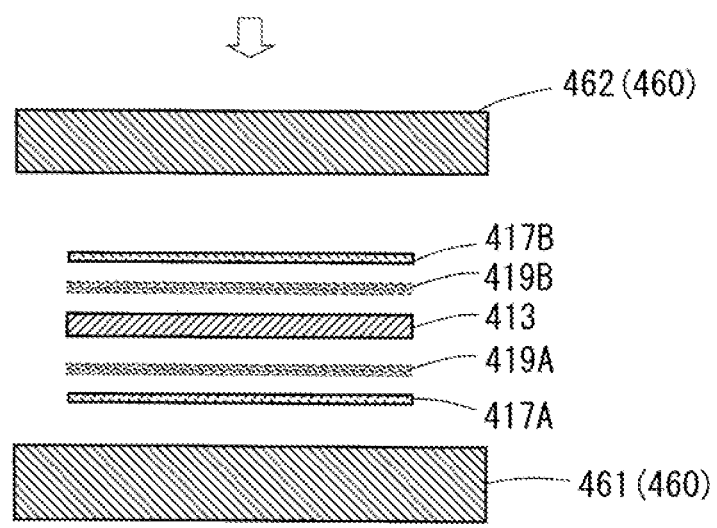
FIG. 27 is a cross-sectional view showing lamination and heat compression in another embodiment of the method for producing the fiber-reinforced molded body in FIG. 25 of the fifth aspect.

FIG. 27 shows an embodiment in the case of producing the fiber-reinforced molded body 410 by disposing the powdery thermosetting resin 419 on both sides of the resin foam 413.

In the embodiment shown in FIG. 27, a pre-molding laminate is prepared by disposing a powdery thermosetting resin 417A on one fiber substrate 419A, disposing the resin foam 413 having an open-cell structure thereon, disposing a powdery thermosetting resin 419B thereon, and further disposing the fiber substrate 417B thereon.

The prepared pre-molding laminate is sandwiched between the lower mold 461 and the upper mold 462 of the heated mold 460, and heat-compressed to obtain the fiber-reinforced molded body 410 in FIG. 25 shaped into the shape of the mold surface of the lower mold 461 and the upper mold 462. The resin foam 413 having an open-cell structure, the fiber substrates 417A and 417B, the powdery thermosetting resins 419A and 419B, the resin proportion, and production conditions of heating, compression, and the like are as described in the production embodiment of FIG. 26.

Figure 28:
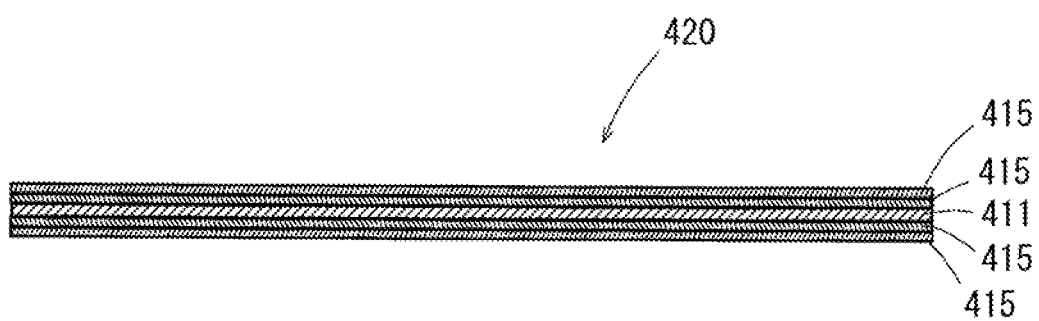
FIG. 28 is a cross-sectional view of a fiber-reinforced molded body according to a second embodiment of the fifth aspect.

A fiber-reinforced molded body 420 of the second embodiment shown in FIG. 28 is a case where two layers (two sheets) of the fiber reinforcing material 415 are laminated on both sides of the core material 411. The core material 411 and the fiber reinforcing material 415 are as described in the fiber-reinforced molded body 410 of the first embodiment.

In a fiber-reinforced molded body having two or more layers of the fiber reinforcing material 415, the flexural modulus (based on the method according to JIS K7074 A) is also preferably 24 GPa or more, more preferably 30 GPa or more. The flexural strength (based on the method according to JIS K7074 A) of the fiber-reinforced molded body is preferably 300 MPa or more, more preferably 380 MPa or more.

An embodiment shown in FIG. 29 will be described with respect to a method for producing the fiber-reinforced molded body 420 of the second embodiment.

Figure 29:
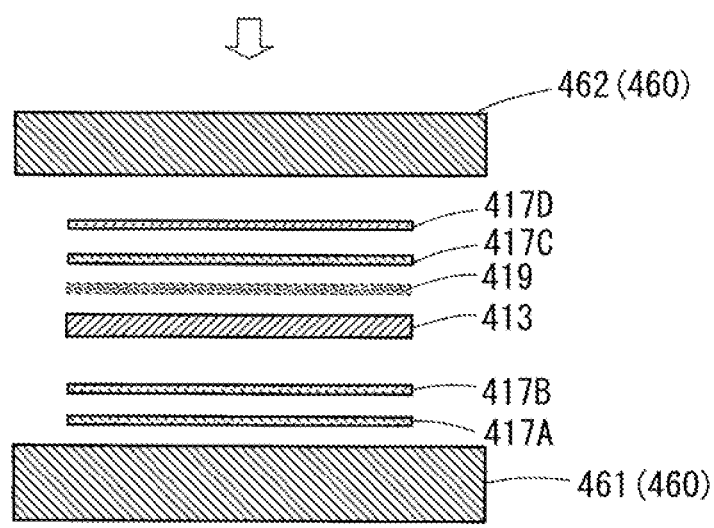
FIG. 29 is a cross-sectional view showing lamination and heat compression in an embodiment of a method for producing the fiber-reinforced molded body in FIG. 28.

In the embodiment shown in FIG. 29, a pre-molding laminate is prepared by laminating two fiber substrates 417A and 417B, disposing the resin foam 413 having an open-cell structure thereon, disposing the powdery thermosetting resin 419 thereon, and further laminating two fiber substrates 417C and 417D thereon.

The prepared pre-molding laminate is sandwiched between the lower mold 461 and the upper mold 462 of the heated mold 460, and heat-compressed to obtain the fiber-reinforced molded body 420 in FIG. 28 shaped into the shape of the mold surface of the lower mold 461 and the upper mold 462. The mold 460 is heated by a heating unit such as an electric heater to Tc° C. that is the temperature during heat compression. The resin foam 413 having an open-cell structure, the fiber substrates 417A to 417D, the powdery thermosetting resin 419, the resin proportion, and production conditions of heating, compression, and the like are as described in the production embodiment of FIG. 26.

A fiber-reinforced molded body 430 of the third embodiment shown in FIG. 30 will be described. The fiber-reinforced molded body 430 of the third embodiment is prepared by laminating and integrating the core material 411 and the fiber reinforcing material 415, the core material 411 being obtained by impregnating a thermosetting resin into a resin foam and curing the thermosetting resin, and the fiber reinforcing material 415 being obtained by impregnating a thermosetting resin into a fiber substrate material and curing the thermosetting resin. The fiber-reinforced molded body 430 has a recess 431 and a protrusion 433 formed on the surface thereof. The fiber-reinforced molded body 430 of the third embodiment has the same configuration as that of the fiber-reinforced molded body 410 of the first embodiment except that the recess 431 and the protrusion 433 are formed.

In a fiber-reinforced molded body having an irregularity shape on the surface thereof, the flexural modulus (based on the method according to JIS K7074 A) is also preferably 24 GPa or more, more preferably 30 GPa or more. The flexural strength (based on the method according to JIS K7074 A) of the fiber-reinforced molded body is preferably 300 MPa or more, more preferably 380 MPa or more.

The irregularity shapes of the recess 431 and the protrusion 433 are not particularly limited as long as the compression percentage defined by Equation (A2) described above is in the range of 200 to 5,000%. For example, the depth, height, planar shape (linear, curved), and the like of the irregularity shape are appropriately determined according to use of the fiber-reinforced molded body 430 and the like. The irregularities may be formed not only on one surface but also on both surfaces of the fiber-reinforced molded body.

An embodiment shown in FIG. 31 will be described with respect to a method for producing the fiber-reinforced molded body 430 of the third embodiment having irregularities formed on the surface thereof.

Figure 31:
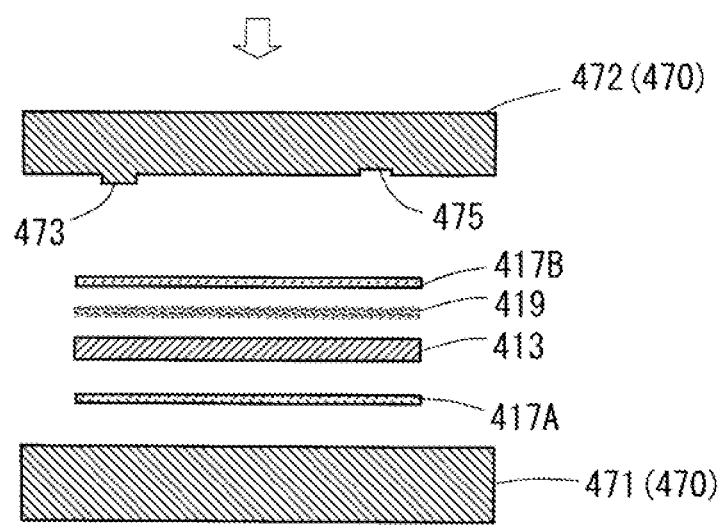
FIG. 31 is a cross-sectional view showing lamination and heat compression in an embodiment of a method for producing the fiber-reinforced molded body in FIG. 30.

In the production method of the embodiment shown in FIG. 31, a pre-molding laminate is prepared by disposing the resin foam 413 having an open-cell structure on one fiber substrate 417A, disposing the powdery thermosetting resin 419 thereon, and further disposing the fiber substrate 417B thereon.

The prepared pre-molding laminate is sandwiched between a lower mold 471 of a heated mold 470 and an upper mold 472 having a recess forming protrusion 473 and a protrusion forming groove 475 formed in the mold surface thereof, and the laminate is heat-compressed. The recess forming protrusion 473 is a portion for forming the recess 431 of the fiber-reinforced molded body 430, and the protrusion forming groove 475 is a portion for forming the protrusion 433 of the fiber-reinforced molded body 430. The mold 470 is heated by a heating unit such as an electric heater to Tc° C. that is the temperature during heat compression. The resin foam 413 having an open-cell structure, the fiber substrates 417A and 417B, the powdery thermosetting resin 419, the resin proportion, and production conditions of heating, compression, and the like are as described in the production embodiment of FIG. 26.

The pre-molding laminate is compressed into an irregularity shape conforming to the mold surface of the upper mold 472 by heat compression by the mold 470, and the thermosetting resin 419 is melted and impregnated into the resin foam 413 having an open-cell structure and the fiber substrates 417A and 417B. Then, the impregnated thermosetting resin is cured whereby the fiber-reinforced molded body 430 in FIG. 30 shaped into the shape of the mold surface of the lower mold 471 and the upper mold 472.

Figure 32:
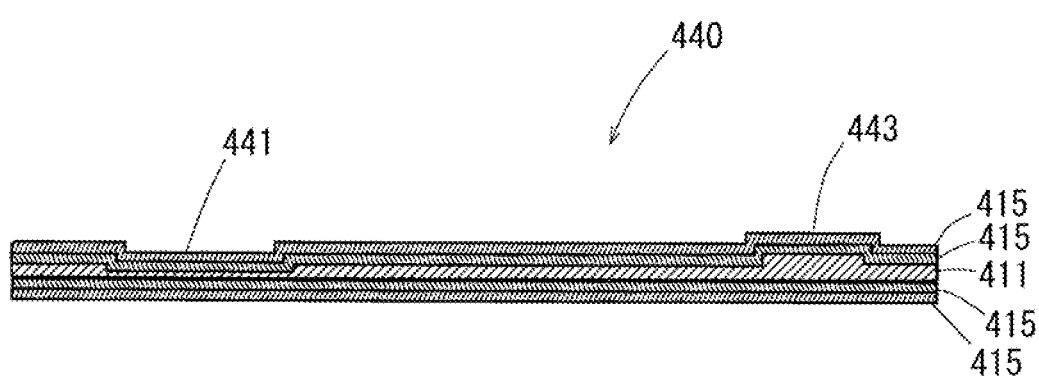
FIG. 32 is a cross-sectional view of a fiber-reinforced molded body according to a fourth embodiment of the fifth aspect.

In a fiber-reinforced molded body 440 of the fourth embodiment shown in FIG. 32, two layers (two sheets) of the fiber reinforcing material 415 are laminated on both sides of the core material 411, and a recess 441 and a protrusion 443 are formed on the surface of the fiber-reinforced molded body 440. The fiber-reinforced molded body 440 of the fourth embodiment has the same configuration as that of the fiber-reinforced molded body 420 of the second embodiment except that the recess 441 and the protrusion 443 are formed.

In the fiber-reinforced molded body having irregularities on the surface thereof and having two or more layers of the fiber reinforcing material 415, the flexural modulus (based on the method according to JIS K7074 A) is also preferably 24 GPa or more, more preferably 30 GPa or more. The flexural strength (based on the method according to JIS K7074 A) of the fiber-reinforced molded body is preferably 300 MPa or more, more preferably 380 MPa or more.

An embodiment shown in FIG. 33 will be described with respect to a method for producing the fiber-reinforced molded body 440 of the fourth embodiment having irregularities formed on the surface thereof.

Figure 33:
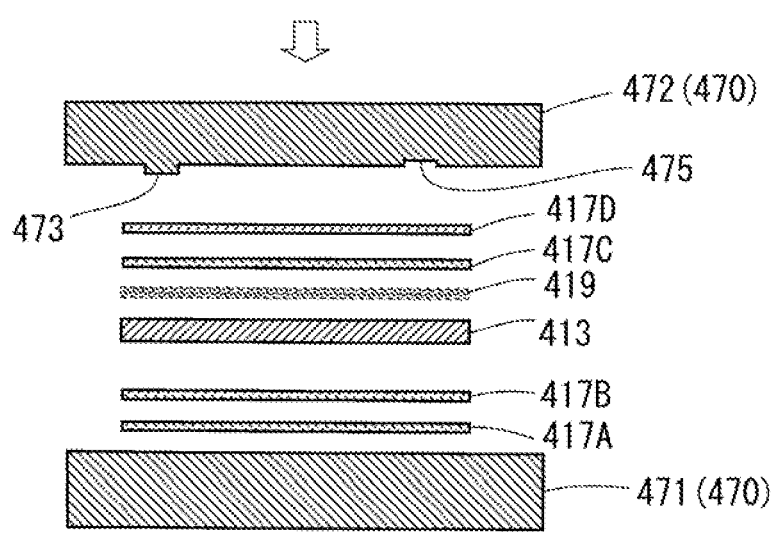
FIG. 33 is a cross-sectional view showing lamination and heat compression in an embodiment of a method for producing the fiber-reinforced molded body in FIG. 32 of the fifth aspect.

In the production method of the embodiment shown in FIG. 33, a pre-molding laminate is prepared by laminating two fiber substrates 417A and 417B, disposing the resin foam 413 having an open-cell structure thereon, disposing the powdery thermosetting resin 419 thereon, and further laminating two fiber substrates 417C and 417D thereon.

The prepared pre-molding laminate is sandwiched between the lower mold 471 of the heated mold 470 and the upper mold 472 having the recess forming protrusion 473 and the protrusion forming groove 475 formed in the mold surface thereof, and the laminate is heat-compressed. The recess forming protrusion 473 is a portion for forming the recess 441 of the fiber-reinforced molded body 440, and the protrusion forming groove 475 is a portion for forming the protrusion 443 of the fiber-reinforced molded body 440. The mold 470 is heated by a heating unit such as an electric heater to Tc° C. that is the temperature during heat compression. The resin foam 413 having an open-cell structure, the fiber substrates 417A to 417D, the powdery thermosetting resin 419, the resin proportion, production conditions of heating, compression, and the like are the same as those of the method for producing the fiber-reinforced molded body 420 of the second embodiment.

The pre-molding laminate is compressed into an irregularity shape conforming to the mold surface of the upper mold 472 through heat compression by the mold 470, and the thermosetting resin 419 is melted and impregnated into the resin foam 413 having an open-cell structure and the fiber substrates 417A to 417D. Then, the impregnated thermosetting resin is cured to obtain the resin molded body 440 in FIG. 32 shaped into the shape of the mold surface of the lower mold 471 and the upper mold 472.

Also in the method for producing a fiber-reinforced molded body having an irregularity shape on the surface thereof, the powdery thermosetting resin may be disposed not only on one side of the resin foam having an open-cell structure but also on both sides of the resin foam. An embodiment of a production method in that case will be described with reference to FIG. 34.

Figure 34:
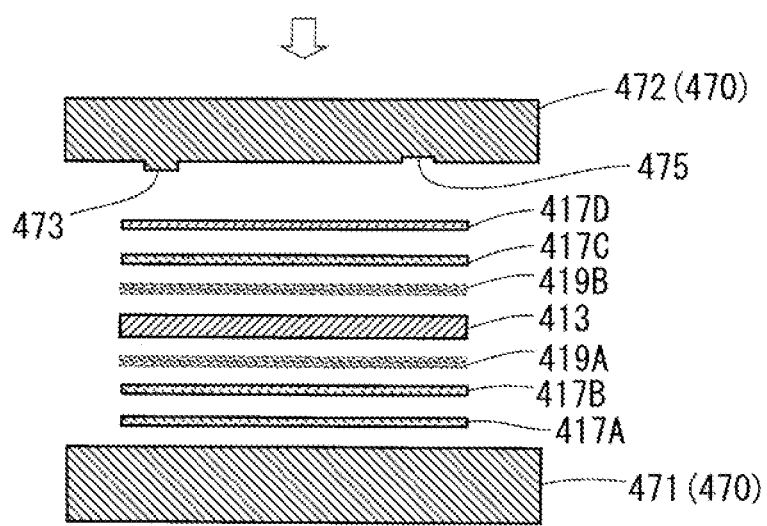
FIG. 34 is a cross-sectional view showing lamination and heat compression in another embodiment of the method for producing the fiber-reinforced molded body in FIG. 32 of the fifth aspect.

The embodiment shown in FIG. 34 relates to the production of the fiber-reinforced molded body 440 of the fourth embodiment having an irregularity shape on the surface shown in FIG. 32.

In the embodiment of FIG. 34, a pre-molding laminate is prepared by laminating two fiber substrates 417A and 417B, disposing the powdery thermosetting resin 419A thereon, disposing the resin foam 413 having an open-cell structure thereon, disposing the powdery thermosetting resin 419B thereon, and further laminating two fiber substrates 417C and 417D thereon.

The prepared pre-molding laminate is sandwiched between the lower mold 471 of the heated mold 470 and the upper mold 472 having the recess forming protrusion 473 and the protrusion forming groove 475 formed in the mold surface thereof, and the laminate is heat-compressed. The resin foam 413 having an open-cell structure, the fiber substrates 417A to 417D, the powdery thermosetting resins 419A and 419B, the resin proportion, production conditions of heating, compression, and the like are as described above. The thermosetting resins 419A and 419B are melted and impregnated into the resin foam 413 having an open-cell structure and the fiber substrates 417A to 417D, through heat compression of the pre-molding laminate by the mold 470. Then, the impregnated thermosetting resin is cured to obtain the fiber-reinforced molded body 440 in FIG. 32 shaped into the shape of the mold surface of the lower mold 471 and the upper mold 472.

EXAMPLES

Fiber-reinforced molded bodies of Examples and Comparative Examples shown in FIG. 36, split across views labeled FIGS. 36A-36C, were prepared using the powdery thermosetting resins shown in FIG. 35.

The viscosity of the thermosetting resin was measured under the following conditions using a rheometer Rheosol-G3000, manufactured by UBM.

1) An amount of 0.4 g of a sample was formed into pellets (diameter φ: 18 mm, thickness: about 0.4 mm), and the formed pellets were sandwiched between parallel plates having a diameter φ of 18 mm.

2) The dynamic viscosity was measured at 2° C. intervals over a temperature range of 40° C. to 200° C. at a temperature rising rate of 5° C./min, a frequency of 1 Hz, and a rotation angle (strain) of 0.1 deg under constant temperature rising. The melting start temperature (Ta) in FIG. 35 is a temperature indicating the maximum viscosity (the maximum viscosity in a temperature range of the curing reaction start temperature (Tb) or lower), the curing reaction start temperature (Tb) is a temperature indicating the minimum viscosity, and the maximum viscosity is a maximum viscosity in a temperature range of the curing reaction start temperature (Tb) to 190° C.

For the fiber-reinforced molded bodies of Examples and Comparative Examples, the product appearance was evaluated, and the thickness (general portion, protrusion, recess) of the molded body, the thickness (general portion, protrusion, recess) of the core material, the compression percentage (general portion, protrusion, recess), the specific gravity, the weight, the resin proportion, the flexural strength, and the flexural modulus were calculated or measured.

For the product appearance, presence of a defect such as deformation or non-uniformity of impregnation of resin on the surface of the fiber-reinforced molded body was visually checked, and the case where there was no defect was evaluated as "○", the case where the appearance was slightly poor, such as the non-uniformity of the thickness was evaluated as "Δ", and the case where there was a defect was evaluated as "×".

The compression percentage was calculated using Equation (A2) described above.

The specific gravity was calculated from the weight of the fiber-reinforced molded body and the volume of the fiber-reinforced molded body. The volume of the fiber-reinforced molded body was calculated from the thickness and area of the fiber-reinforced molded body.

The resin proportion was calculated using Equation (A1) described above.

The weights of the fiber substrate and the resin foam having an open-cell structure before molding were calculated by the following equations.

Weight of fiber substrate=weight per unit area×area of fiber-reinforced molded body×number of used fiber substrates Weight of resin foam=density of resin foam×area of fiber-reinforced molded body×thickness of pre-molding resin foam The flexural strength and flexural modulus were measured based on the method according to JIS K7074 A.

Example 1E

Examples 1E to 12E are examples of the fiber-reinforced molded body 410 shown in FIG. 25 and the production method of FIG. 26.

In Example 1E, two sheets of carbon fiber woven fabric (manufactured by Teijin Limited, product name: W-3101, weight per unit area: 200 g/m$^2$, thickness: 0.22 mm) each cut into 200×300 mm were prepared as the fiber substrate. The weight of the cut fiber substrate was 12 g per sheet. In addition, as the resin foam having an open-cell structure, a melamine resin foam (manufactured by BASF SE, product name: Basotect G+, density: 9 kg/m$^3$) cut into a thickness of 10 mm and a planar size of 200×300 mm (weight: 5.4 g) was prepared.

A pre-molding laminate was prepared by laminating the melamine resin foam on one fiber substrate, disposing 65.0 g of the following resin A4 as the powdery thermosetting resin thereon substantially uniformly, and disposing another fiber substrate thereon.

The resin A4 is a phenol resin (manufactured by Sumitomo Bakelite Co., Ltd., product name: PR-50252, average particle size: 30 μm).

Figure 37:
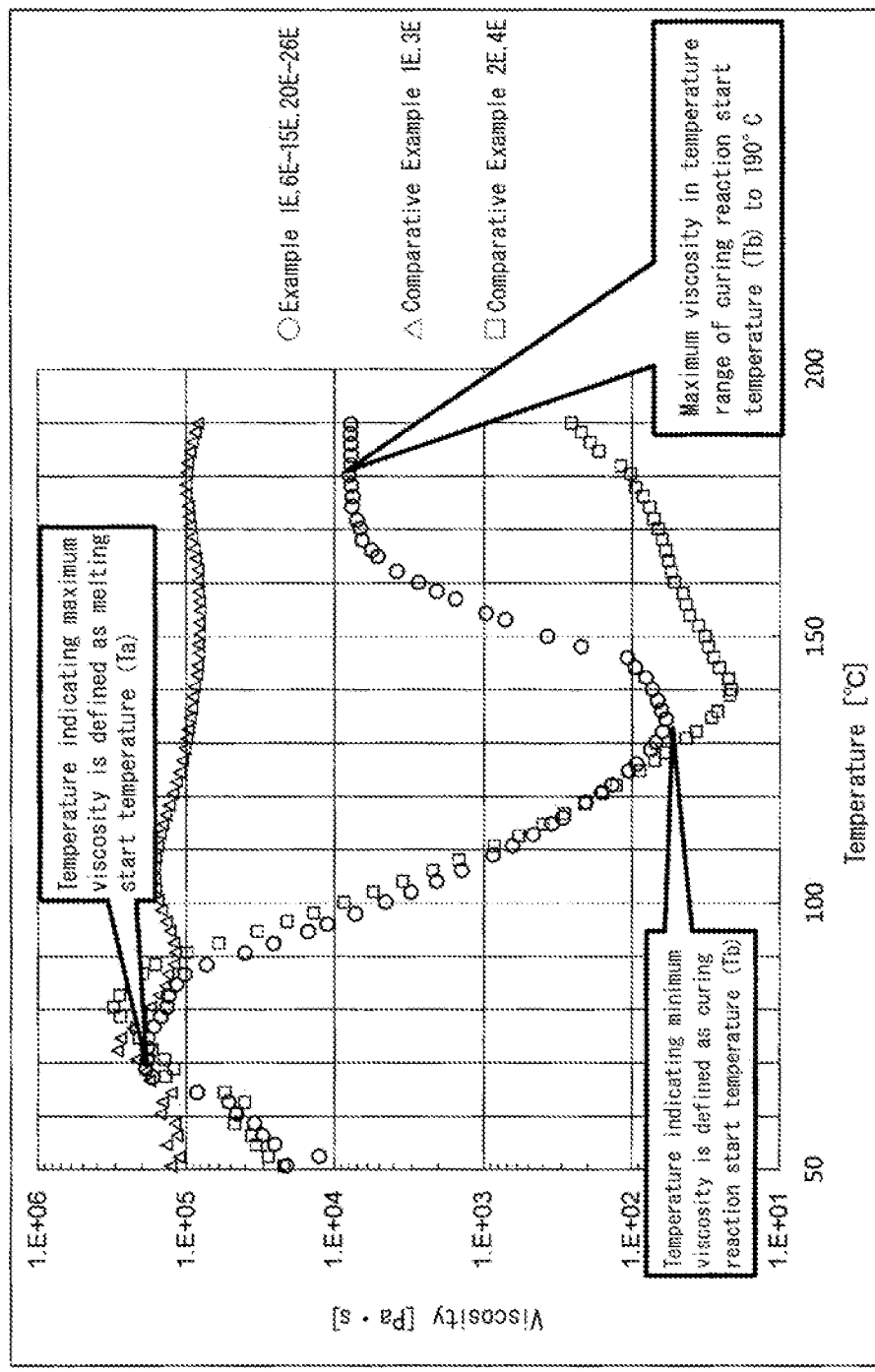
FIG. 37 is a graph showing results of viscosity measurement of thermosetting resins used in Examples 1E, 6E to 15E, and 20E to 26E and Comparative Examples 1E to 4E according to the fifth aspect.

The results of viscosity measurements of the resin A4 (Examples 1E, 6E to 15E, 20E to 26E) are shown in the graph of FIG. 37.

Next, the pre-molding laminate was disposed on a molding surface of a lower mold of a mold heated to 150° C., and the mold was closed. Then, heat compression was performed at a pressure of 10 MPa for 10 minutes. When the thermosetting resin was melted by heating and pressure was applied by the mold, the thermosetting resin was impregnated into the fiber substrate and the resin foam of each layer, and the curing reaction was completed. Thus, a fiber-reinforced molded body composed of an integrated laminate product including a fiber reinforcing material and a core material was prepared, in which the fiber reinforcing material was obtained by impregnating the thermosetting resin into the fiber substrate and curing the thermosetting resin, and the core material was obtained by impregnating the thermosetting resin into the resin foam having an open-cell structure and curing the thermosetting resin. The fiber-reinforced molded body was trimmed to 170×260 mm to obtain a fiber-reinforced molded body of Example 1.

A SUS spacer having a thickness of 1 mm was disposed between the lower mold and the upper mold of the mold to set the distance between the lower mold and the upper mold to 1 mm, and the compressed thickness of the pre-molding laminate was adjusted to 1 mm.

The numerical values and physical property values of the fiber-reinforced molded body of Example 1E are as shown in FIG. 36, split across views labeled FIGS. 36A-36C. As to the main numerical values and physical property values, the compression percentage is 1,686%, the specific gravity is 1.35, the resin proportion is 70%, the flexural strength is 500 MPa, the flexural modulus is 45 GPa, the product appearance is "○". The fiber-reinforced molded body of Example 1E thus has a good appearance, high strength and rigidity, and light weight.

Example 2E

A fiber-reinforced molded body of Example 2E was prepared in the same manner as in Example 1E except that the following resin B4 was used as the powdery thermosetting resin.

The resin B4 is a phenol resin (manufactured by Sumitomo Bakelite Co., Ltd., product name: PR-310, average particle size: 30 μm).

The fiber-reinforced molded body of Example 2E has a compression percentage of 1,686%, a specific gravity of 1.34, a resin proportion of 70%, a flexural strength of 400 MPa, a flexural modulus of 40 GPa, and a product appearance of "○", and thus has a good appearance, high strength and rigidity, and light weight.

Example 3E

A fiber-reinforced molded body of Example 3E was prepared in the same manner as in Example 1E except that a resin prepared by uniformly mixing the resin A4 and the following resin C4 at a weight ratio of 1:1 was used as the powdery thermosetting resin, and the mold temperature was 170° C.

As the resin C4, an epoxy resin (manufactured by Mitsubishi Chemical Corporation, product name: jER-1001) was pulverized in a mortar and used. The average particle size was 100 μm.

The fiber-reinforced molded body of Example 3E has a compression percentage of 1,686%, a specific gravity of 1.35, a resin proportion of 70%, a flexural strength of 820 MPa, a flexural modulus of 50 GPa, and a product appearance of "○", and thus has a good appearance, high strength and rigidity, and light weight.

Example 4E

A fiber-reinforced molded body of Example 4E was prepared in the same manner as in Example 1E except that a resin prepared by uniformly mixing the following resin D4 and the following resin E4 at a weight ratio of 1:1 was used as the powdery thermosetting resin, and the mold temperature was 160° C.

As the resin D4, a phenol resin (manufactured by Sumitomo Bakelite Co., Ltd., product name: PR-50235D) was pulverized in a mortar and used. The average particle size was 90 μm.

As the resin E4, a cyanate resin (manufactured by Mitsubishi Gas Chemical Company, Inc., product name: CYTESTER TA) was pulverized in a mortar and used. The average particle size was 100 μm.

The fiber-reinforced molded body of Example 4E has a compression percentage of 1,686%, a specific gravity of 1.35, a resin proportion of 70%, a flexural strength of 850 MPa, a flexural modulus of 52 GPa, and a product appearance of "○", and thus has a good appearance, high strength and rigidity, and light weight.

Example 5E

A fiber-reinforced molded body of Example 5E was prepared in the same manner as in Example 1E except that a resin prepared by uniformly mixing the resin D4, the resin E4, and the resin C4 at a weight ratio of 1:1:1 was used as the powdery thermosetting resin, and the mold temperature was 170° C.

The fiber-reinforced molded body of Example 5E has a compression percentage of 1,686%, a specific gravity of 1.35, a resin proportion of 70%, a flexural strength of 860 MPa, a flexural modulus of 53 GPa, and a product appearance of "○", and thus has a good appearance, high strength and rigidity, and light weight.

Example 6E

A fiber-reinforced molded body of Example 6E was prepared in the same manner as in Example 1E except that a melamine resin foam (manufactured by BASF SE, product name: Basotect G+, density: 9 kg/m$^3$) cut into a thickness of 6 mm and a planar size of 200×300 mm (weight: 3.2 g) was used as the resin foam having an open-cell structure.

The fiber-reinforced molded body of Example 6E has a compression percentage of 971%, a specific gravity of 1.35, a resin proportion of 70%, a flexural strength of 510 MPa, a flexural modulus of 46 GPa, and a product appearance of "○", and thus has a good appearance, high strength and rigidity, and light weight.

Example 7E

A fiber-reinforced molded body of Example 7E was prepared in the same manner as in Example 1E except that a melamine resin foam (manufactured by BASF SE, product name: Basotect G+, density: 9 kg/m$^3$) cut into a thickness of 2 mm and a planar size of 200×300 mm (weight: 1.1 g) was used as the resin foam having an open-cell structure.

The fiber-reinforced molded body of Example 7E has a compression percentage of 257%, a specific gravity of 1.35, a resin proportion of 70%, a flexural strength of 420 MPa, a flexural modulus of 40 GPa, and a product appearance of "○", and thus has a good appearance, high strength and rigidity, and light weight.

Example 8E

A fiber-reinforced molded body of Example 8E was prepared in the same manner as in Example 1E except that a melamine resin foam (manufactured by BASF SE, product name: Basotect G+, density: 9 kg/m$^3$) cut into a thickness of 20 mm and a planar size of 200×300 mm (weight: 10.8 g) was used as the resin foam having an open-cell structure.

The fiber-reinforced molded body of Example 8E has a compression percentage of 3,471%, a specific gravity of 1.36, a resin proportion of 71%, a flexural strength of 450 MPa, a flexural modulus of 42 GPa, and a product appearance of "○", and thus has a good appearance, high strength and rigidity, and light weight.

Example 9E

A fiber-reinforced molded body of Example 9E was prepared in the same manner as in Example 1E except that a melamine resin foam (manufactured by BASF SE, product name: Basotect G+, density: 9 kg/m$^3$) cut into a thickness of 28 mm and a planar size of 200×300 mm (weight: 15.1 g) was used as the resin foam having an open-cell structure.

The fiber-reinforced molded body of Example 9E has a compression percentage of 4,900%, a specific gravity of 1.36, a resin proportion of 71%, a flexural strength of 400 MPa, a flexural modulus of 39 GPa, and a product appearance of "○", and thus has a good appearance, high strength and rigidity, and light weight.

Example 10E

A fiber-reinforced molded body of Example 10E was prepared in the same manner as in Example 1E except that 48 g of the resin A was used as the powdery thermosetting resin.

The fiber-reinforced molded body of Example 10E has a compression percentage of 2,074%, a specific gravity of 1.35, a resin proportion of 53%, a flexural strength of 410 MPa, a flexural modulus of 43 GPa, and a product appearance of "○", and thus has a good appearance, high strength and rigidity, and light weight.

Example 11E

A fiber-reinforced molded body of Example 11E was prepared in the same manner as in Example 1E except that 70 g of the resin A was used as the powdery thermosetting resin.

The fiber-reinforced molded body of Example 11E has a compression percentage of 1,415%, a specific gravity of 1.37, a resin proportion of 76%, a flexural strength of 400 MPa, a flexural modulus of 42 GPa, and a product appearance of "○", and thus has a good appearance, high strength and rigidity, and light weight.

Example 12E

A fiber-reinforced molded body of Example 12E was prepared in the same manner as in Example 1E except that a urethane resin foam (manufactured by INOAC Corporation, product name: MF-50, density: 30 kg/m$^3$) cut into a thickness of 10 mm and a planar size of 200×300 mm (weight: 18 g) was used as the resin foam having an open-cell structure.

The fiber-reinforced molded body of Example 12E has a compression percentage of 1,686%, a specific gravity of 1.35, a resin proportion of 70%, a flexural strength of 450 MPa, a flexural modulus of 40 GPa, and a product appearance of "○", and thus has a good appearance, high strength and rigidity, and light weight.

Example 13E

Example 13E is a case where the powdery thermosetting resin is disposed on both sides of the resin foam having an open-cell structure, and is an example of the fiber-reinforced molded body 410 shown in FIG. 25 and the production method of FIG. 27.

A fiber-reinforced molded body of Example 13E was prepared in the same manner as in Example 1E except that 32.5 g of the resin A4 as the powdery thermosetting resin was disposed above and below the melamine resin foam substantially uniformly.

The fiber-reinforced molded body of Example 13E has a compression percentage of 1,686%, a specific gravity of 1.35, a resin proportion of 70%, a flexural strength of 500 MPa, a flexural modulus of 44 GPa, and a product appearance of "○", and thus has a good appearance, high strength and rigidity, and light weight.

Example 14E

Example 14E is a case where two fiber substrates are laminated on both sides of the resin foam having an open-cell structure, and is an example of the fiber-reinforced molded body 420 shown in FIG. 28 and the production method of FIG. 29.

A fiber-reinforced molded body of Example 14E was prepared in the same manner as in Example 1E except that four sheets of carbon fiber woven fabric (manufactured by Teijin Limited, product name: W-3101, weight per unit area: 200 g/m$^2$, thickness: 0.22 mm) each cut into 200×300 mm (the weight of the cut fiber substrate was 12 g per sheet) were prepared as the fiber substrate, a melamine resin foam was laminated on the two laminated fiber substrates, 57.0 g of the resin A4 as the powdery thermosetting resin was disposed thereon substantially uniformly, the remaining two fiber substrates were disposed thereon, and a SUS spacer having a thickness of 1.5 mm was disposed between the lower mold and the upper mold of the mold.

The fiber-reinforced molded body of Example 14E has a compression percentage of 1,513%, a specific gravity of 1.40, a resin proportion of 62%, a flexural strength of 550 MPa, a flexural modulus of 48 GPa, and a product appearance of "○", and thus has a good appearance, high strength and rigidity, and light weight.

Example 15E

Figure 30:
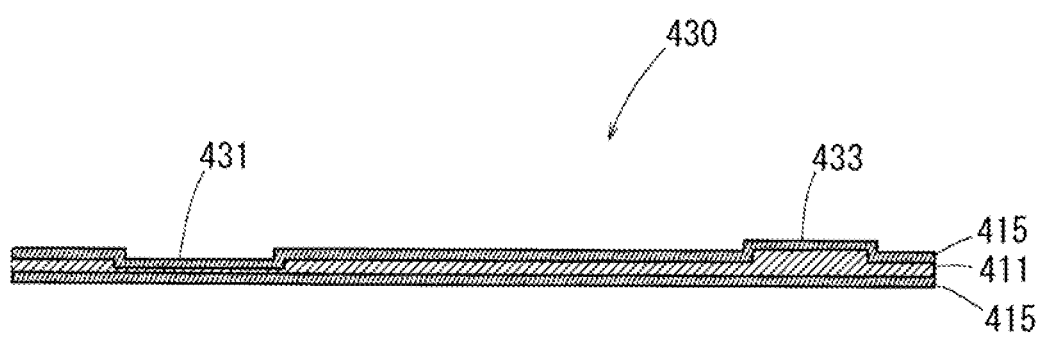
FIG. 30 is a cross-sectional view of a fiber-reinforced molded body according to a third embodiment of the fifth aspect.

Examples 15E to 19E and Example 22E are examples of the fiber-reinforced molded body 430 (one fiber-reinforcing layer provided on each of both surfaces of the core material) having irregularities formed on the surface thereof as shown in FIG. 30 and the production method of FIG. 31.

In Example 15E, two sheets of carbon fiber woven fabric (manufactured by Teijin Limited, product name: W-3101, weight per unit area: 200 g/m$^2$, thickness: 0.22 mm) each cut into 200×300 mm were prepared as the fiber substrate. The weight of the cut fiber substrate was 12 g per sheet. In addition, as the resin foam having an open-cell structure, a melamine resin foam (manufactured by BASF SE, product name: Basotect G+, density: 9 kg/m$^3$) cut into a thickness of 10 mm and a planar size of 200×300 mm (weight: 5.4 g) was prepared.

A pre-molding laminate was prepared by laminating the melamine resin foam on one fiber substrate, disposing 65.0 g of the resin A4 as the powdery thermosetting resin thereon substantially uniformly, and disposing another fiber substrate thereon.

Next, the pre-molding laminate was disposed on a molding surface of a lower mold of a mold heated to 150° C. Then, an upper mold is disposed on the pre-molding laminate, the mold was closed, and heat compression was performed at a pressure of 10 MPa for 10 minutes.

On the mold surface of the upper mold of the mold, a recess forming protrusion (height 1 mm, width 10 mm) and a protrusion forming groove (depth 0.5 mm, width 10 mm) are formed from one end to the other end of the mold surface with a distance of 100 mm from each other.

A SUS spacer having a thickness of 1 mm was disposed between the lower mold and the upper mold of the mold to set the distance between the lower mold and the upper mold to 1 mm, and the compressed thickness of the pre-molding laminate was adjusted to 1 mm.

When the thermosetting resin was melted by heating during heat compression and pressure was applied by the mold, the thermosetting resin was impregnated into the fiber substrate and the resin foam of each layer, and the curing reaction was completed. Thus, a fiber-reinforced molded body composed of an integrated laminate product including a fiber reinforcing material and a core material was prepared, in which the fiber reinforcing material was obtained by impregnating the thermosetting resin into the fiber substrate and curing the thermosetting resin, and the core material was obtained by impregnating the thermosetting resin into the resin foam having an open-cell structure and curing the thermosetting resin. One surface of the fiber-reinforced molded body has a recess shaped by the recess forming protrusion of the upper mold and a protrusion shaped by the protrusion forming groove. The fiber-reinforced molded body was trimmed to 170×260 mm to obtain a fiber-reinforced molded body of Example 15E.

The numerical values and physical property values of the fiber-reinforced molded body of Example 15E are as shown in FIG. 36, split across views labeled FIGS. 36A-36C. As to the main numerical values and physical property values, the thickness is 1.0 mm and the compression percentage is 1,329% in the general portion without irregularities, the thickness is 2.0 mm and the compression percentage is 413% in the protrusion, the thickness is 0.6 mm and the compression percentage is 4,900% in the recess, the specific gravity is 1.35, the resin proportion is 70%, the flexural strength is 500 MPa, the flexural modulus is 46 GPa, and the product appearance is "○" in the entire molded body. The fiber-reinforced molded body of Example 15E thus has a good appearance, high strength and rigidity, and light weight. The flexural strength and the flexural modulus were measured for the general portion having no irregularities.

Example 16E

A fiber-reinforced molded body of Example 16E was prepared in the same manner as in Example 15E except that the resin B4 was used as the powdery thermosetting resin.

The fiber-reinforced molded body of Example 16E has a thickness of 1.0 mm and a compression percentage of 1,329% in the general portion without irregularities, a thickness of 2.0 mm and a compression percentage of 413% in the protrusion, a thickness of 0.6 mm and a compression percentage of 4,900% in the recess, a specific gravity of 1.34, a resin proportion of 70%, a flexural strength of 410 MPa, a flexural modulus of 40 GPa, and a product appearance of "o" in the entire molded body, and thus has a good appearance, high strength and rigidity, and light weight.

Example 17E

A fiber-reinforced molded body of Example 17E was prepared in the same manner as in Example 15E except that a resin prepared by uniformly mixing the resin A4 and the resin C4 at a weight ratio of 1:1 was used as the powdery thermosetting resin, and the mold temperature was 170° C.

The fiber-reinforced molded body of Example 17E has a thickness of 1.0 mm and a compression percentage of 1,329% in the general portion without irregularities, a thickness of 2.0 mm and a compression percentage of 413% in the protrusion, a thickness of 0.6 mm and a compression percentage of 4,900% in the recess, a specific gravity of 1.35, a resin proportion of 70%, a flexural strength of 820 MPa, a flexural modulus of 51 GPa, and a product appearance of "o" in the entire molded body, and thus has a good appearance, high strength and rigidity, and light weight.

Example 18E

A fiber-reinforced molded body of Example 18E was prepared in the same manner as in Example 15E except that a resin prepared by uniformly mixing the resin D4 and the resin E4 at a weight ratio of 1:1 was used as the powdery thermosetting resin, and the mold temperature was 160° C.

The fiber-reinforced molded body of Example 18E has a thickness of 1.0 mm and a compression percentage of 1,329% in the general portion without irregularities, a thickness of 2.0 mm and a compression percentage of 413% in the protrusion, a thickness of 0.6 mm and a compression percentage of 4,900% in the recess, a specific gravity of 1.35, a resin proportion of 70%, a flexural strength of 860 MPa, a flexural modulus of 52 GPa, and a product appearance of "o" in the entire molded body, and thus has a good appearance, high strength and rigidity, and light weight.

Example 19E

A fiber-reinforced molded body of Example 19E was prepared in the same manner as in Example 15E except that a resin prepared by uniformly mixing the resin D4, the resin E4, and the resin C4 at a weight ratio of 1:1:1 was used as the powdery thermosetting resin, and the mold temperature was 170° C.

The fiber-reinforced molded body of Example 19E has a thickness of 1.0 mm and a compression percentage of 1,329% in the general portion without irregularities, a thickness of 2.0 mm and a compression percentage of 413% in the protrusion, a thickness of 0.6 mm and a compression percentage of 4,900% in the recess, a specific gravity of 1.35, a resin proportion of 70%, a flexural strength of 860 MPa, a flexural modulus of 53 GPa, and a product appearance of "○" in the entire molded body, and thus has a good appearance, high strength and rigidity, and light weight.

Example 20E

Example 20E is an example of the fiber-reinforced molded body 440 (two fiber-reinforcing layers on each of both surfaces of the core material) having irregularities formed on the surface thereof shown in FIG. 32 and the production method of FIG. 33.

A fiber-reinforced molded body of Example 20E was prepared in the same manner as in Example 15E except that four fiber substrates similar to those of Example 15E were prepared, the resin foam having an open-cell structure similar to that of Example 15E was laminated on two laminated fiber substrates, 57.0 g of the resin A4 as a powdery thermosetting resin was disposed thereon substantially uniformly, the remaining two fiber substrates were disposed thereon to prepare a pre-molding laminate, and a SUS spacer having a thickness of 1.5 mm was used.

The fiber-reinforced molded body of Example 20E has a thickness of 1.5 mm and a compression percentage of 706% in the general portion without irregularities, a thickness of 2.5 mm and a compression percentage of 209% in the protrusion, a thickness of 1.1 mm and a compression percentage of 2,173% in the recess, a specific gravity of 1.40, a resin proportion of 62%, a flexural strength of 490 MPa, a flexural modulus of 42 GPa, and a product appearance of "o" in the entire molded body, and thus has a good appearance, high strength and rigidity, and light weight.

Example 21E

Example 21E is an example of producing the fiber-reinforced molded body of FIG. 32 by disposing a powdery thermosetting resin on both sides of a resin foam having an open-cell structure as shown in FIG. 34.

A fiber-reinforced molded body of Example 21E was prepared in the same manner as in Example 15E except that a pre-molding laminate was prepared by preparing four fiber substrates similar to those of Example 15E, disposing 29 g of the resin A4 as the powdery thermosetting resin on two laminated fiber substrates, laminating a resin foam having an open-cell structure similar to that of Example 15E thereon, disposing 29 g of the resin A4 as the powdery thermosetting resin thereon substantially uniformly, and disposing the remaining two fiber substrates thereon, and a SUS spacer having a thickness of 1.5 mm was used.

The fiber-reinforced molded body of Example 21E has a thickness of 1.5 mm and a compression percentage of 706% in the general portion without irregularities, a thickness of 2.5 mm and a compression percentage of 209% in the protrusion, a thickness of 1.1 mm and a compression percentage of 2,173% in the recess, a specific gravity of 1.40, a resin proportion of 62%, a flexural strength of 490 MPa, a flexural modulus of 42 GPa, and a product appearance of "o" in the entire molded body, and thus has a good appearance, high strength and rigidity, and light weight.

Example 22E

Example 22E is an example in which the type of the resin foam having an open-cell structure in Example 15E was changed.

A fiber-reinforced molded body of Example 22E was prepared in the same manner as in Example 15E except that a urethane resin foam (manufactured by INOAC Corporation, product name: MF-50, density: 30 kg/m$^3$) cut into a thickness of 10 mm and a planar size of 200×300 mm (weight: 18 g) was used as the resin foam having an open-cell structure.

The fiber-reinforced molded body of Example 22E has a thickness of 1.0 mm and a compression percentage of 1,329% in the general portion without irregularities, a thickness of 2.0 mm and a compression percentage of 413% in the protrusion, a thickness of 0.6 mm and a compression percentage of 4,900% in the recess, a specific gravity of 1.35, a resin proportion of 70%, a flexural strength of 460 MPa, a flexural modulus of 38 GPa, and a product appearance of "o" in the entire molded body, and thus has a good appearance, high strength and rigidity, and light weight.

Example 23E

A fiber-reinforced molded body of Example 23E was prepared in the same manner as in Example 1E except that the thickness of the resin foam having an open-cell structure was 30 mm.

The fiber-reinforced molded body of Example 23E had a compression percentage of 5,257% and a product appearance of "A".

Example 24E

A fiber-reinforced molded body of Example 24E was prepared in the same manner as in Example 1E except that a urethane resin foam (manufactured by INOAC Corporation, product name: MF-50, density: 30 kg/m$^3$) cut into a thickness of 1.5 mm and a planar size of 200×300 mm (weight: 18 g) was used as the thermosetting resin foam having an open-cell structure.

The fiber-reinforced molded body of Example 24E had a compression percentage of 168%, a specific gravity of 1.35, a resin proportion of 70%, a flexural strength of 300 MPa, a flexural modulus of 24 GPa, and a product appearance of Example 25E A fiber-reinforced molded body of Example 25E was prepared in the same manner as in Example 1E except that the amount of the powdery thermosetting resin used was adjusted so that the resin proportion was 45%.

The fiber-reinforced molded body of Example 25E had a compression percentage of 2,074%, a specific gravity of 1.33, a resin proportion of 45%, a flexural strength of 350 MPa, a flexural modulus of 28 GPa, and a product appearance of "A".

Example 26E

A fiber-reinforced molded body of Example 26E was prepared in the same manner as in Example 1E except that the amount of the powdery thermosetting resin used was adjusted so that the resin proportion was 85%.

The fiber-reinforced molded body of Example 26E had a compression percentage of 1,686%, a resin proportion of 85%, and a product appearance of "A".

Comparative Example 1E

Comparative Examples 1E and 2E are comparative examples with respect to Example 1E.

In Comparative Example 1E, a fiber-reinforced molded body of Comparative Example 1E was prepared in the same manner as in Example 1E except that the following resin F4 was used as the powdery thermosetting resin, and the mold temperature was 100° C.

The resin F4 is a phenol resin (manufactured by Sumitomo Bakelite Co., Ltd., product name: PR-50699, average particle size: 30 μm).

The results of viscosity measurements of the resin F4 (Comparative Examples 1E, 3E) are shown in the graph of FIG. 37.

The compression percentage of the fiber-reinforced molded body of Comparative Example 1E was 1,686%, but the minimum viscosity of the thermosetting resin was high (reaction was fast), and the thermosetting resin was not easily impregnated into the fiber substrate. As a result, the fiber-reinforced molded body could not be obtained, and physical property values and the like could not be measured.

Comparative Example 2E

A fiber-reinforced molded body of Comparative Example 2E was prepared in the same manner as in Example 1E except that a resin prepared by uniformly mixing the resin A4 and the resin D4 at a weight ratio of 1:2 was used as the powdery thermosetting resin, and the mold temperature was 160° C.

The results of viscosity measurement of the mixed resin of the resin A4 and the resin D4 (weight ratio: 1/2) (Comparative Examples 2E, 4E) are shown in the graph of FIG. 37.

The compression percentage of the fiber-reinforced molded body of Comparative Example 2E was 1,686%, but the maximum viscosity of the thermosetting resin in the temperature range of Tb to 190° C. was low, the thermosetting resin was not cured, and deformation occurred in the fiber-reinforced molded body at the time of demolding. Therefore, physical property values and the like could not be measured.

Comparative Example 3E

Comparative Examples 3E and 4E are comparative examples with respect to Example 15E.

In Comparative Example 3E, a fiber-reinforced molded body of Comparative Example 3E was prepared in the same manner as in Example 15E except that the resin F4 was used as the powdery thermosetting resin, and the mold temperature was 100° C.

In the fiber-reinforced molded body of Comparative Example 3E, the minimum viscosity of the thermosetting resin was high (reaction was fast), and the thermosetting resin was not easily impregnated into the fiber substrate and the resin foam having an open-cell structure. As a result, a fiber-reinforced molded body could not be obtained, and physical property values and the like could not be measured.

Comparative Example 4E

A fiber-reinforced molded body of Comparative Example 4E was prepared in the same manner as in Example 15E except that a resin prepared by uniformly mixing the resin A4 and the resin D4 at a weight ratio of 1:2 was used as the powdery thermosetting resin, and the mold temperature was 160° C.

In the fiber-reinforced molded body of Comparative Example 4E, the maximum viscosity of the thermosetting resin in the temperature range of Tb to 190° C. was low, and the thermosetting resin was not cured. As a result, deformation occurred in the fiber-reinforced molded body at the time of demolding, and physical property values and the like could not be measured.

As described above, according to the present aspect, a fiber-reinforced molded body can be obtained without using a prepreg. Further, according to the present aspect, a fiber-reinforced molded body shaped into an irregularity shape can also be obtained.

The present aspect is not limited to Examples, and can be modified without departing from the spirit.

REFERENCE SIGNS LIST

Description of Reference Numerals in Description of First Aspect

10 Fiber-reinforced resin molded body
11, 11A to 11F Fiber substrate
15 Thermosetting resin
15A to 15E Thermosetting resin powder
30 Mold
31 Lower mold
32 Upper mold Description of Reference Numerals in Description of Second Aspect 110, 120, 130 Prepreg
111, 111A to 111D Fiber substrate
115 Thermosetting resin
115A to 115C Thermosetting resin powder
141A, 141B Plastic mold release film
150 Mold
151 Lower mold
152 Upper mold Description of Reference Numerals in Description of Third Aspect 210 Fiber-reinforced molded body
211 Fiber substrate
215 Resin sheet
230 Mold
231 Lower mold
232 Upper mold Description of Reference Numerals in Description of Fourth Aspect 310 Fiber-reinforced sandwich composite
311, 311A to 311D Fiber substrate
315 Core component
321 Thermosetting resin
321A, 321B Thermosetting resin powder
330 Mold
331 Lower mold
332 Upper mold Description of Reference Numerals in Description of Fifth Aspect 410, 420, 430, 440 Fiber-reinforced molded body
411 Core material
413 Resin foam having open-cell structure
415 Fiber reinforcing material
417, 417A to 417D Fiber substrate
419, 419A, 419B Powdery thermosetting resin
431, 441 Recess
433, 443 Protrusion
460, 470 Mold
461, 471 Lower mold
462, 472 Upper mold
473 Recess forming protrusion
475 Protrusion forming groove

The invention claimed is:
1. A fiber-reinforced resin molded body obtained by heat-compressing a fiber substrate together with a thermosetting resin so that the thermosetting resin is impregnated into the fiber substrate and cured, wherein
the thermosetting resin cured is obtained by melting a powder of the thermosetting resin disposed in contact with the fiber substrate and curing the thermosetting resin during the heat compression, and
any one of the following (1) to (5) is satisfied:
(1) the fiber-reinforced resin molded body has a flexural strength (JIS K 7074 A method) of 450 MPa or more;
(2) the fiber substrate includes a basalt fiber;
(3) the thermosetting resin includes a cyanate resin;
(4) a value of (Tb−Ta) of the thermosetting resin satisfies
$$30 \le (Tb-Ta) \le 100,$$
wherein a melting start temperature of the thermosetting resin is Ta° C. and a curing reaction start temperature of the thermosetting resin is Tb° C.; and
(5) the melting start temperature Ta° C. of the thermosetting resin is 60 to 100° C.

2. A vehicle or an airframe comprising a fiber-reinforced resin molded body obtained by heat-compressing a fiber substrate together with a thermosetting resin so that the thermosetting resin is impregnated into the fiber substrate and cured, wherein
the thermosetting resin cured is obtained by melting a powder of the thermosetting resin disposed in contact with the fiber substrate and curing the thermosetting resin during the heat compression, and
any one of the following (1) to (5) is satisfied:
(1) the fiber-reinforced resin molded body has a flexural strength (JIS K 7074 A method) of 450 MPa or more;
(2) the fiber substrate includes a basalt fiber;
(3) the thermosetting resin includes a cyanate resin;
(4) a value of (Tb−Ta) of the thermosetting resin satisfies
$$30 \le (Tb-Ta) \le 100,$$
wherein a melting start temperature of the thermosetting resin is Ta° C. and a curing reaction start temperature of the thermosetting resin is Tb° C.; and
(5) the melting start temperature Ta° C. of the thermosetting resin is 60 to 100° C.

3. A method for producing the fiber-reinforced resin molded body according to claim 1 by heat-compressing a fiber substrate together with a thermosetting resin so that the thermosetting resin is impregnated into the fiber substrate and cured, the method including:
disposing a powder of the thermosetting resin in contact with the fiber substrate; and
heat-compressing the fiber substrate together with the powder of the thermosetting resin by a mold so that the powder of the thermosetting resin is melted, impregnated into the fiber substrate, and cured.

4. A method for producing the fiber-reinforced resin molded body according to claim 1 by heat-compressing a fiber substrate together with a thermosetting resin so that the thermosetting resin is impregnated into the fiber substrate and cured, the method comprising:
disposing a powder of the thermosetting resin in contact with the fiber substrate; and
heat-compressing the fiber substrate together with the powder of the thermosetting resin by a mold so that the powder of the thermosetting resin is melted, impregnated into the fiber substrate, and cured, wherein
a temperature Tc° C. of the mold is a temperature satisfying
$$[Tb+(Tb-Ta)/3]-15 \le Tc \le [Tb+(Tb-Ta)/3]+20$$

wherein a melting start temperature of the thermosetting resin is Ta° C. and a curing reaction start temperature of the thermosetting resin is Tb° C.

* * * * *